(12) United States Patent
Woolf et al.

(10) Patent No.: US 8,229,871 B2
(45) Date of Patent: Jul. 24, 2012

(54) SYSTEMS AND METHODS FOR COMPUTER AIDED INVENTING

(76) Inventors: Tod M. Woolf, Sudbury, MA (US); Andrew S. Marks, Wayland, MA (US); Scott Neumann, Natick, MA (US)

( * ) Notice: Subject to any disclaimer, the term of this patent is extended or adjusted under 35 U.S.C. 154(b) by 888 days.

(21) Appl. No.: 11/794,587

(22) PCT Filed: Dec. 28, 2005

(86) PCT No.: PCT/US2005/047097
§ 371 (c)(1), (2), (4) Date: Dec. 17, 2008

(87) PCT Pub. No.: WO2006/071876
PCT Pub. Date: Jul. 6, 2006

(65) Prior Publication Data
US 2011/0161054 A1    Jun. 30, 2011

Related U.S. Application Data

(60) Provisional application No. 60/639,991, filed on Dec. 29, 2004, provisional application No. 60/594,025, filed on Mar. 4, 2005.

(51) Int. Cl.
*G06F 17/00* (2006.01)
*G06N 5/00* (2006.01)

(52) U.S. Cl. ........................................................ 706/45

(58) Field of Classification Search ........................ None
See application file for complete search history.

(56) References Cited

U.S. PATENT DOCUMENTS

| | | | | |
|---|---|---|---|---|
| 5,867,397 A * | 2/1999 | Koza et al. | ...................... | 703/14 |
| 6,311,176 B1 * | 10/2001 | Steiner | ........................... | 706/45 |
| 7,016,852 B1 * | 3/2006 | Lee | ............................... | 705/310 |
| 2002/0050988 A1 * | 5/2002 | Petrov et al. | ................. | 345/418 |
| 2002/0161733 A1 * | 10/2002 | Grainger | ........................ | 706/45 |
| 2004/0205599 A1 * | 10/2004 | Whewell et al. | ............... | 715/515 |

OTHER PUBLICATIONS

"Genetic Programming as a Darwinian Invention Machine", John Koza, Version 2—Feb. 19,1999.*

* cited by examiner

*Primary Examiner* — Jeffrey A Gaffin
*Assistant Examiner* — Luis Sitiriche
(74) *Attorney, Agent, or Firm* — Nelson Mullins Riley & Scarborough LLP; John S. Curran, Esq.

(57) ABSTRACT

Methods and systems are provided for a systematic approach to computer aided inventing. In a modeling environment, a model representing any item, composition or process can be defined and configured using the lexicon and specification of an innovation database. In the model, objects can be identified, defined, and configured to provide the model with constituent products, components, features and materials. An innovation engine automatically applies one or more morphs from the innovation database to the objects of the model to generate morphed versions of the model that may provide innovations of or invention to the item, composition or process represented by the model.

6 Claims, 27 Drawing Sheets

| Material Classes |
|---|
| Synthetic Polymer |
| Metal |
| Glass |
| Carbon Fiber |
| Wood |
| Natural Fiber-Paper |
| Other Mineral |
| Crystal |
| Stone (rock) |
| Natural skin-Leather |
| Wax |
| Liquid Crystal |
| Water-based Liquid |
| Gel |
| Emulsion |
| Suspension |
| Oil or fat |
| Food or beverage |
| Aerosol |
| Gas |
| Vacuum |
| Pesticide |
| Fertilizer |
| Drug |
| Paint |
| Coating |
| Adhesive |
| Fragrance |
| Dye |
| Protein |
| Nucleic Acid |
| Living Material |
| Plasma |
| Sugar or starch |
| Toxin or irritant |
| Hydrocarbon |
| Natural Polymer |
| Semiconductor |
| High Explosive |
| Clay |

Table 1: Material Classes

*Fig. 2E-1*

| Material Classes |
| --- |
| Cement |
| Sand |
| Soil |
| Excrement |
| Secondary metabolites |
| Elemental Salts |
| Ceramics |
| Radioisotopes |
| Strong Acids |
| Strong bases |
| Abundant fundamental Compounds |
| reducing agents |
| oxidizing agents |
| Nanotubes |
| Simple alcohols |
| Precursors for organic synthesis |
| Crosslinking reagents |
| plasticizers |
| Stabilizers |
| hydrogels |
| surfactants |
| chloro and fluoro carbons |
| photo-reactive chemicals |
| Organic solvents |
| Inorganic solvents |
| stable isotopes |
| catalysts |
| Enzymes |
| Ribozymes |
| Metal alkoxides |
| Metal Triflates |
| Drying Agents |
| Phosphates |
| Sulphates |
| Nitrates |

―280

Table 1: Material Classes

*Fig. 2E-2*

| Material Classes |
| --- |
| Chelators |
| Vitamins |
| Organometalics |
| acid Halides |
| aldehydes |
| alky halogenated |
| Amides |
| Amines |
| Amino Acids |
| Aryl halogenated |
| Ester |
| Ethers |
| Acetals |
| epoxides |
| Lactones |
| Isocyanates |
| isothiocyanates |
| ketones |
| mercaptans |
| sulfides |
| Nitriles |
| Isocanides |
| Nitroso and Nitro compounds |
| Sulfur halogenated |
| sponges |
| bone |
| antibodies |
| growth factors/hormones |
| serum |
| Whole Blood |
| Lymph |
| Heterocyclic building blocks |
| General Organic Chemistry building blocks |
| Extracellular matrix |
| Propellants |

— 280

Table 1: Material Classes

*Fig. 2E-3*

| Configuration Classes |
|---|
| Triangular |
| Linear Array |
| Single Object |
| Rectangular |
| Trigonal Pyramid |
| Pyramid (rectangular base) |
| Planar Tri-Star |
| Mobius |
| Ring |
| Spherical |
| Polygonal (>4 sides) |
| Helical |
| Cubic |
| Geodesic |
| Conical |
| tubular |
| Horse shoe |
| Double-u |
| S |
| X |
| T |
| figure 8 |
| L |
| V |
| Y |
| Z |
| 69 |
| Stacked |

Table 2: Configuration Classes

| MORPH | DESCRIPTION |
|---|---|
| Add Additional Material Component | For example, if a handle is made of pure iron, on could add in each of a list of metal types. (iron becomes, iron and nickle alloy, iron and copper alloy, ... etc. |
| Append An Additional Object | This is a critical morph, and involves scanning through all or a portion of the objects database to insert additional objects, for example ABC, becomes, ABCD, ABCE, ABCF, ABCG ...etc. |
| Artist Filters (Paint/Color/Style) | See Photoshop filters, for examples. |
| Bend | Kink, Curved, wave |
| Bend at Interface | |
| Change Basic Configuration | This morph changes the configuration of the selected objects, to one of the possible configurations in the configuration database. Impossible configurations (such as a square configuration, when only three objects are selected), can be dimmed in the menu of selections. |
| Change Color | Subheadings include, Hue, Brightness, SaturationContrast, Pattern-texture, gradiant, picture. |
| Change Internal Texture | This morph transforms uniform solids into non-uniform solids. For example, when applied to an object composed of solid cement, the morph will produce objects made of bricks of cement, packed balls of cement, crushed cement, pulverized cement, and other non-solid forms. This morph can also add internal patterns of spaces such as channels, or porosity to a selected object. |
| Change Materials | This simple means change on material for another. In one form the changes can be from the same class, for example polyethylene become polypropylene. In other form, the change can be into different classes, such as polypropylene become steel. This can be done globally, or with permutations of the selected objects. The different forms of this morph can be set by default or user configuration. |
| Change Object | This morph has different options. In it's most simple form, it substitutes an object with objects in the same class and lower classes in the hierarchy of objects. For example, a glue connection between bristle of toothbrush and the handle, becomes a rotating joint, a vibrating connection, ...etc. With another option the original object is changed to objects of different classes. |
| Change Opacity | |
| Change Ratio of Components | This morph is for materials that have more than one component |
| Change Shape | A Square table top becomes, round , triangular, pentagon, trapazoid... etc. |
| Compress | Stretch in default or user defines directions.CombinatorialDiagonalwidthHeight |
| Deform | |
| Delete | This major heading would include standard delection of selected objects, deletion of all permutations of objects (for instance objects A, B and C, would go to B-C, A-B, and A-C. |

*Fig. 2H-1*

| MORPH | DESCRIPTION |
| --- | --- |
| Duplicate Or Consolidate | This major heading would/could include multiple duplications (for example object A, spawns AA, AAA, AAAA... etc. Also permuations of duplications (for example ABC, becomes, AABC, ABBC, and ABCC). |
| Enlarge or Shrink | A group or all ojects might be enlarged, or permutations of individual objects may enlarge or shrink (for example, abc, can go to ABC, aBC, ABc, AbC, Abc, abC, and aBc (were upper case represents larger). User defined and/or default increments |
| Extrusion | |
| Grid Morph | This morph will add or delete rows or columns in an object, as well as varying grid alignments to a variety of known grid configurations. For example, in a toothbrush the bristles are grouped and arranged in a grid pattern. This morph would add or delete rows or columns of bristles or change the grid pattern in which those bristles are arrayed. |
| Increase-Decrease Interface Distances | This could be done in concert with all selected interfaces or permutations of selected interfaces. |
| Interlace | |
| Mirror Image | Includes mirror image of the positions of each oject, or mirror images of objects and/or combinations of objects. |
| Modify Alignment | As used in word processing and drawing programs, such as align left, align right, distribute, center... etc. |
| Modify Edges | This morph is based on existing CAD tools. The edges are modified for example a box with square edges, becomes a box with rounded edges. The I-Engine would implement this tool with a variety and range of edge shapes by default or user configured settings. |
| Modify Pressure | |
| Overlap | |
| Permutate Positions | For example a linear array ABC, becomes, ACB, BAC and CAB |
| Reverse Arrow Direction Morph | This morph is for use in conjunction with baseline entities that comprise an object that is a flow chart (e.g., a business plan, software design, database design, military planning, etc.). The morph reverses arrow directions in the flow chart, and allows for creating permutations of arrow directions. |
| Rotate Orientation | Including permutations of multiple selected objects.Called twist in the flex tool |
| Scan Different Object Positions | A selected oject(s) move in steps relative to the other objects. Could be along one, two or three dimensions, in user defined or default increments. |
| Separate (segment) or fuse. | For example ABC becomes, A BC, AB C, and A B C.Another example (fuse) A B C becomes, A BC, AB C, AC B and ABC. |
| Skew | |
| Slide Interfaces | Default and user defined increments |
| Stretch | Stretch in default or user defines directions. |

*Fig. 2H-2*

| MORPH | DESCRIPTION |
|---|---|
| Text Morphs | These include many text changes that are found in commercially available word processing programs, such as WordPerfect™ and Microsoft Word™. They include, but are not limited to, change case, change style (e.g., bold, italic, underline, etc), change color, alignment, change font, and employing "word art" styles. These morphs are useful when an object in the baseline entity comprises text, such as a logo, instructions on use, literature and any other writings. |
| Torsional Twist | Along default or user defined axis's, with default or user defined increments |
| Turn insideout | |
| Warp | |

MATERIALS DATABASE FIELDS

| Field Name | Field Type |
| --- | --- |
| Name | text |
| Date Entered | date, autoenter |
| Description | Text |
| Color | Picture container, or color description |
| Unique Serial Number | number |
| Hierarchical Level | Primary, secondary, tertiary, quartenary... ect, or 1,2,3, 4... etc |
| Next Higher Level Class | Choose from list of all names |
| Novelty Score | number |
| Attractiveness to Adults | Number |
| Attractiveness to Young Children (1-9 yrs) | number |
| Attractiveness to teens(1-19yrs) | number |
| Cost Factor | number |
| Pressure | |
| Charged? | |
| Magnetic? | |
| Other user defined attributes | |
| Typical functionality imparted by this object | Such as increased mobility, strength, ease of use, reduction in cost, user defined,...etc |

291

If a mixture the following fields apply

291'

| Field Name | Value | Percentage range |
| --- | --- | --- |
| Component #1 | | |
| Compention #2 | | |
| Component #N | | |
| Mixture Type | Colloid, homogenous, emulsion, powder,,, etc | |

*Fig. 2I-1*

CONFIGURATIONS
DATABASE FIELDS

| Field Name | Field Type |
| --- | --- |
| Name | text |
| Date Entered | date, autoenter |
| Description | Text |
| Image | Picture container |
| Unique Serial Number | number |
| Hierarchical Level | Primary, secondary, tertiarly, quartenary... ect, or 1,2,3, 4... etc |
| Next Higher Level Class | Choose from list of all names |

— 292a

292b

| | Positional Coordinates (X, Y, Z) | Orientation Coordinates (x,y,z) |
| --- | --- | --- |
| Bucket 1 ("bucket" means space holder, or container) | (X, Y, Z) | (x, y, z) |
| Bucket 2 | (X, Y, Z)' | (x, y, z)' |
| Bucket 3 | (X, Y, Z)'' | (x, y, z)'' |
| Bucket 4 | (X, Y, Z)''' | (x, y, z)''' |
| Bucket N | (X, Y, Z)'''' | (x, y, z)'''' |

*Fig. 2I-2*

OBJECTS DATABASE FIELDS  293

| Field Name | Field Type |
|---|---|
| Name | text |
| Date Entered | date, autoenter |
| Description | Text |
| Image | Picture container |
| Unique Serial Number | number |
| Type of Object | Functional black box, feature, component, product, context |
| Hierarchical Level | Primary, secondary, tertiarly, quartenary... ect, or 1,2,3, 4... etc |
| Next Higher Level Class | Choose from list of all names |
| Novelty Score | number |
| Attractiveness to Adults | Number |
| Attractiveness to Young Children (1-9 yrs) | number |
| Attractiveness to teens(1-19yrs) | number |
| Cost Factor | number |
| Size Factor | number |
| Typical Field of Use of this object | Choose from list of major fields, such as electronics, sports, scientfic research, user defined... etc |
| Synonyms | Separate field or fields, or listed separated by commas in the name field |
| Typical functionality imparted by this object | Such as increased mobility, strength, ease of use, reduction in cost, user defined,...etc |

*Fig. 2I-3*

| Field Name | Field Type |
|---|---|
| Name | text |
| Date Entered | date, autoenter |
| Description | Text |
| Code or commands to implement this morph | Text |
| Image | Picture container |
| Unique Serial Number | number |
| Hierarchical Level | Primary, secondary, tertiarly, quartenary... ect, or 1,2,3, 4... etc |
| Next Higher Level Class | Choose from list of all names |
| This Morph is applicable to: | Selectable list comprising the terms Objects, Configurations, or Materials |
| The following set of parameters, is replicated for multi-parameter morphs | |
| Low End of Range | Select default or insert value |
| High End of Range | Select default or insert value |
| Distribution | Select from list comprising Linear (default), asymtotic, exponential or user defined |
| Number of Embodiments | Select default or insert value |
| Increments | Calculated, for example for linear distribution "=(High end of range-low end of range)/((number of embodiments-1), multiple values for non-linear |

| SPECFIC EMBODIMENT DATABASE FIELDS | Object Name | Qualities of Object | Material | Qualities of Materials | Positional Cooridinates X, Y, Z | Orientation Coordinates x, y, z |
|---|---|---|---|---|---|---|
| Bucket 1 ("BUCKET means space holder, or container) | | | | | | |
| Bucket 2 | | | | | | |
| Bucket 3 | | | | | | |
| Bucket 4 | | | | | | |
| Bucket N | | | | | | |
| RENDERING of embodiment(automatically generated from above parameters with reference to Objects and materials databases | | | | | | |
| Prior Art Search Results | | | | | | |
| Number of matching patents | | | | | | |
| Number of matching websites | | | | | | |
| List of matching patents | | | | | | |
| List of matching websites | | | | | | |
| Other prior art sources searched | | | | | | |
| Results from other sources | | | | | | |
| Overall Prior Art Score | | | | | | |
| Subjective usefullness Score | | | | | | |
| Business Priority Score | | | | | | |
| Market Size | | | | | | |
| Displacement potential | | | | | | |
| Ease of Development Score | | | | | | |
| Cost of objects | | | | | | |
| Cost of assembly | | | | | | |
| Include a drawing in patent draft | yes/no | | | | | |
| Include in specfication? | yes/no | | | | | |
| Include in claims? | yes/no | | | | | |
| Include Markush claims | yes/no | | | | | |
| This embodiment was derived from the following Baseline Entity | | | | | | |
| The following Morph was applied to obtain this embodiment | | | | | | |

| FIELD NAME | FIELD TYPE |
| --- | --- |
| Summary | Text |
| Title | Text |
| Cross Reference to Related Applications | Text, repeating (individual cells for each referenced application) |
| Sequence Listing or Program | Text |
| Background of the invention: field of | Text |
| Background of the invention: Prior Art | Text |
| Background of the invention: Objects and Advantages | Text |
| Federally Sponsored research | Text |
| Drawings (list) | Text, derived from Drawings database. |
| Reference numerals (optional) | List Generated from objects in drawing list |
| Detailed Description: Preferred Embodiment | Text |
| Detailed Description: Operation-Preferred Embodiment | Text |
| Detailed Description: Description: Additional Embodiment | Text |
| Detailed Description: Operation: Additional Embodiment | Text |
| Conclusion, ramifications and scope | Text |
| Claims | Text, repeating (individual cells for each claim) |
| Abstract | Text |
| Provisional Filing Date | Text (autoentered, if electronically filed from within the application) |
| Distinctions fom prior art | Text |
| Inventors | Text, repeating (individual cells for each individual, with address) |
| Date of conception | Text (autoentered, based on generation date from modeling environment) |
| Claims database | Text, repeating (individual cells for each claim) derived from Specific Embodiments Database |
| Drawings database | Repeating container field with with image files and associated text fields for drawing descriptions, derived from rendering of specific embodiments database |
| Reference to all specific embodiments from the specifics embodiments database used in the application | |
| Licensing Status | Text |
| Sales Revenue | Text |
| Prosecution Status | Text |
| Office Actions | Repeating Container fields for images of actions, or text if available |
| Response to office actions | Text, repeating (individual cells for each response) |

*Fig. 2I-6*

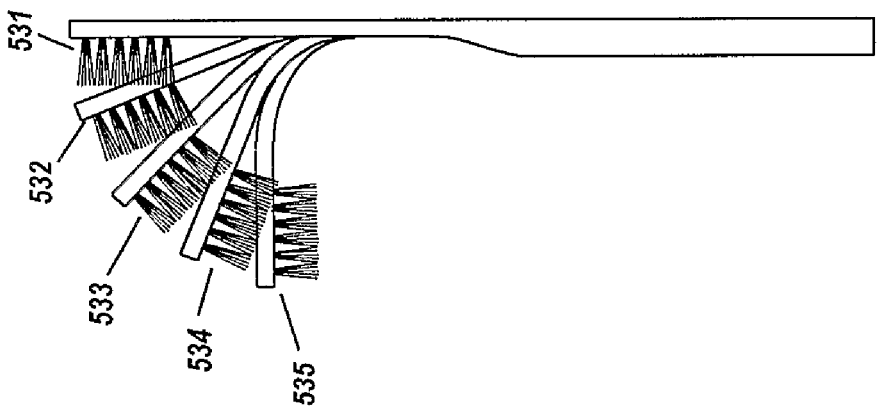
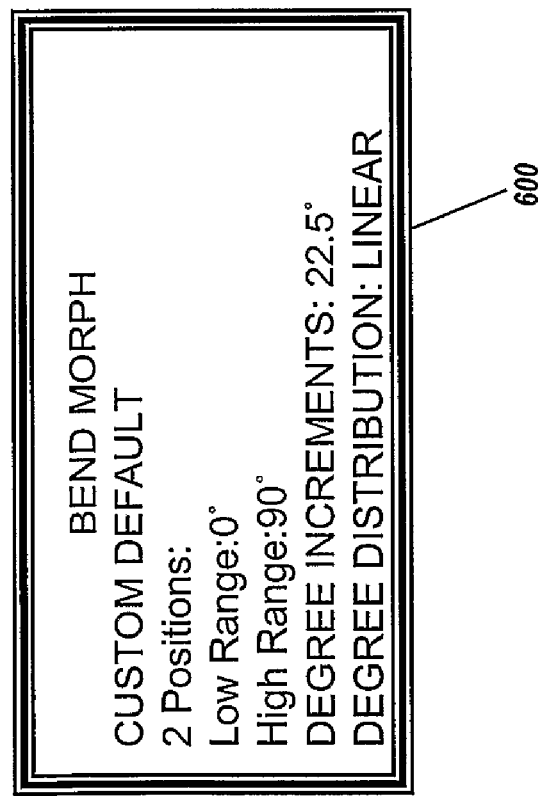
Fig. 6

| SPECIFIC EMBODIMENT | POSITION 1 | POSITION 2 | POSITION 3 | CLAIM? | PRIOR ART REFS* |
|---|---|---|---|---|---|
| BASELINE ENTITY | | HANDLE | BRISTLES | NO | NA |
| 1 | SPEAKER C | HANDLE | BRISTLES | YES | 2 |
| 2 | SPEAKER D | HANDLE | BRISTLES | NO | 1 |
| 3 | | HANDLE | BRISTLES COMPRISING FLUORIDE | NO | 1 |
| 4 | SPEAKER C | HANDLE | BRISTLES COMPRISING FLUORIDE | YES | 0 |
| 5 | SPEAKER D | HANDLE | BRISTLES COMPRISING FLUORIDE | NO | 0 |
| 6 | | HANDLE | BRISTLES COMPRISING HYD. SILICA | NO | 0 |
| 7 | SPEAKER C | HANDLE | BRISTLES COMPRISING HYD. SILICA | NO | 0 |
| 8 | SPEAKER D | HANDLE | BRISTLES COMPRISING HYD. SILICA | NO | 0 |

\* Hypothetical

*Fig. 10*

1. A {Baseline Entity Name} comprising:
   {Specific Embodiment #1, Position #1 Name};
   {Specific Embodiment #1, Position #2 Name};
   {Specific Embodiment #1, Position #3 Name}.

2. A {Baseline Entity Name} comprising:
   {Specific Embodiment #4, Position #1 Name};
   {Specific Embodiment #4, Position #2 Name};
   {Specific Embodiment #4, Position #3 Name}.

...Etc.

*Fig. 11*

1. A toothbrush comprising:
   Speaker C;
   Handle;
   Bristles.

2. A toothbrush comprising:
   Speaker C;
   Handle;
   Bristles comprising fluoride.

...Etc.

Fig. 12

SYSTEMS AND METHODS FOR COMPUTER AIDED INVENTING

RELATED APPLICATIONS

The present invention generally relates to methods and systems for a systematic approach to computer aided inventing. The present invention claims priority to a United States provisional application entitled "Systems and Methods for Computer Aided Inventing", filed Dec. 29, 2004, Ser. No. 60/639,991, and to a United States provisional application entitled "Systems and Methods for Computer Aided Inventing" filed Mar. 4, 2005, Ser. No. 60/594,025, the contents of which are incorporated herein by reference.

The present invention generally relates to methods and systems for a systematic approach to computer aided inventing.

BACKGROUND

Creative thinking and brainstorming in order to innovate new products, technologies and solutions can be challenging, time-consuming and limited to the knowledge, background, education, experience, imagination and other personality and thinking traits of people involved in the innovation process.

Innovation can be a source of sustainable competitive advantage and lasting success in the fast-changing business world. Innovative thinking can lead to inventions for new products, technologies and solutions to increase productivity and efficiency, and improve the quality of products and services. Creativity may manifest itself in design, art and music, each of which may also contribute to competitive advantage and success. Inventing is usually done by creative individuals through their own internal thinking patterns, or from brainstorming sessions which provide collaborative stimuli to assist in the creative thinking process. These brainstorming sessions may be loosely structured by an agenda around an area of interest and will be limited by the creative and imaginative thinking patterns of the session participants. Although the individuals may be creative, they may not be able to think of all the innovative choices for an area of interest in the brainstorming session. For example, the individuals participating in the brainstorming session may only represent a small subset of all the possible technology disciplines. As such, they may not know of or think of alternatives, improvements and other creative elements that may be applicable to or used in the area of interest. Furthermore, the individuals may not think of a creative element mainly because their particular thinking patterns prevent associating or applying the creative element to the area of interest. For example, one may not think of combining a microprocessor with a toothbrush in a brainstorming session. Because humans tend not to be highly detailed, most people find it difficult or tedious to enumerate all the species, details or embodiments of an invention that is conceived as a broad concept. For example, if one tried to list every type of metal, it would be quite difficult without reference to a published list.

As the pace of change in new product development accelerates, the pace of innovation in product development also needs to accelerate to sustain competitive advantage, to provide or continue commercial success, or just to continue to develop new products. Methods and systems are desired to increase the speed and efficiency of inventive processes and to accelerate innovation to provide new commercially viable ideas, such as products, designs, music, and services for the marketplace.

Additionally, filing patent applications may be necessary to protect the investment in research and development of the invention and to sustain the competitive advantage and commercial success desired by the invention. The filing date of a patent application can be critical for establishing a priority right against others and for protecting the invention. Any delays between conception of an invention and drafting a patent application may result in a delay in a filing date, and thus, possibly hindering the protection of the invention. Especially with the accelerated pace of change in new product development, the pace of developing an invention from a concept to a filed patent application also needs to accelerate. As such, methods and systems are desired to increase the speed and efficiency of drafting and filing patent applications to protect inventions.

Computation tools are excellent at generating diversity, but are often unable to recognize the quality of the outputted variants. Humans, on the other hand, can typically discern the quality of an innovation, be it an idea, technology, or design. A computation-based (or other systematic method-based) modeling environment which generates diversity, with an output that allows a person to interactively select and guide the generation of diversity would be very useful.

SUMMARY OF THE INVENTION

The present invention provides systems and methods for applying computer aided inventing assistance to the process of inventing new items, compositions, or processes in a systematic fashion. In a modeling environment, a baseline entity can be graphically modeled and designated as the entity to start the inventing process. The starting baseline entity can then be further described in terms of its fundamental products, components, and elements, referred to as objects, as well as the materials that make up those objects and the context of the entity's current use. The present invention includes an innovation database that provides a lexicon and specification framework. The innovation database comprises objects, materials and configuration data to describe the baseline entity and objects of the baseline entity in a flexible and dynamic manner. The present invention further provides for the selection of one or more objects to be modified from its original form by applying a morph from the innovation database. A morph is a modification to an object of the baseline entity, such as a replacement of, addition to, or alternative configuration of an object. The term "alternative configuration" includes a modification in the structure of an object as well as a modification in the relationship between an object and one or more other objects of the baseline entity, such as a change in distance, angle or type of connection between objects. The morphed version of the starting baseline entity provides a new baseline entity that may represent an invention. This "morphed baseline entity" may be rendered in the modeling environment and can be selected as a starting baseline entity for further modification.

Furthermore, the system can automatically apply a multitude of morphs to one or more of the objects, or all of the objects of the starting baseline entity to form a large set of different morphed baseline entities, each representing a possible invention. The morphed versions can be further selected based on a number of factors including, but not limited to, the usefulness of the invention, the cost of the objects and materials that make up the entity, the consumer appeal of the invention, the advantages over the baseline entity and the uniqueness over any prior art. These factors may be applied by manually selecting morphed baseline entities and/or eliminating erroneous or unwanted entities from a generated set of morphed baseline entities. Alternatively, these factors may be applied through the use of automated quantitative and/or qualitative filters to select desired entities from the generated set of morphed baseline entities. Each selected morphed entity may be stored in a specific embodiment database to provide a comprehensive and useful source of information for supplying a description of an invention in the detailed description section of a patent application.

Additionally, portions of a patent application, including but not limited to, Figures, tables, examples and claims can be automatically generated for any set of one or more selected morphed entities.

In summary, the present invention provides a structured and systematic method for facilitating the inventing process while reducing the need for creativity input and the time for determining a desired invention. Additionally, the present invention can provide a more comprehensive approach to inventing with a multitude of alternative embodiments provided from a database.

The terms "invention" or "inventing", as used herein refer to any creative process that produces something new. It is not limited to creations or ideas that are patentable. Rather, it is intended to encompass such diverse creations such as, flow charts; circuit designs; software designs; database designs; graphics arts; customization or configuration of vehicles; chemical formulations; motion pictures including animation; advertising, such as the creation of television commercials, graphic ads, audio ads, internet advertising, architecture, negotiation strategies, website design, writings, such as screenplays, plays, novels, business writings and legal writings; music composition; sculpture; business plans or strategies; food recipes; restaurant menu creation, such as custom sandwiches; manufacturing plant design; plastic surgery planning; landscape design; video game design, as well as use within a gaming environment (for example, the design or creation of a character for use in a game); travel planning; military campaign planning; teaching plans; desktop settings within a software operating system; investment strategies, portfolio composition; homeland security scenario building (for example modeling what terrorists might attempt); workout or exercise routine design; research and experimental design; sports strategy design; design of gambling machines, or other gambling games (such as scratch tickets); and packaging design.

In one broad aspect, the present invention provides a method for systematically aiding invention. The method includes the step of designating a baseline entity that may be a composition, an item, text, music, a design or a process. The method further includes the step of selecting one or more objects constituting a portion of the baseline entity. The one or more objects may represent a product, a component, and an element of the baseline entity. The method associates at least one of the one or more objects with a model class to define the object. The method also includes selecting at least one of the one or more objects for modification. The method further includes applying (selected, or generated by program) a morph to the selected object from a plurality of morphs to produce a morphed baseline entity. The morph may require selection from one or more other databases if it involves the addition to, replacement of or a property change in the selected object. In a preferred embodiment, the present invention is carried out through the use of a computer and the designation of the baseline entity is done in a model in a modeling environment.

In one aspect, the method of the present invention provides a representation of the morphed baseline entity. The representation may include a two-dimensional or three-dimensional graphical rendering, a textual description, or a three-dimensional model, such as an output from a 3-D lithography printer of the morphed baseline entity. In one embodiment, the model class is a selection from an object class, a configuration class, or a materials class. The object class may also include a selection from an element class, a composition class, or a product class. In another aspect of the present invention, the plurality of morphs includes a configuration morph, an object morph, or a material morph, or any combination thereof. Applying a morph to a selected object may include a replacement of, an addition to, or an alternate configuration of the selected object.

In one aspect of the present invention, the step of designating the baseline entity includes graphically representing the baseline entity and/or providing a text description of the baseline entity. The step of indicating an object of the baseline entity may include graphically specifying the object and/or providing a description of the object. The method of the present invention may also include associating the baseline entity with a class for a composition, an item, or a process. In another aspect, the present invention associates the baseline entity with a context. The context may indicate an environment for which to apply the method of the present invention to the baseline entity. In a further aspect, the method of the present invention may include selecting the morph, the object, and the model class from a hierarchical representation of an invention lexicon database.

In a further aspect, the present invention may include automatically applying the plurality of morphs to one or more objects of the baseline entity, or to all of the objects of the baseline entity. The present invention may also automatically provide representations of the baseline entity with each of the plurality of morphs applied to the objects.

In yet another aspect of the present invention, the method may include providing quality information associated with applying the morph to the object. The quality information may indicate the usefulness and/or the uniqueness of the morph. The method may further include selecting an indicator representing a level of usefulness and/or uniqueness of the morphed object.

In an additional aspect, the present invention may further generate a portion of a patent application descriptive of the morphed item, composition or process. The generated portion of the patent application may include a claim, a specification, and a figure.

In one aspect, the method of the present invention may be applied repetitively by designating one of the following as the baseline entity: 1) one or more objects of the baseline entity, 2) the morphed object, and 3) the baseline entity with the morphed object.

In another aspect, the present invention relates to a device readable medium having device readable instructions to execute the steps of the method, as described above, related to systematically providing computer aided inventing.

In one aspect, the present invention is directed towards a system for providing computer aided inventing. The system includes a modeling environment and an innovation engine. The modeling environment has a configuration mechanism and a selection mechanism. The modeling environment provides a model of a baseline entity representing a composition, an item, or a process. The configuration mechanism may be used to define one or more objects constituting a portion of the baseline entity, and to associate at least one of the one or more objects with a model class. The model class may include an object class, a configuration class, or a materials class. The object class may further include an element class, a composition class, and a product class. The one or more objects may represent a product, a component, or an element of the baseline entity. The selection mechanism may be used to select at least one of the objects for modification. The innovation engine communicates with the modeling environment and applies a morph to the selected object from a plurality of morphs.

The system of the present invention may further include a rendering mechanism to provide a graphical representation of the baseline entity with the morphed object. The plurality of morphs applied by the innovation engine may include a configuration morph, an object morph, or a material morph, or any combination thereof, such as a configuration and material morph, a configuration and object morph, and a material and configuration morph.

In one aspect, the configuration mechanism of the present invention is configured to provide either a graphical representation and/or a description of the baseline entity. The configuration mechanism may also be configured to provide a graphical representation and/or a description of the one or more objects of the baseline entity. Also, the configuration mechanism may be used to provide an association of the baseline entity with a class of a composition, an item, or a process.

In one aspect of the present invention, the modeling environment includes selecting the morph, the object, or the model class from a hierarchical representation of an invention lexicon database. The morph may include a replacement of, an addition to, or an alternate configuration of the selected object. A morph may modify the structure of the selection objects and/or the relationship between the selected object and one or more other objects of the baseline entity, such as a change in distance, angle or type of connection between objects. For example, in some embodiments, a morph may include applying one or more of the following to the selected object and/or its relationship with one or more other objects: stretch, twist, bend, compress, rotate about interface axis, slide interface, bend at interface, increase/decrease interface distance, separate, mirror image, rotate, inside out, permutate, repeat, delete, interlace, overlap, grow/shrink, append an additional element, change material, change color, change ratio of components, harden, irradiate, mix, crystallize, desiccate, dope, oxidize-reduce, change opacity, and modify pressure.

In another aspect of the present invention, the choices for carrying out a morph can be filtered via the configuration mechanism. The morphs may be filtered to limit the choices of morphs to one or more of the following: the objects available to replace or add to the selected object, the materials available to be applied to a selected object, the alternative configurations available to morph the selected object, or the morphs available to apply to the selected object. Additionally, the filtering of morphs may be based upon one or more qualitative or quantitative characteristics that may be associated with an object, material, or configuration of a selected object or associated with a morph. These characteristics include, but are not limited to, cost, practicality, consumer appeal, function, size, field of use, or user-defined characteristics.

In an additional aspect, the innovation engine of the modeling environment provides quality information associated with applying the morph to the object. The quality information may indicate the usefulness and/or uniqueness of applying the morph. Furthermore, the modeling environment may also provide for selecting an indicator representing a level of usefulness and/or uniqueness of the baseline morphed object.

In one aspect of the present invention, the innovation engine automatically applies the plurality of morphs to one or more objects of the baseline entity, or to each of the objects of the baseline entity, to create a number of morphed objects. The modeling environment via the rendering mechanism may automatically provide textual and/or graphical representations of the resulting morphed objects.

In a further aspect, the system of the present invention also includes a patent application generator. The patent application generator is in communication with the modeling environment to generate at least a portion of a patent application descriptive of the morphed object, process or composition in the modeling environment. The generated portion of the patent application may include a claim, a specification, and a figure.

In another aspect, the system of the present invention further includes a prior art searching module in communication with the modeling environment. Textual output of the morphed objects from the modeling environment is converted to appropriate syntax compatible with searching prior art databases, such as the United States Patent and Trademark databases available at www.uspto.gov.

In yet a further aspect, the configuration mechanism of the present invention is configured to provide a selection of one of the following as the baseline entity: 1) one of the one or more objects of the baseline entity, 2) the morphed object, or 3) the baseline entity with the morphed object.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 2E1 to 2E3 is a table providing an illustrative example of a portion of material classes of the present invention.

FIG. 2F is a table providing an illustrative example of a portion of element classes of the present invention.

FIGS. 2H1 through 2H3 are tables providing an illustrative example of a portion of morphs of the present invention.

FIG. 2I-1 through 2I-6 depicts tables providing illustrative examples of fields for records in the database of the present invention.

FIG. 4 is a flow diagram depicting steps performed in practicing an illustrative method of the present invention.

FIG. 6 depicts another illustrative embodiment of resulting morphed entities in practicing the present invention.

FIG. 10 depicts an illustrative embodiment of a specific embodiments database produced after the application of morphs in practicing the present invention.

FIG. 11 depicts an illustrative embodiment of a portion of a patent application generator used in practicing the present invention.

FIG. 12 depicts an illustrative embodiment of a portion of a patent application produced by interaction between a patent application generator and a specific embodiments database in the practice of the present invention.

DETAILED DESCRIPTION

Figure 1:
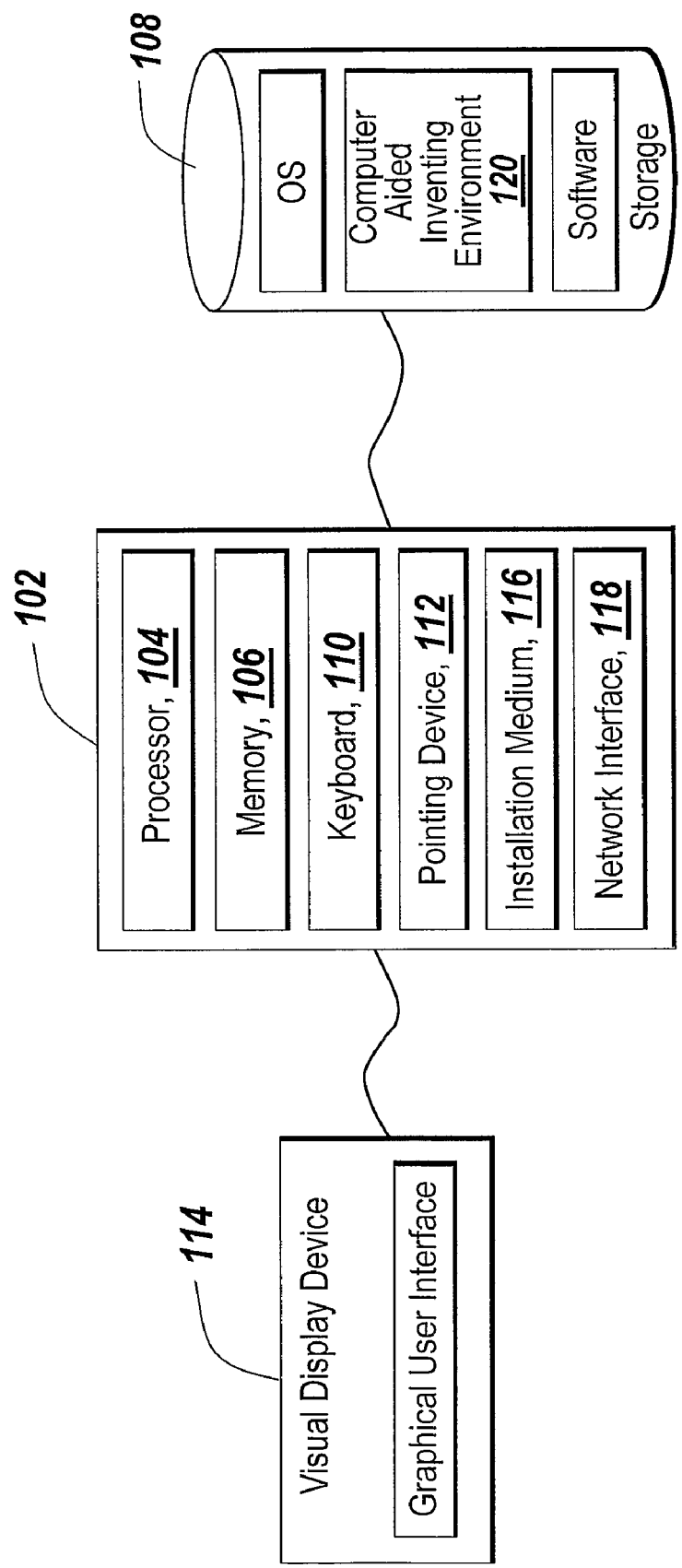
FIG. 1 is a block diagram of a computing device for practicing an illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

It should be understood that the system and method of this invention may be carried out without the aid of a computer, such as by manually reviewing flash or index cards that represent the various morphs, objects, materials and configurations utilized by the invention. While not a preferred embodiment, such a system and method are within the scope of the present invention.

The illustrative embodiment of the present invention provides systems and methods for computer aided inventing to assist in the process of inventing new items, compositions, or processes in a systematic and structured manner. In a modeling environment, a baseline entity can be graphically modeled and designated as the starting entity. The baseline entity may represent an item, composition or process from which one desires to invent. For example, one may be looking to invent a new type of toothbrush. A model of a toothbrush may be provided in the modeling environment and selected as the starting baseline entity.

The baseline entity may be a pre-existing entity or an inventive entity itself that was created using traditional inventive means. In the latter scenario, the system and method of this invention may be used to elaborate additional species of the invention and to create additional new inventions using the initial invention as the starting point.

In one embodiment, the user designates the starting baseline entity. This may be achieved by selecting from a list of pre-existing entities stored within the system; by graphically rendering an entity using tools present in the system (e.g., drawing tools, CAD tools, etc.) or through the use of an external program and then importing the rendering into the system; by obtaining an image of an existing product (e.g, scanning) and importing said image into the system. In an alternate embodiment, the system generates the baseline entity based upon a series of queries from the system and responses from the user. Such an embodiment is particularly useful when the user wants to solve a problem for which no product presently exists. This query-response system can be in the form of a "wizard" of the type frequently present in commercial software, such as Microsoft Office™. In yet another embodiment, the system can simply pick a baseline entity at random or based upon parameters such as cost, novelty, consumer appeal, etc. The system-selected baseline entity will be chosen from an database in the system. Most preferably, all three embodiments are incorporated into the system and the user is given the choice via a configuration mechanism as to how to generate the baseline entity.

In some cases the baseline entities are dynamic or part of a time dependent process. For example, a six-pack of soda is dynamic in that the individual filled cans are removed from the packaging, they become empty cans after the content is consumed and the packaging becomes separated from the cans when the cans are all removed. When such a situation arises, the system can generate a series of models representing the different states of the entity (and the context). At the users choice, any or all of the states may be morphed. This allows the user to consider potential improvements at various states. The system can be configured to enable the user to move back or forward in time to observe the morph throughout the various states of the dynamic process.

The starting baseline entity can then be further described in terms of its fundamental and constituent elements or parts, referred to as objects. The objects may represent a product, component, or element of the baseline entity. For example, for a toothbrush baseline entity, one object may represent the toothbrush itself as a product. In another example, an object may represent the handle, which is a component of the toothbrush, and in another example, an object may represent the rounded end of the handle, which is an element of the handle. A second object may be defined to represent the brush portion of the toothbrush made of bristles and connected to a brush base. The objects can also be defined to be composed of a material. For example, the toothbrush handle may be described as being made of plastic. Additionally, the objects can be defined to have a configuration. For example, the toothbrush may be defined to have a linear arranged handle with the brush on the end of the handle. As such, the baseline entity of the toothbrush would be defined by the objects: as a round-ended handle made of plastic connected to a brush base holding a brush including bristles and the brush connected to the end of the linear arranged handle.

The terms "baseline entity", "objects", "product", "component", "element", "part", "material", and "configuration" are to be interpreted as defined herein. To the extent that such definitions vary from a dictionary definition or definition in the art, the definitions used herein shall govern the interpretation. These concepts are often given different names in the CAD art. For example, see www.solidworks.com, wherein the terms "shape", "operation", "feature", "part", "component" and "assembly" are used to define various aspects of a product.

The baseline entity can be described in terms of objects in any form or granularity desired. For example, in one case the bristles of the toothbrush may be considered as a whole and be described with an object representing the bristle head as a part of the toothbrush. In another case, each bristle may be modeled as an object and further considered and described separately as elements of the toothbrush, such as thin plastic flexible smooth rods. A database, referred to as the innovation database, is used to provide a specification framework for defining objects and forming the baseline entity in a flexible and dynamic manner.

For certain applications it may be desirable that a subset of objects within a baseline entity are constrained in order to preserve functionality. The constraint may be achieved through a "grouping" function that allows the user to designate multiple objects in the baseline entity that are part of a group and perform a specific function. Alternatively, the constraint may be achieved by designating multiple objects in the baseline entity and applying standard constraint tools that are well-known in the computer-aided design art. These include, but are not limited to, snap to grid, snap to drawing aids, snap to shape interfaces, snap to alignment box, snap to shape geometry, glue to shape geometry, glue to shape handles, glue to shape vertices, glue to connection points and snap to dynamic grid, as well as known connection tools.

The ability to constrain certain objects within a baseline entity is preferably present in the system and method of this invention. Morphs applied to constrained objects will them be restricted to those which do not destroy the functionality. Software for determining whether functionality is maintained is known in the art (see, for example, the CAD software program Electric available from wwvw.staticfreesoft.com).

Certain features of a baseline entity are conceptual and would not be considered objects in a traditional sense. One of these is a surface plane, such as the plane formed by the distal ends of the bristles of a toothbrush. Surface planes may be altered and varied, such as having the distal ends of the bristles define a zigzag plane and extending the bristles to meet this planar surface. Morphs that change planes are present in the morph database utilized by the system of this invention.

Another non-traditional feature is the spaces within objects or defined by being surrounded by multiple objects, such as the space within a sealed tube. Typically, such spaces are filled with air, but a morph that changes material could be applied to such a space to replace air with a gas, such as argon for reducing rusting.

In a preferred embodiment, the user would choose whether or not to include planes and spaces as objects that may be subjected to selection and morphs.

The present invention further provides for the selection of one or more objects to be modified from its original form by applying a morph from the innovation database. A morph is a replacement of, addition to, or alternative configuration of a defined object of the baseline entity. A morph may modify the structure of the selection objects and/or the relationship between the selected object and one or more other objects of the baseline entity, such as a change in distance, angle or type of connection between objects. The application of a morph to the starting baseline entity provides a modified baseline entity that may represent an invention. A morph may change a material, a feature, a component or configuration of the object, or any one or more combinations thereof. For example, a material morph on the handle of a toothbrush may change it from plastic to stainless steel. In another case, a feature morph may change the toothbrush handle to a bent rod.

Other examples of morphs that may be applied to objects by the method and system of this invention are:

Change Object: This morph has different options. In its most simple form, it substitutes an object with another object in the same hierarchical class and lower hierarchical classes. For example, a glue connection between bristle of toothbrush and the handle can be changed to a rotating joint or a vibrating connection, etc. Another option changes the original object to an object of a different hierarchical class.

Modify Edges. This morph is based on existing CAD tools. The edges of a selected object are modified. For example, a box with square edges is changed to a box with rounded edges. The method and system of this invention are able to implement this morph with a variety and range of edge shapes and radii. The parameters for modification (edge angle or arc angle range; increment of change in angle, number of embodiments to produce within the range and slope of change (linear, geometric, parabolic) are all preferably user configurable, as well as having default settings.

Coat With a Material: This morph will coat an object or set of objects with materials from the material database.

Change Basic Configuration: This morph changes the configuration of the selected objects, to one of the possible configurations in the configuration database. For example, if the baseline entity comprises four objects in a linear configuration, the Change Basic Configuration Morph can create morphed entities in rectangular, triagonal pyramid, planar tri-star, "T" and "Y" configurations. The choices of configurations to apply within this morph may be selected by the user or generated automatically by the system. Impossible configurations, such as a square configuration when only three objects are selected, are preferably unavailable as possible selections by the user and are not generated automatically by the system.

Change Internal Texture: This morph transforms uniform solids into non-uniform solids. For example, when applied to an object composed of solid cement, the morph will produce objects made of bricks of cement, packed balls of cement, crushed cement, pulverized cement, and other non-solid forms. This morph can also add internal patterns of spaces such as channels, or porosity to a selected object.

Fuse/Segment: This morph fuses identical components into one or breaks down uniform objects into segments.

Grid Morphs: This morph will add or delete rows or columns in an object, as well as varying grid alignments to a variety of known grid configurations. For example, in a toothbrush the bristles are grouped and arranged in a grid pattern. This morph would add or delete rows or columns of bristles or change the grid pattern in which those bristles are arrayed.

Artistic Filter Morphs: These morphs are similar to the filters available in many commercially available graphic arts software, such as Adobe Photoshop™. These morphs are most useful when the system and method of this invention are applied to baseline entities in the design and graphic art fields, but may also be employed in any fields wherein a selected object comprises a graphical element to be morphed.

Reverse Arrow Direction Morph: This morph is for use in conjunction with baseline entities that comprise an object that is a flow chart (e.g., a business plan, software design, database design, military planning, etc.). The morph reverses arrow directions in the flow chart, and allows for creating permutations of arrow directions.

Other pre-existing CAD and graphic arts tools can also be employed as morphs in the systems and methods of this invention, including but not limited to, extrusion, warp, deform, transform, skew, distort and various alignment functions.

Text-specific morphs may also be included in the methods and systems of this invention. These include many text changes that are found in commercially available word processing programs, such as WordPerfect™ and Microsoft Word™. They include, but are not limited to, change case, change style (e.g., bold, italic, underline, etc), change color, alignment, change font, and employing "word art" styles.

These morphs are useful when an object in the baseline entity comprises text, such as a logo, instructions on use, literature and any other writings.

Other morphs that may be incorporated into the system and method of this invention are morphs that are typically utilized in genetic algorithms. These are well known in the art and are incorporated herein by reference.

It will be apparent from above that certain morphs that are capable of altering selected objects over a range of parameters (e.g., morphs that alter distance between objects, morphs that alter the angle of an object, etc.) and will potentially produce multiple morphed baseline entities. The choices of parameters involved in these morphs will determine the number of morphed baseline entities produced and are preferably user-adjustable. For example, the application of a "bend object" morph requires parameters of the range of bending (e.g., 10 to 90 degrees), the increment of change in the bend between morphed objects (e.g., 10 degree increments, or begin with a 10 degree increment and end with a 20 degree increment), and the progression through which the morph steps (e.g., linear, asymptotic or custom). Alternatively, the user may select the number of morphed baseline entities to be produced and have the system select one or more of the range, increment and progression.

In one embodiment, the progression is displayed as a graph. The user may alter the progression by altering the shape of the progression graph. This may be achieved by a selection mechanism, such as dragging a handle on the graph with a selection device to alter the shape of the graph and thus the desired progression. Similarly, the user may adjust the range of the morph by selecting handles on the ends of the graph to shorten or lengthen the end points of the morph. The alteration of the progression graph may alternatively be accomplished through the use of keyboard shortcuts or other selection mechanisms well known in the art.

The database of morphs has a vast array of different morphs to apply to an object. In a preferred embodiment, the system will make available to the user (or utilize in an automated mode) only those morphs that can apply to the chosen object (s) of the baseline entity.

The starting baseline entity with the morphed object may be rendered in the modeling environment. Furthermore, the system can automatically generate and render a multitude of morphs to one or more of the objects, or all of the objects of the starting baseline entity. As such, the present invention may generate a very large set of different versions of the starting baseline entity, each representing a possible invention. Each of the morphed versions of the starting baseline entity can be selected based on the usefulness of the invention and the uniqueness over any prior art. The innovation engine and database may provide attributes associated with morphs and objects of the starting baseline entity to assist in providing selection criteria. For example, useful characteristics of a material, such as strength, cost, consumer appeal and durability may be provided to assist in selecting the morphed embodiment of the baseline entity. These characteristics may be used to filter the choices of morphs to apply to a selected object to form a morphed baseline entity.

Certain morphs may produce morphed baseline entities in which two or more objects are not perfectly aligned, or contain unwanted gaps or overlaps. While these renderings are likely to be sufficient to provide the concept of the morphed baseline entity to the user, it may be desirable to "clean up" the rendering. Thus, in one embodiment, the modeling environment would allow for manual, suggested or automatic adjustment of the morphed baseline entity to correct these errors.

Furthermore, the systems and methods provided herein can be applied repetitively to the same starting baseline entity. For example, in one case the same starting baseline entity may be modeled in the modeling environment with a different set of objects or with a different granularity. Then morphs can be applied accordingly to the defined objects. Additionally, an object of a starting baseline entity may be used as a starting baseline entity to focus inventing to that object. Then this object may be further defined by its fundamental components and elements. Moreover, any of the generated morph versions of a starting baseline entity may be selected as a new starting baseline entity to start the inventing process with.

Additionally, a patent application can be automatically generated from any model in the modeling environment, such as for a selected set of one or more morphed baseline entities. The generation of the patent application may include any portion of, or all, of a patent application suitable for filing with the United States Patent and Trademark Office ("USPTO"), or any foreign patent office. For example, the present invention may output all the alternative embodiments of a generated morphed baseline entity into a specific embodiment database thus providing lists, tables and information for the detailed description and the claims of a patent application. From the graphical rendering of selected inventions, figures can be automatically generated for representing the invention in the patent application. In other embodiments, the present invention may provide an entire application including claims directed towards the generated inventions.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. For installing software programs, the computing device 102 may support any suitable device readable medium 116, such as a CD-ROM, DVD-ROM floppy disks, tape device, USB device, hard-drive or any other suitable device. The computing device 102 may further comprise a storage device 108, such as a hard-drive or CD-ROM, for storing an operating system and other related software. The present invention of a computer aided inventing system 120 may comprise software that is installed via a device readable medium 116 and stored in the storage device 108. Additionally, the operating system and computer aided inventing system 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 2A:
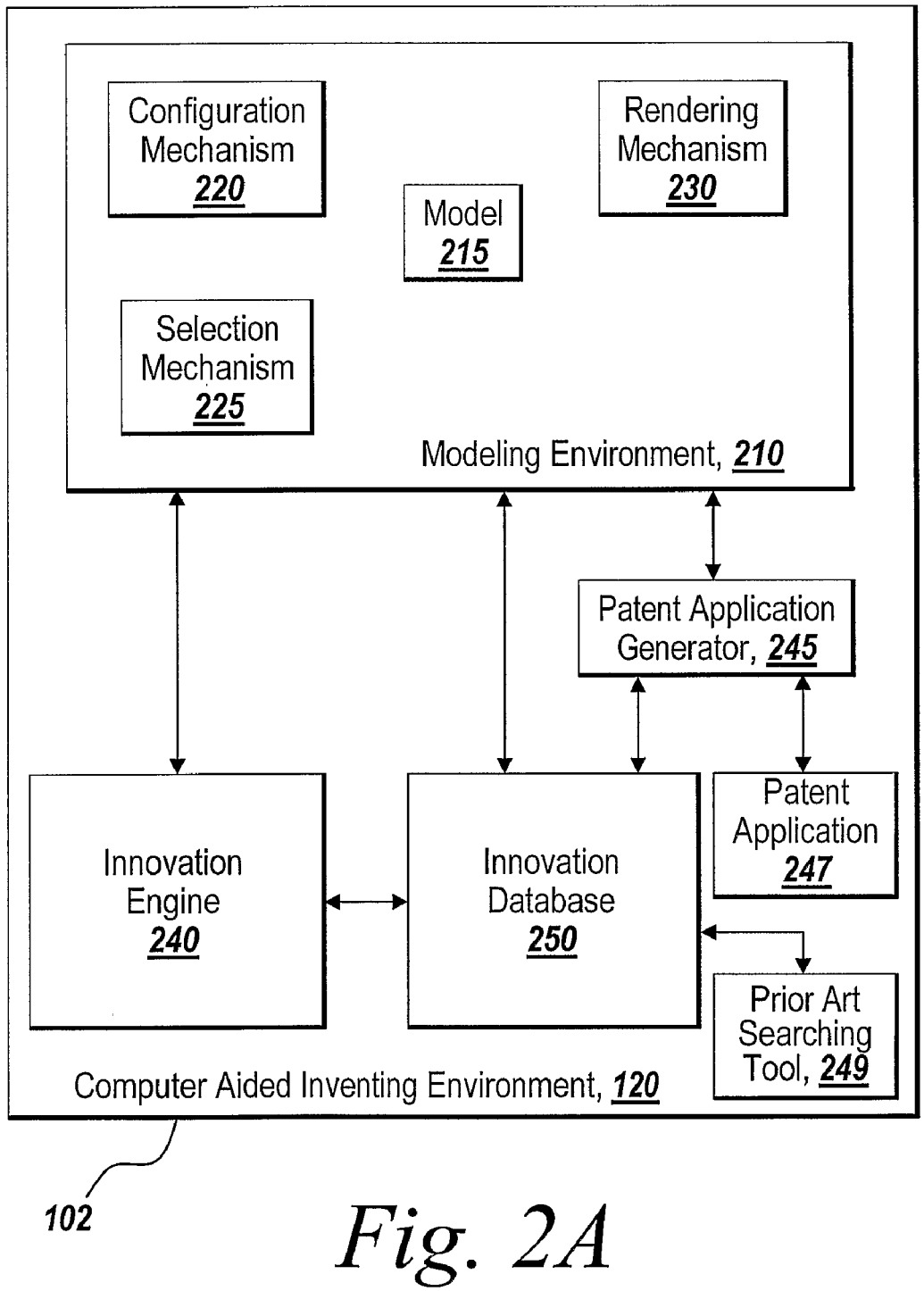
FIG. 2A is a block diagram of an illustrative embodiment of the present invention in a single computing device.

The illustrative embodiment of the present invention is directed towards a computer aided inventing environment 120 for modeling an entity and providing systematic assistance in determining inventions related to the entity. Referring now to FIG. 2A, an illustrative embodiment of a system for practicing the present invention is depicted. In brief overview, the computer aided inventing environment 120 includes a modeling environment 210, an innovation engine 240, a patent application generator 245, a prior art searching tool 249, and an innovation database 250, which are capable of and configured to execute on the computing device 102. The computing device 102 may be any type of computing device as described above, and as depicted in FIG. 2A may be a standalone system or a single node in a computer network.

The modeling environment 210 may comprise an environment for modeling any type of system, hardware, device, product, part, component, item, or any other naturally occurring or man-made system, process, method, item or composition. In an exemplary embodiment, the modeling environment 210 is a graphical modeling environment in which any type of graphical model may be generated or otherwise provided. For example, the modeling environment 210 may be a CAD/CAM modeling environment or a block diagram modeling environment of a technical computing system. In the modeling environment 210, a model 215 may be created such as a block diagram model, or a 2-D or 3-D model that may depict an entity to be considered for computer aided inventing. The modeling environment 210 may include a graphical user interface for interactively creating and working with a model 215. As such, a model 215 may be created, modified, edited, saved or otherwise managed in the modeling environment 210. In one embodiment, the modeling environment 210 may provide for the free-form creation, editing and managing of models 215, such as using a vector based drawing mechanism. In other embodiments, the modeling environment 210 may provide for graphical user interface widgets from a toolbox to provide for the formation of models 215. In further embodiments, graphical images, icons or other graphical representations may be retrievable from any suitable means such as file or a database to form a model 215, or a portion thereof.

The modeling environment 210 may be able to read the model 215 from a file, a database or any other suitable storage medium, either locally or from a remote location. Alternatively, the modeling environment 210 may obtain a model 215 from making a function call, application programming interface (API) call or by otherwise using a suitable interface to another system or application providing access to the model 215. Additionally, the modeling environment 210 may also provide for simulating or testing the model 215.

The modeling environment 210 may also include a configuration mechanism 220. The configuration mechanism 220 provides for defining any elements and properties of or associated with the model 215 and/or the modeling environment 210. The configuration mechanism 220 may comprise any type of user interface, such as a graphical user interface. As such, it may comprise any conventional user interface mechanisms such as menu items, forms, toolbars, sliders, check boxes, etc. to provide a user interface to receive user input with regards to configuration. Furthermore, the configuration mechanism 220 may also provide for defining the model 215 and/or the modeling environment 210 by other suitable means, such as reading configuration information from any medium accessible and/or readable by the modeling environment 210. In an exemplary embodiment, the configuration mechanism of the present invention will provide a configuration mechanism, such as a graphical user interface, to define the model 215 and the modeling environment 210 for systematically providing computer aided inventing. As will be described in more detail below, the configuration mechanism 210 will be used for applying one or more morphs to a selected object. By way of the toothbrush model illustration, the object representing the handle of the toothbrush may be selected, and the configuration mechanism 210 may provide a choice of morphs to select for applying to the selected object of the toothbrush handle. For example, the configuration mechanism 210 may access the innovation database 250 and present on a pop-up menu a list of morphs. In another example, the configuration mechanism 210 may be used for providing a set of filters or filter criteria for selecting a set of one or morphs to the selected object. Although generally described herein as defining using the configuration mechanism 220 in the modeling environment 210, one ordinarily skilled in the art will appreciate that defining may also be referred to as and include configuring, setting up, describing, or otherwise inputting data and/or setting values. One ordinarily skilled in the art will also recognize the variety of configuration mechanism that can be used in practicing the operations of the present invention as described herein.

The modeling environment 210 may also include a selection mechanism 225. The selection mechanism 225 may include any suitable pointing device, such as a mouse or optical pen, which allows elements of the model 215, the configuration mechanism 220, or the modeling environment 210 to be clicked, selected, moved, modified, changed or otherwise manipulated in a suitable manner. The selection mechanism 225 may provide a suitable means for grouping and/or ungrouping portions of a model 215 in the modeling environment 210. For example, the selection mechanism 225 may provide for a box of varying size to be drawn around elements of a model 215 to be selected as a group. The selection mechanism 225 may include any type of suitable indicator, such as a visual indicator, to indicate a change in a selection state of an element in the modeling environment 210. In one embodiment, the selection mechanism 225 may change the color of an element as it is toggled between selected and unselected states. In another embodiment, the background color may change. In another embodiment, a group of elements may be highlighted with a border or box to indicate the group is selected together. Alternatively, the selection mechanism 225 may include any form of input from any type of input device, such as a touch screen or a keyboard that can be used for selecting. One ordinarily skilled in the art will recognize the various selection mechanisms that could be used in the modeling environment for selecting elements of a model, configuration mechanism, or the modeling environment in practicing the operations of the present invention described herein.

The selection mechanism may be associated with menus, such that selected objects may be further characterized. For example, such menus may offer the user a choice as to whether the selected object should be treated as one or multiple objects to be morphed. The menu may also offer the user the a choice as to whether multiply selected objects are to be treated individually or as having a parent-child relationship commonly utilized in many commercially available drawing and CAD programs.

The modeling environment 210 may also include a rendering mechanism 230 for rendering an image of the model 215 or for otherwise providing a graphical representation of the model 215. The rendering mechanism 230 processes graphics data (such as vertex coordinates) to display, print, or export a figure, drawing or model 215. The rendering mechanism 230 presents information in a form, such as a 2-dimensional or 3-dimensional model 215 that a human can read and interact with. The rendering mechanism 230 may include software, hardware/firmware or both for providing graphical representations of models 215 in the modeling environment 210 or any other element of the modeling environment 210 requiring graphical representation. The rendering mechanism 230 may use any suitable type of rendering methods such as using vector graphics or bitmap (raster) graphics. In another embodiment, either a software or hardware OpenGL method of rendering may be used. In further embodiments, a graphical processing unit (GPU) method of rendering may be used. The GPU may be used to offload graphical processing from a central processing unit by performing buffering and any other desired computations. One ordinarily skilled in the art will recognize the various types of rendering methods that may be used in any combination of hardware and software, and will further appreciate the use of rendering in practicing the operations of the present invention.

Still referring to FIG. 2A, the computer aided inventing environment 120 includes an innovation engine 240 and an innovation database 250. The innovation engine 240 is in communication with the innovation database 250 and the modeling environment 210 by any suitable interface and communication means and/or mechanisms. For example, any type of API's, message passing schemes, and communication protocols may be used. The innovation engine 240 comprises business rules, functionality, operations, algorithms or any logic required to perform the computer aided assistance and related operations of the present invention that will be described further below.

The innovation database 250 may comprise any type of database, such as a file system, a file such as an Excel spreadsheet, a relational database such as any version of the SQL Server database manufactured by Microsoft Corporation of Redmond, Wash., and any version of the Oracle database from Oracle Corporation of Redwood Shores, Calif., or any other form of storage that may store and organize information in a logical manner and accessible by either the modeling environment 210 or the innovation engine 240. In one embodiment, FileMaker manufactured by FileMaker, Inc. of Santa Clara, Calif. may be used as the innovation database 250. In one embodiment, the innovation database 250 may comprise data structures of a program, library or other form of executable instruction, or may comprise data stored in some form of memory. In an exemplary embodiment, the innovation engine 240 may communicate with the innovation database 250 using a database access technology, such as for example the Open Database Connectivity standard (ODBC), or Java Database Connectivity (JDBC). As will be discussed in more detail below, the innovation database 250 comprises information for defining elements of a model 215 and for providing changes, or "morphs" to the model 215 in practicing the computer aided inventing process of the present invention.

In a preferred embodiment, the innovation database may be incorporated into an existing design or CAD program as a plug-in, an add-on or a series of macros which controls the program. Examples of such existing programs include, but are not limited to, SolidWorks Mechanical Design Software; Pro-Engineer Wildfire™ (PTC); Pro/CONCEPT (Parametric Technologies); AutoCAD, AutoCAD LT Inventor (Autodesk); SolidEdge (UGS); other freeware CAD, shareware CAD, open source CAD and JAVA-based CAD software; Visio and PowerPoint (Microsoft), or other drawing and rendering programs. The websites (www.autodesk.com, www.solidworks.com, www.ptc.com, www.microsoft.com and www.ugs.com), product features and product specifications of the aforementioned programs are incorporated herein by reference.

The computer aided inventing environment 120 of FIG. 2A may also include a patent application generator 245 for generating a patent application 247 from any selected morphed models stored in a specific embodiments database, or otherwise from any model 215 provided in the modeling environment 210. The patent application generator 245 may be in communication with the modeling environment 210 and/or the innovation database 250 by any suitable communication or interface mechanisms or means known to one ordinarily skilled in the art. From the definition and configuration of models 215 in the modeling environment 210 and from any information or data available in the innovation database 250 as will be described in further detail below, the patent application generator 245 can generate any type of document 247, in a text-based format or in any other suitable format, such as a portable document format or a format of a word processor, that includes suitable contents directed towards a patent application to be filed in the United States Patent and Trademark Office or any foreign patent office. In one embodiment, the patent application generator 245 may use the technique of structured input from a user or a database to generate the patent application and claims.

In another embodiment, the patent application generator 245 may use any patent application and claim generation techniques known in the art, such as those used by the software program PatentEase manufactured by Inventorprise, Inc. of Vestal, N.Y. In an exemplary embodiment, the patent application generator 245 uses data stored in a database associated with selected embodiments of morphed baseline entities generated or provided by the computer aided inventing environment 120 of the present invention. As such, the patent application generator 245 may generate a document 247 including one or more of the following sections of a patent application: an abstract, field of invention, background, summary of the invention, description of drawings, detailed description, claims, and formal or informal figures.

Additionally, the patent application generator 245 may use any suitable input file or files to provide content for the patent application 247 or to otherwise configure or direct the patent application generator 245 to generate a suitable patent application 247. In one embodiment, the patent application generator 245 may reference, load, or otherwise use template input files which may contain content to setup the structure of, or provide snippets of content for the patent application. In other embodiments, the patent application generator 245 may reference, load, or otherwise use business rules, libraries or other forms of configurable functionality that instruct the patent application generator 245 to generate patent applications 247 in a certain way. In a further embodiment, the patent application generator 245 may include any suitable user interface, such a graphical user interface or command line interface, for a user to configure, edit, or provide content or templates for a patent application 247. The patent application generator 245 may produce output in a form exportable to a format compatible with electronic submission of patent applications adopted by the USPTO and other Patent Offices. In one embodiment, the patent application generator 245 produces various sections of a patent application, which is then edited, reviewed and added to by a patent practitioner. Once this process is completed the patent application generator 245 can format the patent application 247 appropriately, export it to a format for electronic submission and actually transmit the document to the Patent Office.

Additionally, a user via the user interface may be able to configure or provide additional instructions to the patent application generator 245.

In another embodiment, the patent application generator 245 would further comprise a language translation module capable of outputting one or more sections of a patent application in a language other than English (not shown in FIG. 2A). The language translation module may also be supplied as a plug-in or add-on based upon a commercially available language translation program.

In yet another embodiment, the computer-aided inventing environment 120 of FIG. 2A may also include a patent application database, preferably in communication with the patent application generator 245. The patent application database would contain fields corresponding to portions of the patent application 247, as well as other informational fields. The fields can be populated directly from the specific embodiments database 277, from the patent application generator 245, or from the patent application 247, or may be manually entered.

The fields corresponding to the patent application 247 may include one or more of the Title, Cross-reference to Related Applications, Federally Sponsored Research, Background of the Invention; Summary of the Invention; Brief Description of the Drawings, Detailed Description of the Invention, Sequence Listing, Claims, Abstract, and Drawings. In one aspect of this embodiment, certain of these fields may be broken down further. For example, the patent database may contain fields breaking down the Background of the Invention into: field of the invention, prior art and objects and advantages of the invention. The Detailed Description may be broken down into fields for description of preferred embodiment, operation of preferred embodiment, description of additional embodiments, operation of additional embodiments and conclusion, ramifications and scope of the invention. The claims may be broken down into independent claims and dependent claims. The drawings may include a further field for reference numbering used for elements in the drawings.

The informational fields may include one or more of: internal docket number and name, date filed, serial number, prosecution status, licensing status, assignment status, sales and licensing revenue, inventor names, conception date, distinctions from the prior art, patent number and related applications, such as foreign counterparts. FIG. 2I-6 depicts an illustrative embodiment of a patent application database 299 that may be included in this invention.

In another aspect, the drawings and the claims may be present in separate databases from the rest of the above information.

The computer aided inventing environment 120 of FIG. 2A may also include a prior art searching tool for 249. The prior art searching tool 249 may be in communication with the modeling environment 210 and/or the innovation database 250 by any suitable communication or interface mechanisms or means known to one ordinarily skilled in the art. From the selection and storage of morphed baseline entities and from any information or data available in the innovation database 250 as will be described in further detail below, the prior art searching tool 249 can search any type of information or data source for patents, patent applications, publications and any other printed reference. In some embodiments, the prior art searching tool 249 may use any suitable interface mechanisms and means to perform prior art searching over the Internet, such as XML or web-services. In one embodiment, the prior art searching tool 249 may perform a search of the patent and patent application databases available via the searching utilities of the web site of the United States Patent and Trademark Office at www.uspto.gov.

In other embodiments, the prior art searching tool 249 may search any foreign patent office web site, such as www.epo.org or www.wipo.net, or any other storage location accessible or available over the Internet comprising prior art related references. In other embodiments, the prior art searching tool 249 uses any search engines available over the Internet, or any search engine tools or utilities, to perform searching on the Internet for prior art references. For example, the prior art searching tool 249 may perform a prior art reference search using the web site or any search tools manufactured by Google, Inc. of Mountain View, Calif.

In other embodiments, the prior art searching tool 249 may perform searches on any type of device readable medium accessible via the computing device 102 of the computer aided inventing environment 120, such as a DVD-ROM or a CD-ROM comprising prior art references. In a further embodiment, the prior art searching tool 249 may perform searches on any type of storage accessible via the computing device 102 of the computer aided inventing environment 120, such as a local hard-drive, or a file system of another computing device in a network.

In performing prior art searches, the prior art searching tool 249 may use any type of keywords to perform the search. In an exemplary embodiment, the prior art searching tool 249 uses keywords associated with selected embodiments of morphed baseline entities generated or provided by the computer aided inventing environment 120 of the present invention.

As will be described in further detail below, selected embodiments of morphed baseline entities may be stored in a database with data describing elements of the entities. This data can be used to provide any type of combination of one or more keywords for performing a search.

Figure 7:
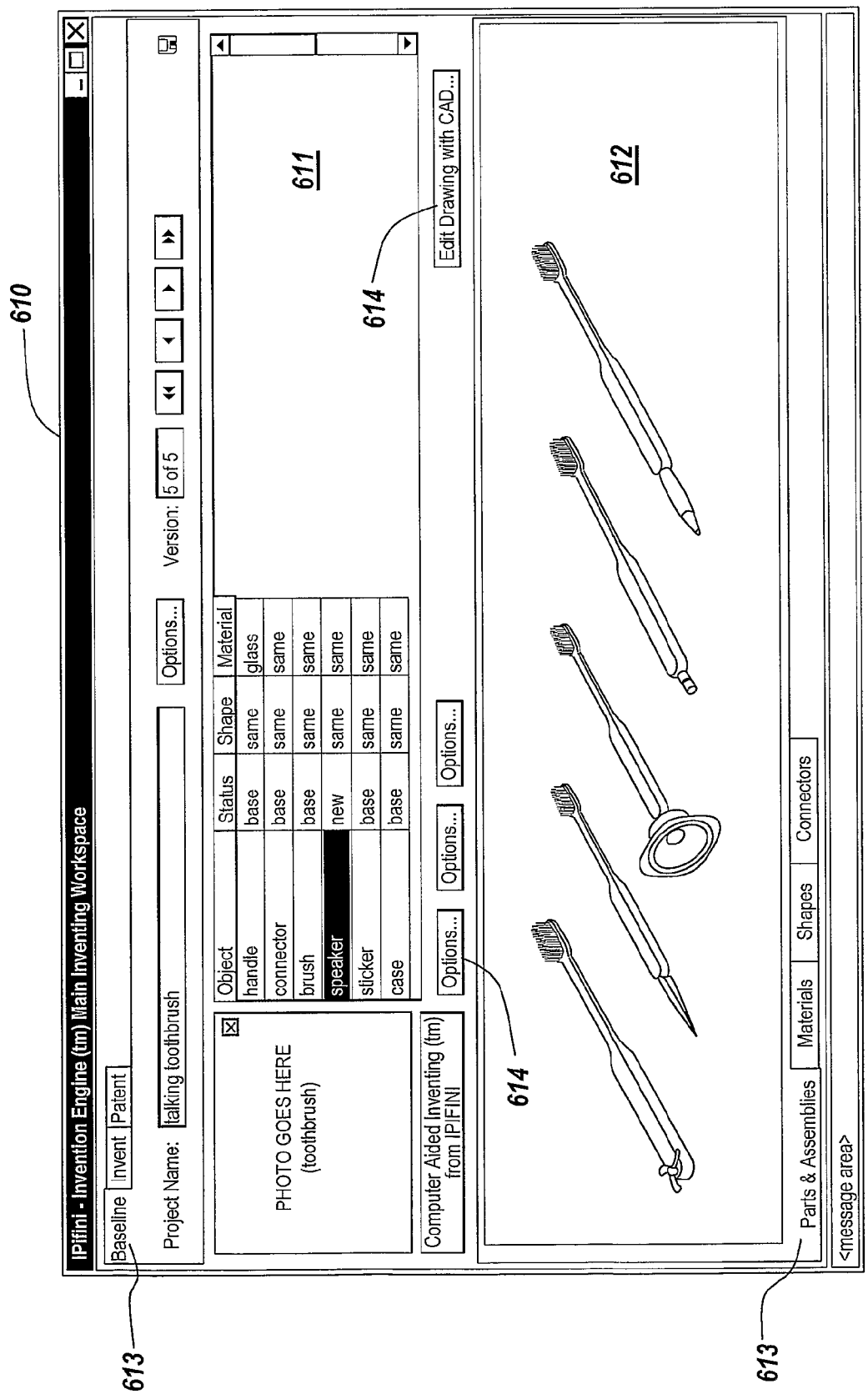
FIG. 7 depicts an illustrative embodiment of a user interface for applying a morph in practicing the present invention.

For example, referring to FIG. 7, an "insert new object" morph has been applied to a toothbrush to add a speaker to the toothbrush. The prior art searching tool 249 will interface with the modeling environment 210 and/or the innovation database 250 to generate the search string "(ABST/toothbrush AND ABST/speaker) or (ACLM/toothbrush AND ACLM/speaker)" and submit that search string to the USPTO patent search server and published application search server. If the added object may also be designated by alternate terms (e.g., entries in the synonyms field of the record for that object), the search string will include those synonyms in the search string using the OR operator. Analogous search strings would be generated for submission to other sites to search for published patents and applications.

Figure 2B:
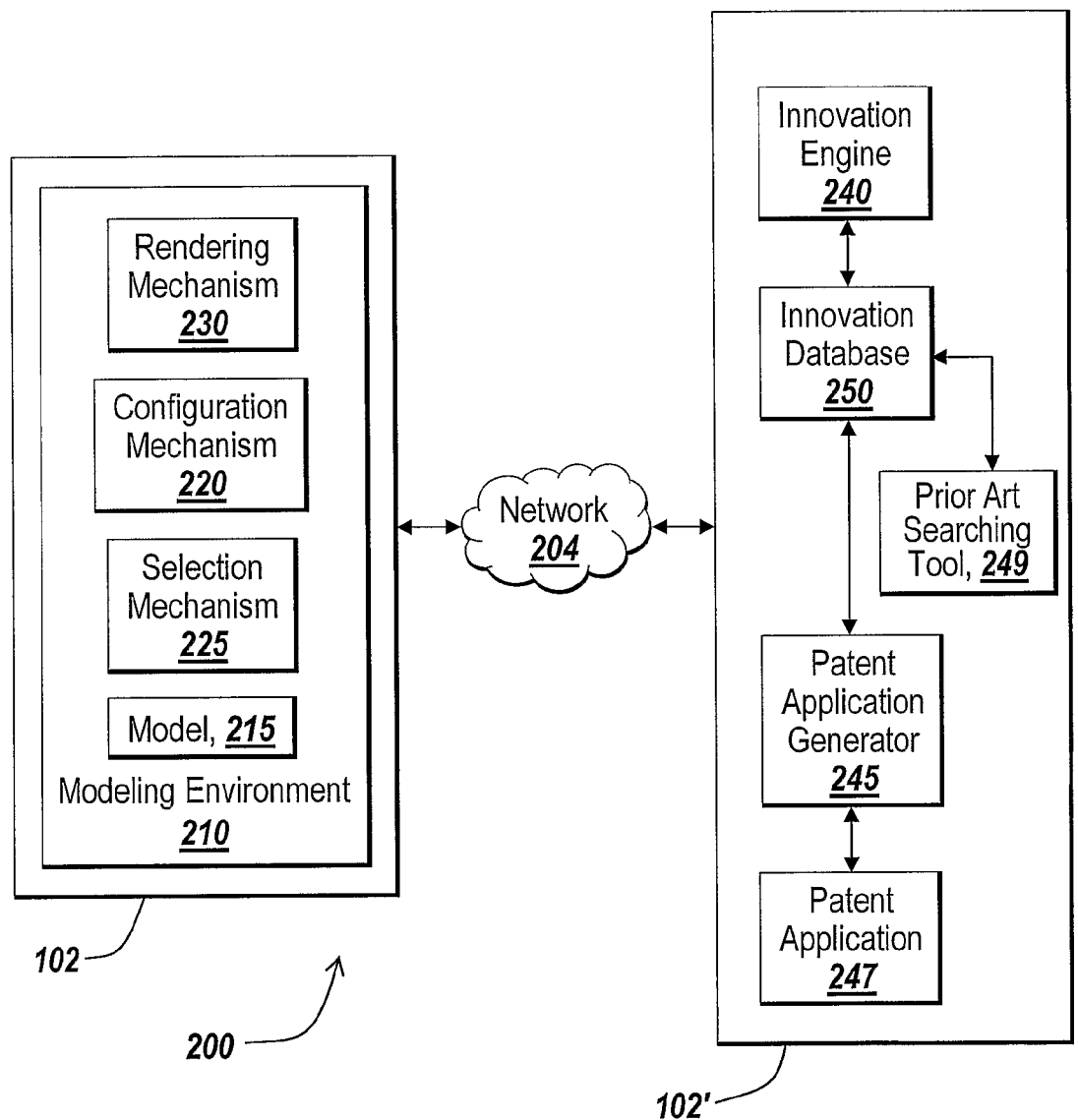
FIG. 2B is a block diagram of an illustrative embodiment of the present invention distributed in a network of multiple computing devices.

FIG. 2B depicts another environment suitable for practicing an illustrative embodiment of the present invention, wherein the modeling environment 210, the innovation engine 240, and the innovation database 250 is deployed in a networked computer system 200. In a broad overview, the networked system 200 depicts a multiple node network 204 for running in a distributed manner the modeling environment 210, the innovation engine 240 and innovation database 250 of the present invention. The system 200 includes multiple computing devices 102-102', which may generally be referred herein as computers, connected to and communicating over a network 204. The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices communicate may be a bus, star, or ring network topology. The network 204 and network topology may be of any such network 204 or network topology capable of supporting the operations of the present invention described herein.

The computers 102-102' can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections). The network connection and communication protocol may be of any such network connection or communication protocol capable of supporting the operations of the present invention described herein.

In the network 204, each of the computers 102-102' are configured to and capable of running at least a portion of the present invention. As a distributed application, the present invention may have one or more software components that run on each of the computers 102-102' and work in communication and in collaboration with each other to meet the functionality of the overall operations of the present invention as described herein. Each of the computers 102-102' can be any type of computing device as described in connection with FIG. 1, and respectively configured to be capable of computing and communicating the operations described herein. For example, any and each of the computers 102-102' may be a server, a multi-user server, server farm or multi-processor server. In another example, any of the computers 102-102' may be a mobile computing device such as a notebook or PDA. One ordinarily skilled in the art will recognize the wide range of possible combinations of types of computing devices capable of communicating over a network.

The network 204 and network connections may include any transmission medium between any of the computers 102-102', such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by any of the computers 102-102' to practice the present invention.

Each of the computers 102-102' may be configured to and capable of running the modeling environment 210, the innovation engine 240, the innovation database 250, the patent application generator 245 or the prior art searching tool 249. The modeling environment 210, the innovation engine 240, the innovation database 250, the patent application generator 245 or the prior art searching tool 249 may run together on the same computer 102, or may each run separately on different computers 102 and 102'. The innovation database 250 may also run on a computing device 102 different than the computing device 102' of the innovation engine 240.

Furthermore, the modeling environment 210, the innovation engine 240, the innovation database 250, the patent application generator 245 or the prior art searching tool 249 can be capable of and configured to operate on the operating system that may be running on any of the computers 102 and 102'. Each computer 102-102' can be running the same or different operating systems. For example, computer 102 can be running Microsoft® Windows, and computer 102' can be running a version of UNIX, and computer 102", a version of Linux. Or each computer 102-102' can be running the same operating system, such as Microsoft® Windows. Additionally, the modeling environment 210, the innovation engine 240, the innovation database 250, the patent application generator 245 or the prior art searching tool 249 can be capable of and configured to operate on and take advantage of different processors of any of the computing devices 102. For example, the modeling environment 210 can run on a 32 bit processor of one computing device 102 and a 64 bit processor of another computing device 102'. Furthermore, the modeling environment 210 and/or the innovation engine 240, and/or the innovation database 250, and/or the patent application generator 245, and/or the prior art searching tool 249 can operate on computing devices that can be running on different processor architectures in addition to different operating systems. One ordinarily skilled in the art will recognize the various combinations of operating systems and processors that can be running on any of the computing devices.

Although depicted in the system 200 of FIG. 2B with a single modeling environment 210, innovation engine 240, innovation database 250, patent application generator 245, and prior art searching tool 249, one or more modeling environments 210, innovation engines 240, innovation databases 250, patent application generators 245, and prior art searching tool 249 may be running on one or more computing devices 102 to practice the present invention in a distributed manner. Each and any of the multiple copies of the modeling environment 210, the innovation engine 240, innovation database 250, patent application generator 245, and prior art searching tool 249 may communicate over the network 204 by any suitable interfacing means or mechanisms to perform the operations described herein in a distributed manner.

In summary, one ordinarily skilled in the art will appreciate that the modeling environment 210, the innovation engine 240, the innovation database 250, patent application generator 245, and prior art searching tool 249 may be deployed across a wide range of different computing devices, different operating systems and different processors in various network topologies and configurations. One ordinarily skilled in the art will further appreciate the various ways the present invention may be distributed in a networked system 200, and how any of the components of the present invention may communicate with each other.

Figure 2C:
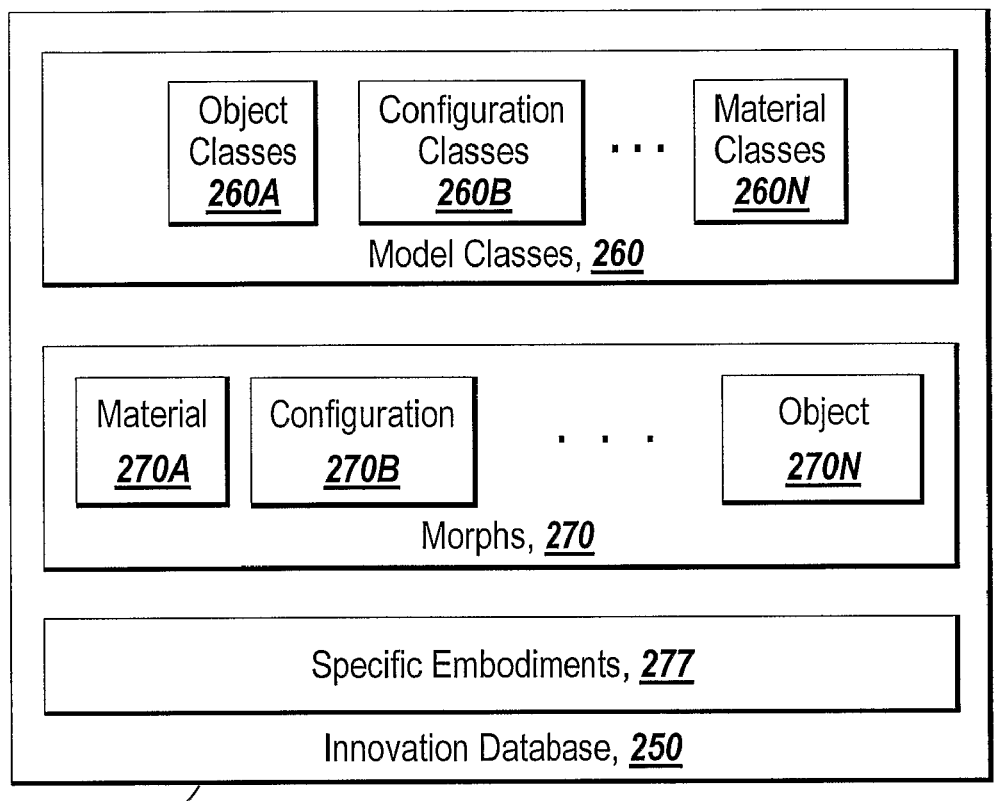
FIG. 2C is a block diagram of an illustrative embodiment of the innovation database of the present invention.

In one aspect, the present invention is directed towards an invention lexicon database to support and drive the computer aided inventing system. Referring now to FIG. 2C, illustrative embodiments of the present invention of the innovation database 250 is depicted. The innovation database 250 comprises or otherwise provides the invention lexicon database. As such, the innovation database 250 provides a knowledge base of words, data, items, processes, and any other suitable entity in the vocabulary of a language for systematic inventing in accordance with the present invention. In one aspect, the innovation database 250 comprises a terminological ontology. As such, the innovation database 250 provides a specification of how to represent the objects, concepts, and other entities that exist in the area of inventing and the relationships that are held among them.

The contents of the innovation database 250 provide data and information for supporting and driving the definition of models 215, for applying changes to the models 215 through morphing, for storing selected embodiments of morphed models, and for otherwise supporting the systematic approach to inventing of the present invention. The following description of an exemplary structure of the innovation database 250 is provided for illustrative purposes. As one ordinarily skilled in the art will appreciate, any other suitable data structures and organization may be used to form the innovation database 250 of the present invention.

Figure 2D:
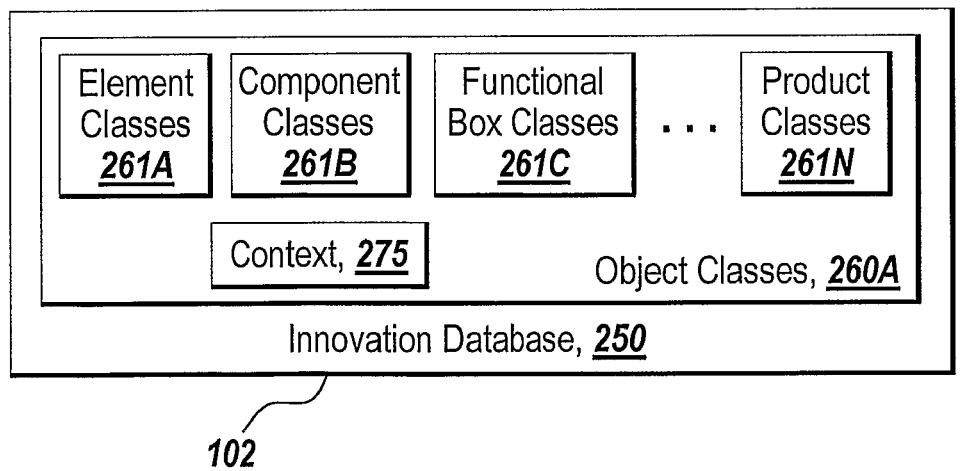
FIG. 2D is a block diagram of another illustrative embodiment of the innovation database of the present invention.

The innovation database 250 may include data associated with model classes 260 and morphs 270. Depending on the implementation of the innovation database 250, the data may be organized in files, tables, or other storage structures. For example, in an exemplary embodiment of a relational database, each of the model classes 260 and morphs 270 may be a set of one or more database tables. The model classes 260 portion of the innovation database 250 may further include object classes 260a, configuration classes 260b and materials classes 260n. The model classes 260 may also include a context 275 portion of the innovation database 250. The morphs database 270 may include material morphs 270a, configuration morphs 270b, and object morphs 270n, which may be referred together as morphs 270. As depicted in FIG. 2D and for the exemplary illustration of the innovation database 250, the object classes 260a may further include element classes 261a, component classes 261b, functional box classes 261c, and product classes 261n. Although the innovation database 250 is shown with model classes, 260 and morphs 270 in a certain arrangement, any arrangement may be used.

Furthermore, other types of classes and sub-classes for the model classes 260 and morphs 270 portion of the innovation database 250 may be used for practicing the present invention. Moreover, each of the classes 250 and 260 and any sub-classes may be implemented in separate databases of different types or the same type, on the same or a different computing device. In the illustrative examples of the innovation database 250 to follow, records and/or fields of the innovation database 250 may be described using tabular form such as tables depicted in FIGS. 2E-2I. Although depicted in tabular form, the records and fields may be arranged in the innovation database 250 in any suitable manner. In particular, records and fields of the innovation database 250 may be organized into levels, or groups, to form a hierarchy. A hierarchy provides a classification of relationships in which each item except the top one is a specialized form of the item above it. Each item can have one or more items below it in the hierarchy. A first or top level may represent the highest or top level description of a group. The one or more levels below the top level provide a graded series of order by which data can be arranged by a ranking, specialization, characteristic or other relationship. For example, a top level category may be materials with wood being a second level and cherry wood a third level to form a portion of a hierarchy of materials. Alternatively in the materials example, wood may be considered a top level or near top level category, with cherry word being a second level. A top level class may be referred to as a primary class or primary level, and a sub-class as a secondary class or secondary level and likewise for further subclasses, e.g., tertiary, quaternary . . . etc.

In one embodiment, a field of a record in the innovation database 250 may be used to indicate the name and/or number of a level of a category, i.e., a hierarchy, to which the record is associated with. Since a record may be associated with different categories at different levels, in other embodiments, there may be multiple fields of a record to describe the names and/or numbers of the category levels for which the record is associated with. In some embodiments as depicted in FIGS. 2I-1 through FIGS. 2I-4 described below, the record may have a hierarchical level field to indicate what hierarchical level the record represents, such as primary, secondary, tertiary, etc., or 1, 2, 3, 4 etc. For example, a material record in the materials classes 260n may represent the secondary class of oak wood which is associated with the primary class of wood. In this case, the hierarchical level field may indicate the record for the type of material is for a secondary class, e.g., the field has a value of secondary or 2. Additionally, the record for oak wood in the material classes 260n may also include a next higher level class to indicate the name of the next higher class level to which the oak wood record is associated with. In the case of oak wood, the next higher level class may be the primary class of wood and the next higher class level field of the oak wood record may be set to reference the primary wood class. Furthermore, one ordinarily skilled in the art will recognize that there are various database techniques to provide keys, indexing and normalization of databases to provide a hierarchical representation of data and associating data with different and multiple groups and/or class levels.

The hierarchical representation of data in the innovation database 250 is useful for filtering data from the innovation database 250 to apply in operation of the present invention as described in detail below. For example, the hierarchical data representation, e.g., groups and sub-groups, allows the user and/or the computer aided inventing environment 120 to select and apply data at different levels of breath or granularity. Additionally, the hierarchical data representation provides for limiting the selection of the vast array of data that may be stored in the innovation database 250 in an ordered, logical or desired manner. In an exemplary embodiment, there may be five or less levels in the hierarchical representation of data in order to provide a more user friendly or manageable hierarchy.

The material classes 260n of the innovation database 250 illustrated in FIG. 2C may provide an extensive and exhaustive list of different types of materials that may be used in an invention being systematically generated in the modeling environment 210. The materials classes 260n may be used for defining a model 215 by providing a list of materials to the modeling environment 210 for a user to select from to associate with a model 215 or an object of the model 215. Furthermore, the materials classes 260n may provide substitute and/or alternative materials to use for a component or element of the model 215 to assist in creating an invention.

The table 280 of FIGS. 2E1 through 2E3 provides an illustrative example of the list of materials that may be provided in the materials classes 260n section of the innovation database 250. In one embodiment, the system of the invention comprises a materials database comprising at least 40, 50 or 70% of the materials listed in FIGS. 2E1 through 2E3. In a preferred embodiment, the system comprises a materials database comprising at least 80% of the materials listed in FIGS. 2E1 through 2E3. Even more preferred is a materials database that comprises at least 90% of the materials listed in FIGS. 2E1 through 2E3. Most preferred is a materials database that comprises all of the materials listed in FIGS. 2E1 through 2E3. The table 280 of FIG. 2E is a small sample of the types of materials or class of materials that may be represented in the materials classes 260n. One ordinarily skilled in the art will recognize and appreciate that materials classes 260n portion of the database 250 may comprise a much more extensive listing that includes an exhaustive list of all known materials that may be applied during the systematic invention process of the present invention. Although shown as a single column list in table 280 that may depict either a top level or near top-level category, the materials classes 260n may be further organized into groups of materials, with sub-classes including specific types of that material. For example, the material class of wood may represent a class of wood materials, with sub-classes for pine, oak, cherry, etc. In another example, steel may represent a material class with stainless steel being a sub-class or type of steel.

Furthermore, for any of the materials listed in the material classes 260n there may also be other information stored and associated with each material either at a class or sub-class level. In one embodiment, the material classes 260n database may include a performance characteristic, operational characteristic, quality attribute, or any other attribute or characteristic of each material. FIG. 2I-1 depicts an illustrative table 291 providing examples of fields for a record representing a material in the material classes 260n database. The illustrative table 291 may identify the material record by name, date entered, description, color and a unique serial number. Additionally, the material record may include one or more fields to identify the hierarchical class level the material is associated with. Furthermore, illustrative table 291 may include one or more fields to indicate and describe the novelty, attractiveness, typical functionality and any other material related attribute, such as a user specified attributes. In the case of mixture based materials, the illustrative table 291' of FIG. 2I-1 shows additional and/or alternative fields that may be used to describe the mixture type, the components in the mixture, a value of the component, such as a quantity value related to a unit of measurement, and a percentage range of the component of the mixture. In one embodiment, this additional information may indicate whether the material may be useful to use in certain circumstances or in other cases not useful to use. For example, liquid crystal temperature sensitive colored plastics would have a high score for products marketed to children.

The configuration classes 260n of the innovation database 250 illustrated in FIG. 2C may provide an extensive and exhaustive list of different types of configurations that may be used in an invention being systematically modeled and generated in the modeling environment 210. The configuration classes 260n can be used to identify the arrangement of one or more objects in a model 215 in the modeling environment 210 or for suggesting or otherwise providing substitute or alternate configuration for the entity of the model 215 from which to generate inventions. The table 282 shown in FIG. 2F provides an illustrative example of the list of configuration that may be provided in the configuration classes 260n section of the innovation database 250.

Thus, according to another embodiment, the system of this invention comprises a configurations database comprising at least 40, 50 or 70% of the configurations listed in FIG. 2F. In a preferred embodiment, a system of this invention comprises a configurations database comprising at least 80% of the configurations listed in FIG. 2F. Even more preferred is a configurations database that comprises at least 90% of the configurations listed in FIG. 2F. Most preferred is a configurations database that comprises all of the configurations listed in FIG. 2F. One ordinarily skilled in the art will recognize and appreciate that configuration classes 260n portion of the database 250 may comprise a much more extensive listing that includes an exhaustive list of all possibly desired configurations that may be applied during the systematic invention process of the present invention. The configurations classes 260b may be further organized into groups of configurations, with sub-classes representing a set or group of configurations such as pyramid type configurations. For example, a linear array class of configuration may represent a class of linear array configurations, with a sub-class for a curved linear array or another shaped linear array.

Furthermore, for any of the configurations listed in the configuration classes 260b there may also be other information stored and associated with each configuration either at a class or sub-class level. In one embodiment, the configuration classes 260b database may include a performance characteristic, operational characteristic, quality attribute, or any other attribute or characteristic of each material. FIG. 2I-2 depicts an illustrative table 292a providing examples of fields for a record representing a configuration in the configuration classes 260b database. The illustrative table 292a may identify the configuration record by name, date entered, description, image, and a unique serial number fields. Additionally, the configuration record may include one or more fields to identify the hierarchical class level the configuration is associated with. Although not shown in illustrative table 292a, the configuration records may also include one or more fields to indicate and describe the novelty, attractiveness, typical functionality and any other material related attribute, such as a user specified attributes. Illustrative table 292b depicts additional fields associated with the configuration record to describe positional and orientation coordinates of the configuration. The positional and orientation coordinates are used to identify the configuration of an object of a model 215 in relation to a reference coordinate system and scale. These characteristics and/or attributes may indicate how useful the configuration is to use in certain circumstances or in other cases not useful to use.

The object classes 260n of the innovation database 250 illustrated in FIG. 2C may provide an extensive and exhaustive list of different types of elements, components, products and contexts that may be applied to an invention being systematically generated in the modeling environment 210. The object classes 260n can be used to identify and/or describe objects of an entity represented by a model 215 in the modeling environment 210. Additionally, the object classes 260n may provide a source of data for suggesting or otherwise providing substitute, alternate, or additional types of objects for the entity of the model 215 from which to generate inventions. Furthermore, the context 275 may provide a contextual environment in which the entity under consideration for inventing can be applied.

As the object classes 260a can represent a very vast array of existing products, components and elements of any thing or process from which to form a knowledge base for practicing the present invention, the object classes 260a is described in three parts as shown in FIG. 2D. Since a component of one entity can be a standalone product or product on its own accord, a product class listing may also be listed as a component class and vice-versa. In a similar manner, a component of an entity may also be considered an element or feature of the entity, and therefore a component class listing may also be included in the element class.

It should be noted that the object classes 260a are not limited to physical objects. For example, virtual objects, such as operating systems (Microsoft Windows™, Unix, Linux, MacOS, etc.), programs (word processing, photo editing, drawing, spreadsheets, databases) and features of programs (spell checker, calculator, a search window, graphics file viewer) are also object classes that may utilized with the system and method of this invention. These objects also have a hierarchal nature (Operating System->Programs->Features) that is employed when they are included in the objects class.

The Table I provides an illustrative example of the list of object classes and the class types that may be provided in the model classes 260 portion of the innovation database 250 by any of the elements classes 261*a*, component classes 261*b*, product classes 261*n* and the context 275. Table I is an illustrative example of the types of objects and object classes that may be represented in the objects classes 260*a* portion of the innovation database 250.

TABLE I

| Objects (Elements, components, products and contexts) |
|---|
| Accounting |
| Advertisement |
| Aerosol Sprayer |
| Air compressor |
| Air curtains |
| Air Freshener |
| Air fresheners |
| Air Purifier |
| Air Traffic Control Equipment |
| Air tube transporting system |
| Aircraft |
| Alarm Clock |
| All Terrain Vehicle or ATV |
| Alphanumeric Character |
| Ambulance |
| Ambulance |
| Ammunition |
| Amusement Park |
| Anchors |
| Animal |
| Antenna |
| Arcade |
| Array (grid) |
| Art Studio |
| ATM |
| Auction |
| Audio-visual Playback Device |
| Auditorium |
| Automobile Parts and Accessories |
| Awnings |
| Baby Bottle |
| Bag |
| Bank |
| Bar |
| Barbeque |
| Basket |
| Bathing items |
| Bathroom |
| Bathroom Fixtures |
| Battery |
| Battlefield |
| Beach |
| Beauty Salons |
| Bed |
| Bedding |
| Bedroom |
| Belt (as in for motors) |
| Belt, Utility |
| Biking |
| Birth Control Devices |
| Bladder |
| Blade |
| Blocks |
| boating |
| Bowling |
| Box |
| Bracket |
| Brake |
| Bricks |
| Bridge |
| Bristle or Hair or fiber |
| Broadcasting Studio |

TABLE I-continued

| Objects (Elements, components, products and contexts) |
|---|
| Brokerage House |
| Brush |
| Bump |
| Bumper |
| Business Meeting |
| Buzzer, ringer, bell |
| Cabinet |
| Cable Box |
| Cable in sheath |
| Calculator |
| Camera |
| Candle |
| Capacitor |
| Cards |
| Cart |
| cartridge |
| Case |
| Cash Register |
| Casting |
| Catch |
| Celebration |
| Cemetary |
| Centrifuge (tumbler) |
| Chair |
| Channel |
| Chassis |
| Chemical or biological test (diagnositc, or assay) kits |
| Circle or loop |
| Circuit Board |
| Clamp |
| Clamp |
| Cleaners and disinfectants |
| Cleaning |
| Cleaning Implement |
| Cleat |
| Clock |
| Closet/dressing room |
| Clothing |
| Clothing Accesory |
| Cognitively Impaired Person |
| Column |
| Communication Connection |
| Compressed Gas Tank |
| Computer |
| Computer Peripherals |
| Computer Software |
| Computer Terminal |
| Concert |
| Condenser |
| Cone |
| Construction Site |
| Contact Lens |
| Container |
| Controller |
| Conveyer Belts |
| Cooler, Camping |
| Cooling Device |
| Cord |
| Cord or line Retractor |
| Corner |
| Cosmetics |
| Counseling |
| Cranes |
| Crank |
| Credit Card |
| Credit Card Processor |
| Cribs |
| Crowds |
| Cuff |
| Currency |
| Curve |
| Cutting Device |
| Cylinder |
| Dairy Products |
| Dart Board |
| Data backup systems |
| Data cable |

TABLE I-continued

Objects (Elements, components, products and contexts)

Data hub
Data port
DC to AC converter
Deck, (as in backyard)
Decorative Figure
Dehumidifier
Demagnetizer
Dental Care devices
Dental Devices
Dental Office
Dentist Equipment and supplies
Detention Facility
Diaper
Digital Memory Device
Digital Memory Media
Dining room
Diode
Disaster
Disk (Wheel)
Display
display adapter
Display, promotional
Distance Measuring Device
Dome
Door
Door Mat
Drawer
Drill
Drive Shaft
Driving
Drug Deliverer
Dry Cleaning Equipment
Duct
Eating Utensils
Edge
Educational tools or equipment
Electrical Meter
Electric wire
Electrical adapter
Electrical Generator
Electrical Power Outlet
Electrode
Electronic logic element
Electronic Signal Modulators
Environmental Sensor
Exercise Device
Exhaust System
Extruder
Facial Systems
Factory
Fan
Farming Equipment
Fasteners
Faucet
Fence
Fiber optic cable
File Cabinets
film
Filter
Fire
Fire Detector
Fire suppression equipment
Fire Truck
First Aid Supplies and Equipment
Fishing
Flag
flap
Flexible rod
Float
Flowers
Food
Foot Spa
Footwear
Forensic Equipment
Freeze Drier
Fruits and Vegetables
Fuel system
Funeral
Fungi
Funnel
Fur
Furniture
Fuse
Gambling
Gardening
Gas Station
Gauge
Gear
Glasses, Eye
glide
Grill
Grooming Instrument
Groove
Grout
Guide (as in paper guide)
Gutter
Gym
Gynecological goods
Hair Care products
Hammer
Hammock
Hand Tools
Hand Truck
Handle
Hardness tester
Hazardous Waste Remediation Equipment
Head Phone
Hearing aids
Heat Sink
Heating Element
Heavy Construction Equipment
Helix
Hiking
Hinge
Home
Home, building or site Security System
Home Health Care Supplies and Equipment
Home Medical Equipment
Hook
Horn
Horse shoe
Hose
Hose clamp
Hot tub
Hot Weather
Hotel
House of Worship
Household Appliances
Housing (as in a case)
Humidifier
Hunting
Ice
Ice Skating
Inclement Weather
Infrared Receiver
Infrared Transmitter
Ink Cartridge
Input device
Insulation
Interface (connector)
Interior (core)
Internet Connection
ionizer
Irrigation Equipment
Jet
Jewelry
Jogging
Joint
Key
kitchen TABLE I-continued Objects (Elements, components, products and contexts)

Label
Lamp
Land Vehicle
Laser
Laser Lithography device
Laser Pointer
Latch
Laundry room
Law
Law enforcement
Lawn
Lawn and Garden Items
Lead (electrical)
Lecture
Legal or Official
Documents
Lens
Lever
Library
LIDAR. A laser-based radar system
Light
Light Detector
Line
Lock
Lubricating or cooling agent
Luggage
Lunch Box
Magic Shows
Magnet
Magnetizer
Manifold
Manufacturing Plant
Massage Device
Meat and fish
Medical Devices
Medical Diagnostic Laboratories
Medical Equipment
Medical Exam Room
Medical Imaging Devices
Medical Supplies
Metal Detector
Microbe
Microphone
Microscope
Microwave receiver
Microwave transmitter
Mine
Mining and Prospecting
Mirror
Mirror, inspection
Mixer
Mobility Devices
Modem
Motion Sensor
Motor
motorcycling
Mountain climbing
Movie Set
Movie Theater
Movie Theater
Muffler
Museum
Musical Instruments
Nail Care Products
Net
Night vision scope or goggles
Noise Control Product
Nozzle
Nuclear Reactor
O-ring
Office
Office Supplies
Opening or Hole
Outdoor leisure activity Outer body (as in car body)
Oven
Packaging
Pager or Beeper
Paintings
Pallets
Paper Written Materials
Parachute
Parking Facilities
Parking Meters
Passenger Airline
Passenger Airplane
PDA
Person
Pet
Pet enclosure
Phone
Phone Answering Device
Photo resistor
Photovoltaic Cell (solar cell)
Physiology Monitoring Device
Pin
Piston
Plane
Plants
Plastic bag
Plating or armor
Play Structure
Playroom
Plug, electrical
Plug, stopper
Plumbing
Plumbing
Plunger
Police Car
Pollution Control Equipment
Polygon
Pool or hot tub
Pool, Swimming
Portable toilets
Ports
Postal Equipment
Potentiometers
Printer
Processing Chip
Propeller
Prosthetic Devices
Proximity Switches
Pull
Pulley
Pump
Pyramid
Radar Detector
Radio
Radio Frequency receiver
Radio Frequency transmitter
Raft
Railroad
Ramp
Ratchet
Rectifier (electronic)
Realer
Rehabilitation
Relay
Religious Items
Remote Controller
Remote controlled vehicle
Research Laboratory
Restoration Service
Restaurant
Rheostat
Ridge (rib)
Rim
Ring
River

TABLE I-continued

Objects (Elements, components, products and contexts)

Road
Roads and driveways
Roadway
Roadway Traffic Control Equipment
Robotic Arm
Rocket
Rod
Roller
Roof
Rope, Chain, or Cable
Router
RPM Gauge
Rubber band
Rug
Safety Screen
Satellite
Satellite Radio Receiver
Scaffolding
Scale
School
Scientific Instrument
Scoop
Scraper
Screen
Security Checkpoint
Security Scanner (baggage)
Security Scanner (for people)
Seeds
Self contained robot
Sensor, Contact Sensor
Sensory Impaired Person
Sheet
Sheet (Paper or plastic)
Shelf
Shipping supplies
Shopping
Shovel
Shower
Shutter
Shutter
Sidewalk
Sifter
Signs
Simple Tools
Simulators (as in flying or driving)
Sink
Skiing
Skin Care Compounds
Sleeve
Snow Removal Equipment
Snowmobiling
Software
Sorting Facility
Sound effects generator
Sound meter
Space Satellite
Space Ship
Speaker
Speedometer
Speedometer
Sphere
Splitter
Sponge
Sports Equipment
Sports Field
Spout
Spring
Squeegee
Stairs
Stand
Stationery and writing supplies
Sticker
Stop
Storage items
Strainer
Strap
Stroller
Structure (as in builidng or tower)
Subsurface
Suction cup
Suction Producing Device
support arm
Surface
Surgical Instrument
Surgery Theater
Surveillance equipment
Switch
Symbol
Syringe
Tanker Trucks
Tape or Ribbon
Tattooing Device
Telecommunications infrastructure
Telephone
Telescope
Telescoping rod or handle
Tent
Textile
The Ground
Thermocouple
Thermometer
Thermostat
Thread
Tie
Tile
tilt detectors
Timer
Tip
Tobacco
Toiletries
Touch Sensitive Surface
Tow truck
Tower
Toxic Waste Site
Toys
Track
Tracking device
Train
Transformer
Transistor
Transmission
Trash Receptacle
Travel
Travel Goods
Tray
Tube
Tunnel
Turbine
Turbine
Turn table
TV
Ultrasonic detector
Ultrasonic source
Undergarments
Underwater
Utility Infrastructure
Valve
Vanity
Vending Carts
Vending Machine
Vent
Vibration Generator
vibration meters
Video Game (arcade type)
Video Game (consol)
Virus
Visible Light Signal Receiver
Vitamins and supplements
Wagon
Wall Coverings
Warehouse TABLE I-continued Objects (Elements, components, products and contexts)

Waste and Sewage systems
Watches
Water Bottle
Water Detector
Water Heater (household)
Water Treatment Equipment
Water Vessel
Waterfall
Weapon
Weather instruments
Wedge
Weight
Wheel
Winch Hoist
Windmill
Window
Window Treatments
Windup Mechanism
Wing
Writing Instrument
X-ray Detector
X-ray source In one embodiment, the system of the invention comprises an objects database comprising at least 40, 50 or 70% of the objects listed in Table I. In a preferred embodiment, the system of this invention comprises an objects database comprising at least 80% of the objects listed in Table I. Even more preferred is an objects database that comprises at least 90% of the objects listed in Table I. Most preferred is an objects database that comprises all of the objects listed in Table I.

In another embodiment, the system of this invention comprises an objects database comprising at least 40, 50 or 70% of the objects listed in each of the class types: component, product, product/context, product/component, element/component, element/product/component and product/context/component in Table I. In a preferred embodiment, the system of the invention comprises an objects database comprising at least 80% of the objects in each of the class types listed in Table I. Even more preferred is an objects database that comprises at least 90% of the objects in each class type listed in Table I. The class type product/context includes objects classified as either product/context or context/product. The class type component/product includes all objects classified as either component/product or product/component.

One ordinarily skilled in the art will recognize and appreciate that the objects classes 260n portion of the innovation database 250 may comprise a much more extensive listing that includes an exhaustive list of all possibly desired objects and object classes 260a that may be applied during the systematic invention process of the present invention. For example, any of the object classes 260a may be defined in accordance with the art groups and technology classifications provided by the United States Patent and Trademark Office. In another example, the object classes 260a may be configured to have one or more of the products, parts or components provided by any one or more retailers or wholesalers such as Wal-Mart Stores, Inc. of Bentonville, Ark., The Home Depot, Inc. of Atlanta, Ga., or Toys "R" Us, Inc of Wayne. N.J. In yet another example, the object classes 260a may be configured to have products, parts or components provided by a food retailer or wholesaler, garden store, or any type of catalog such as an automobile catalog. Additionally, the object classes 260a may include any categories defined by any of the local Yellow Page books provided by a local telephone company, or provided by the YellowPages.com Inc. of Henderson, Nev. In another embodiment, the object classes 260a may include CAD parts libraries. These libraries may be accessed on the worldwide web (e.g., www.3Dcontentcentral.com). In yet further embodiments, the object classes 260a may include a company's list or inventory of products so that the computer aided inventing system of the present invention may be directed to improving the company's products. For example, a scientific reagent company may list all of their products in an effort to put together novel kits containing multiple reagents, as well as possibly other objects already in the innovation database 250. One ordinarily skilled in the art will recognize and appreciate the vast amount of products, components and elements that may be populated in the innovation database 250.

The object classes 260a may be further organized into groups of products, elements and components, with subclasses representing a set or group of each class. Each class may be referred to as a primary class and a sub-class as a secondary class. In one embodiment, the object classes 260a database may include a performance characteristic, operational characteristic, quality attribute, or any other attribute or characteristic of each product, component, element or context. These characteristics and/or attributes may indicate the usefulness or non-usefulness of using the type of object. FIG. 2I-3 depicts an illustrative table 293 providing examples of fields for a record representing an object in the objects classes 260a database. The illustrative table 293 may identify the object record by name, date entered, description, image, a unique serial number and type of object fields. The type of object field may indicate whether the object is a component, element (or feature), a product, a functional black box or a context. Additionally, the object record may include one or more fields to identify the hierarchical class level the object is associated with. Additionally, the object record may also include one or more fields to indicate and, describe the novelty, attractiveness, cost, size, typical functionality, typical field of use, synonyms, and any other object related attribute, such as a user specified attributes.

One example of such a user-specified attribute are pre-existing part descriptions and properties that are present in CAD programs, such as SolidWorks.

In another embodiment, an object record or a material may also include a field for enablement references. Such a field is used in conjunction with a patent application generator 245 which can access and insert the references in that field into the generated patent application to help describe the invention in an enabling manner. For example, if a morphed baseline entity incorporated a silicon coating, the material record for silicon would include in the enablement references field a citation to art describing methods of coating a surface with silicon. If enablement references do not exist, an inventor may wish to perform experiments or construct prototypes to establish an enabling description. The enablement references field would then be linked to a write-up or a rendering of such experiments or prototypes.

Similarly, a materials or object record may contain a field for species elaboration. Such a field would contain citations to prior art containing descriptions or listings of species within the genus of the material or object. This field is also useful in conjunction with a patent application generator 245. The patent application generator can access this field and insert the citations in a patent application so as to effectively disclose species and sub-species of the particular material or object disclosed.

It will be readily apparent that another source of species and sub-species disclosure will be inherent in the hierarchal nature of the object or material class utilized in the system and method of this invention. As set forth above, each object and material record may also include one or more fields to identify the hierarchical class level the object or material is associated with. That field, which is also accessible by the patent application generator, will be linked to species and sub-species of that object or material that exist in the system. Those species and subspecies may also be inserted into the generated patent application. In a further embodiment, the innovation database 250 may comprise contents from any type of dictionary, such as the dictionary from Merriam-Webster, Inc. of Springfield, Mass. In other embodiments, the innovation database 250 may comprise contents from a specific technical dictionary, such as a dictionary of computer terms or some other technical art. Furthermore, the dictionary content may be organized in such a manner as to provide or facilitate a reverse lookup. For example, the word "ball" could be looked up in the dictionary content of the innovation database 250 to find all the other words that are defined using the word "ball". In this example, additional objects or object classes 260a may be determined such as types of balls, e.g., basketball, football, etc. or categories such as sports equipment. In this manner, the classes and sub-classes of the object classes 260a may comprise the reverse lookup capabilities inherent in a dictionary. An illustrative example of object classes 260a are shown in Table I below.

The inclusion of the contents of a dictionary can also provide a source for synonyms of words used to define an object. Such synonyms may be used to populate a synonym field in the record of that object. Alternatively, the synonym may be used by the prior art searching tool and/or the patent application generator.

In yet a further embodiment, the innovation database 250 may have functional black box classes 261c that comprise contents representing products, components, elements/features, and materials of the model classes 260 to form a model 215 in a functional manner. In one embodiment, any of the model classes 260 may be described as a functional equivalent, such as a "black box" comprising a function or operation the black box performs, provides or accomplishes. In this way, a specific embodiment of the functionality does not need to be defined. By way of illustrative example, a fan product or fan component can be described as a black box comprising the function of an "air blowing device," a light can be described as a "source of illumination," and a computer as, "a programmable electronic machine for processing information." In this manner, the innovation database 250 can provide content to support computer aided inventing of the present invention from a functional perspective. In another embodiment, the functional black box classes 261c may also be used to provide content to support computer aided inventing from a goal perspective. For example, a functional black box may be used to describe an element of a model 215 from a goal perspective, such as flexibility, controllability, attractiveness, novelty, etc. In another embodiment, the fields related to any records of the material classes 260n, configuration classes 260b and object classes 260a may be used to provide a functional black box class 261c definition of a portion of a model 215.

In another aspect, the morphs database 270, or morphs portion of the innovation database 250, comprises a plurality of morphs that may be applied to the systematic inventing process of the present invention. Morphs 270 are any actions that can be taken to modify, transform, change, add to, subtract from, divide, extend, reduce, improve, manipulate, or otherwise cause some type of change to an object of an entity or the entity itself being represented by the model 215 in the modeling environment 210. FIG. 2H shows a table 286 of morphs 270 that may be used in practicing the present invention.

Thus, according to one embodiment, the present invention provides a system comprising a morphs database comprising at least 40, 50 or 70% of the morphs listed in FIG. 2H. Preferably, the system of the invention comprises a morphs database comprising at least 80% of the morphs listed in FIG. 2H. Even more preferred is a morphs database comprising at least 90% of the morphs listed in FIG. 2H. Most preferred is a morphs database comprising at least all of the morphs listed in FIG. 2H.

Although the table 286 of FIG. 2H is shown as a single list of morphs 270, the morphs 270 may be organized into separate portions of the morphs database 270. In an exemplary embodiment, morphs 270 related to changes in materials present in the materials classes 260n may be organized into a materials morphs 270a database. Morphs 270 related to changes in configurations present in the configuration classes 260b may be organized into a configuration morphs 270b database. Additionally, morphs 270 related to changes in object classes 260a may be organized into an object morphs 270n database, which may include morphs for products, components, and elements (features) of the object classes 260n. Furthermore, the morphs 270 may represent morphs to product classes 261n or any other class that may be provided in the model classes 260 of the innovation database 250. In other cases, the morphs 270 may not be associated with any of the model classes 260 and may be generic, global or otherwise applicable to any portion of the Model 215.

Furthermore, for any of the morphs listed in the morphs 270 database there may also be other information stored and associated with each morph. In one embodiment, the morphs 270 database may include a performance characteristic, operational characteristic, quality attribute, or any other attribute or characteristic of each material. FIG. 2I-4 depicts an illustrative table 294 providing examples of fields for a record representing a morph in the morphs database 270. The illustrative table 294 may identify the morph record by name, date entered, description, code or command to implement the morph in a graphical rendering, image, and a unique serial number fields. Additionally, the morph record may include one or more fields to identify the hierarchical class level the morph is associated with. Although not shown in illustrative table 294, the morph records may also include one or more fields to indicate and describe the novelty, attractiveness, typical functionality and any other morph related attribute, such as user specified attributes. These characteristics and/or attributes may indicate how useful the morph is to use in certain circumstances or in other cases not useful to use. The illustrative table 294 shows other fields to indicate what object, configuration and/or material the morph is applicable to. For example, this applicability field may be specified by any hierarchical class level or by the name or serial number associated with the applicable records for the object, configuration and/or material. Additionally, the record for a morph as shown in illustrative table 294 may include fields to indicate if the morph should be included in the specification and/or the claims of a patent application 247 generated by the patent application generator 245.

For multi-parameter morphs, such as those relating to shape or configuration, a record for a morph will also include parameter fields for implementing the morph, such as low end of range, high end of range, distribution, number of embodiments and increments.

In one embodiment the choice of morphs to apply is controlled by user-configurable task bars comprising buttons representative of all morphs that may be applied to an object or set of objects. In a further aspect of this embodiment the task bar would indicate to the user those morphs that were recently used.

In yet another aspect, the innovation database 250 will optionally track the morphs, objects, materials and configurations utilized by a user or a specified set of users in both baseline entities and morphed baseline entities. By tracking a history of use, a preferred set of morphs, objects, materials and configurations can be assembled and offered to the user in future sessions. It should be apparent, however, that limiting the innovation database to such preferred sets of records will tend to "lock in" trends, rather than foster full creativity. As such, the use of the preferred sets is preferably offered to the users as an option, rather than a requirement.

In another aspect of the invention fields scoring popularity, marketability or attractiveness in each of the objects and materials components of the innovation database 250 may be routinely updated based upon consumer surveys, marketing trends and desirability determinations. This allows the innovation database to remain current in terms of existing trends. For example, currently, the use of silver metallic alloy in the casing of cell phones is very trendy and desirable, but just a few years ago colored plastic was the material most popular in cell phone cases. Children now like items with blinking LED lights, but in the future such lights may be less desirable or replaced by a different type of light. An objects and materials database that is up to date with current trends will more accurately predict which morphed baseline entities will be commercially successful.

Marketing trends and consumer surveys can also assist in determining which morphs may produce a commercially successful morphed baseline entity. For example, if sleek and aerodynamic shapes are in style, morphs which tend to lead to such shapes would be given a higher score and alert the user that they are more likely to result in an attractive product.

The results of marketing trends and consumer surveys can be converted into scores for fields present in the innovation database and these updated scores can be imported into the innovation database. In one embodiment, the user of the innovation database 250 can obtain the updated scores from a remote server and access to such information and updates could be on a subscription or pay-per-use basis.

The output of the morphed baseline entities may be presented to the user for review in either text or graphical form. Textual output would, at a minimum, list all of the objects present in the morphed baseline entity, the relative position and orientation of those objects and which objects had been morphed compared to the original baseline entity. More preferably, the output would be in graphical form.

Graphical representation of morphed baseline entities may be in the form of 2-dimensional or 3-dimensional renderings. Three-dimensional renderings may be of the type that requires the use of a stereoscopic viewing device or other 3-dimensional viewing and displaying devices well-known in the CAD art. Alternatively, the three dimensional rendering may be the product of fused deposition modeling printer (www.axisprinter.com, www.stratasys.com) or other three-dimensional printers that produce prototypes (www.zcorp.com, www.prometal.com, www.dimensionprinting.com, www.solid-scape.com). Graphical representation also includes dynamic moving images that depict animation of the morphed baseline entity. Dynamic moving images are particularly useful in allowing the user to view an entire range of morphed baseline entities produced by a multi-parameter morph. When dynamic moving images are employed to display morphed baseline entities, it is preferred that those images be associated with a selection mechanism that allows the to choose preferred entities either during the animation or after stopping the animation.

The number of morphed baseline entities produced may become very large depending upon the number and types of morphs applied, as well as the objects, materials and configurations used in those morphs. For example, a baseline entity is parsed into 9 objects. Each of those objects is potentially subjected to a morph that produces a single morphed version of that object. The number of different morphed baseline entities resulting from this exercise is $2^9$ or 512.

Because of this, the method and system of this invention preferably provides a number of different ways of viewing the outputted morphed baseline entities. One way of displaying multiple results is in one or more grids containing pictures of the different morphed baseline entities. It will be readily apparent that the size of the grid must be sufficiently small so that differences between the morphed entities in each cell of the grid can be visualized, yet large enough to rapidly sort through multiple morphed baseline entities. Such grids are preferably 1×3, 1×4, 2×2, 2×3, 3×1, 3×2, 3×3, and 4×1 for larger morphed baseline entities; and 4×4 and 5×5 for smaller morphed baseline entities. Associated with the grid output would be tools to increase and decrease the size of the individual morphed baseline entities, as well as selecting individual entities. Selected entities from each grid may be saved and then redisplayed in grids to allow further screening by the user. Another way of displaying multiple morphed baseline entities is the use of transparent overlaid images. This display type would also be associated with a tool for selecting individual entities of interest.

Yet another display method is the use of a slideshow type presentation of the individual morphed baseline entities. Such a presentation would preferably allow the user to control how long each embodiment would be displayed, as well as the ability to go backward and forward at various speeds and to skip the display of one or more embodiments. In one aspect of this display method, the outputted morphed baseline entities may be exported to presentation software, such as Microsoft PowerPoint.

For a smaller number of morphed baseline entities, another display method would present individual morphed baseline entities in different windows on a display screen. The windows could be tiled, cascaded or otherwise arranged at the user's discretion. The user would be able to select preferred morphed baseline entities by clicking at a designated point within a window or by some other similar means.

Yet another method to display multiple morphed entities is a simple list that the user may scroll through and select preferred entities. The list may be graphical representation, descriptive text or both.

In addition to the selection techniques associated with specific display methods set forth above, other methods of selecting preferred morphed baseline entities may be utilized in this invention. These include, for example, check boxes with the ability to select all or multiple entities using a single click or combination of keyboard strokes and mouse clicks (e.g., SHIFT+click to select an entire range; CTRL+click to select multiple entries). Controllers, such as joysticks, gamepads, controllers or other pressure-sensitive devices may also be used to select preferred morphed baseline entities. Alternatively, such controller may be used to rate morphed entities so that they may be later grouped by rating for further selection by the user.

In yet another embodiment, the selection or rating of preferred morphed baseline entities may be achieved through the use of physiological response monitors attached to the user.

These include devices that measure breathing, heartbeat, electrical response, etc., that may be used to measure the excitement or enthusiasm of the user for individual morphed baseline entities. This embodiment provides the advantage or requiring no user input other than observation. Such selection methods will allow the user to screen more entities during a given time period than embodiments requiring additional user input.

An additional method of screening and selecting morphed baseline entities is through the use of user-controlled filters. Such filters would be based upon one or more of the quality fields included in the objects and materials databases (e.g., cost, size, attractiveness, novelty or other user-defined attributes) and would be user configurable as to cut-off points for various quality attributes. In one embodiment, the system of this invention would display to the user the number of morphed baseline entities produced in the session or after the application of one or more filters. This provides feedback as to how the parameters for each quality attribute should be adjusted in order to produce a reasonable number of entities for storing in the specific embodiments database discussed below.

In another aspect, the present invention is related to storing selected embodiments of morphed baseline entities in the specific embodiments 277 portion of the innovation database 250. In one embodiment, the specific embodiments database 277 may be implemented as a separate database from the innovation database 250. As will be described in further detail below with respect to the operation of the present invention, the specific embodiments database 277 is used by the patent application generator 245 to generate patent applications 247 and by the prior art searching tool 249 to perform prior art searches related to selected and stored specific embodiments. Referring now to FIG. 2I-5, illustrative table 295a is depicted to show examples of fields for records in the specific embodiments database 277. Illustrative table 295a describes records and fields that may be stored to represent a selected specific embodiment of a morphed baseline entity. In table 295a, each bucket 1 . . . n represents an object defined in the model 215 of a selected morphed baseline entity. If the specific embodiment of a morphed baseline entity were broken down into 3 objects, there would be three buckets or records to store data associated with the object. For each object record in table 295a, the object would be identified by a name and/or the serial number, such as the name and serial number of an object record as described in conjunction with FIG. 2I-3. Additionally, each object record of table 295a may also include data identifying and/or describing the qualities of the object, the material of the object, the qualities of the materials and the positional and orientation coordinates of the object. Any of the data stored in these fields may be obtained from the corresponding object record of the object classes 261a, material record of the material classes 261n, and the configuration record of the configuration classes 261b.

Illustrative table 295 of FIG. 2I-5 depicts prior art searching related fields to be stored associated with each specific embodiment of a baseline embodiment stored as represented by table 295a in the specific embodiments database 277. For a specific embodiment stored in the specific embodiments database 277, the prior art searching tool 249 may perform a search of any prior art data sources using any of the fields that may be used by illustrative table 295a. For example, the prior art searching tool 249 may use any combination of object names to perform a patent and/or patent application search at the USPTO website. The prior art searching tool 249 may perform one or more searches for a specific embodiment and store fields identifying and describing the results in illustrative table 295a. The fields representing the results generated or provided by the prior art searching tool 249 may identify the number of matching patents and websites, a list of matching patents and web-sites, and the sources searched. The fields may also identify and describe the score of the overall prior art and the subjective usefulness of the prior art. Additionally, there may be fields in illustrative table 295a that indicate whether any of the prior art searching results for a specific embodiment stored in illustrative table 295a should be included in the specification and/or claims of a patent application 247.

The user's selection of preferred morphed baseline entities may occur either before or after outputted entities are placed into the specific embodiments database 277. In the latter case, the unselected entities are removed from the database or tagged in some manner to distinguish them from the selected entities. In the former case, only the selected embodiments are used to populate the specific embodiments database 277. Other fields that may exist in the specific embodiments database 277 are the baseline entity from which the specific embodiment was derived and the specific morph applied to produce the specific embodiment.

The specific embodiments database may become very large. Accordingly, the system and method of this invention provide mechanisms by which that database can be reduced in size without deleting any records. For example, if the records include a color graphical representation of the morphed baseline entity, that representation may be converted to black and white. Alternatively, the graphical representation may be stored in a separate database linked to the specific embodiments database 277 and displayed only when the user selects the specific embodiment. For example, the specific embodiments database 277 would only comprise references to objects that make up an embodiment, without comprising the actual image of the part. This information would be automatically addressed from the objects or materials databases when the user desired to have an image of the specific embodiment rendered.

Another alternative is to store the graphical representation as thumbnail sketches or lower resolution graphics. Employing hyperlinks to various fields of information may also reduce the size of the specific embodiments database 277. For example, the prior art reference field may simply be a link to the actual reference (patent, publication, article or website).

The specific embodiments database 277 may also be compressed, zipped or otherwise reduced in size for storage purposes. Decompression or unzipping will occur when the user chooses to view the record for specific embodiments.

In an alternate embodiment, the system of this invention will alert the user when the specific embodiments database 277 is becoming too large. The size at which the alert occurs may be either a preset, user-defined size or at some default size. The warning may occur either during the selection of morphs to apply or during generation of morphed baseline entities stage after application of a morph. Once alerted, the user will be presented choices as to how to reduce the number of morphed baseline entities. Such choices may include deleting every second, third, fourth, etc. . . . morphed baseline entity; allowing the user to step back and define one or more morphs more stringently (e.g., limiting an insert object morph to electrical components or to primary classes of components); applying more stringent filters to objects, materials or morphs, etc.

The specific embodiments database 277 will be compatible with multiple file formats and will be capable of being displayed in a variety of format. One such format envisioned by the invention is a printable format suitable for pasting into an idea or laboratory notebook to verify conception as required by the Patent Laws of the United States. Another format will include numbering for each object in a specific embodiment. This format produces an output that is suitable for use as a drawing in a patent application and may be utilized by the patent application generator 245 to produce informal or formal drawings.

In a preferred embodiment, data may be imported into and exported out of any component of the innovation database 250 (e.g., objects database, materials database, configuration database, morph database, specific embodiments database, prior art searching tool, patent application generator). Thus it is intended that the file format of one or more components of the innovation database 250 be compatible with CAD file formats (e.g., CADL, CGM, CIF, DMC, DXF, EDIF, IISF, SAT, SET, IGES, STEP, PDES, VDA-FS (DIN 66301), VDA-IS, UNV, etc.); Microsoft Excel™, Word™, PowerPoint™ and Access™ file formats; Standard Worldwide Web formats (XML, HTML, PDF, etc.); FileMaker Pro™ file format, EndNote™ file format and other major commercially available database, word processing, spreadsheet and reference manager program file formats. In yet another embodiment, the file format of one or more components of the innovation database 250 is compatible with commercially available drawing program formats and standard graphic file formats (JPEG, MPEG, TIFF, BMP, etc.).

The various components of the innovation database 250 may be implemented in Java code and may employ, in part, Java Libraries. The innovation database 250 components may also be linked to external databases for modification and updating. The innovation database 250 components may also be saved or served as web pages so that multiple, remote users can access, update, edit and use the innovation database through the internet, an intranet, a VPN, etc. When the innovation database 250 is network enabled, the system and method of this invention may optionally include web-based meeting features, such as shared workspace and other features which are known in the art to be used in conjunction with web-enabled, commercially available programs. These features can be used to view and discuss morphed baseline entities produced.

In yet another embodiment, the methods and systems of this invention can implement security features into various components of the innovation database, such as encryption and password protection. These security features will limit access and prevent hacking of the innovation database 250. They are particularly useful in conjunction with the specific embodiments database 277, given the likely confidential nature of the inventions generated by the method and system of this invention.

In another embodiment, the system and method of this invention would comprise features that would enhance the user experience and productivity when interacting with the innovation database 250. These features may include one or more of the following: object linking and embedding; research tool (such as present in Microsoft Office™); tracking of changes (such as present in Microsoft Office™; macro support; add-on or plug-in support; tiling and cascading of individual windows; customization of toolbars, menus, keyboard shortcuts, etc.; and undo, redo, step forward and step backward functions.

In summary, the innovation database 250 comprises data used for creating and defining an entity represented by a model 215 in the modeling environment 210. In this manner, the model 215 may be broken down or defined into objects representing products, components or elements (which are also referred to as features), and further defined by materials and configurations. The innovation database 250 provides a lexicon and specification framework for breaking down, defining, organizing, or otherwise specifying a model 215 in a flexible and dynamic manner to support the computer assisted inventing of the present invention. The organization and population of the model classes 260 of the innovation database 250 supports a vast array of ways and combinations to represent an entity of a model 215.

Moreover, the innovation database 250 includes a list of morphs 270 that may be applied to any portion of the model 215 to create a morphed, changed, or otherwise manipulated version of the entity represented by the model 215. The organization and population of the morphs 270 portion of the innovation database 250 supports creating a multitude of changes to, additions to, combinations, alternatives, or otherwise new versions of the entity of the model 215, or in creating new types of entities from the existing entity of the model 215. The innovation engine 240 interfaces between the modeling environment 210 and the innovation database 250 to apply the model classes 270 and the morphs 270 to the model 215 in the modeling environment 210 in a logical manner as will be further discussed below. Furthermore, the innovation database 250 includes storage of specific embodiments of selected morphed baseline entities in order to provide prior art searching and the generation of patent applications.

Moreover, the materials, configuration, and object classes of the innovation database 250 not only provide for the definition of a model but also provide the diversity for the morphs. For example, when a morph adds additional objects or replaces objects, the morphs may use one, more or all of the objects available in the object class of the innovation database 250. In another example, when a morph changes a material, the morph may use any material listed in the materials classes. In yet a further example, a morph may change the configuration of an object by using any of the configuration choices in the configuration classes. As such, the innovation database 250 provides a vast array of ways to break down a model 215 but also provide a vast array of items to be applied by a morph.

Figure 3A:
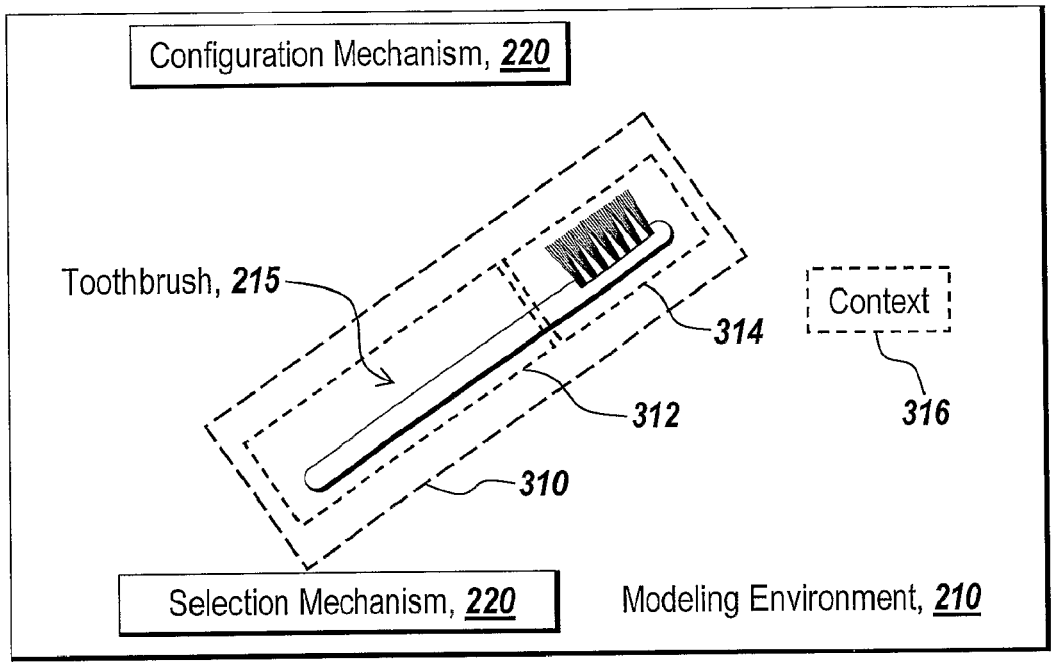
FIG. 3A is a block diagram of an illustrative embodiment of a modeling environment with an example graphical model that may be used in practicing the present invention.
Figure 3B:
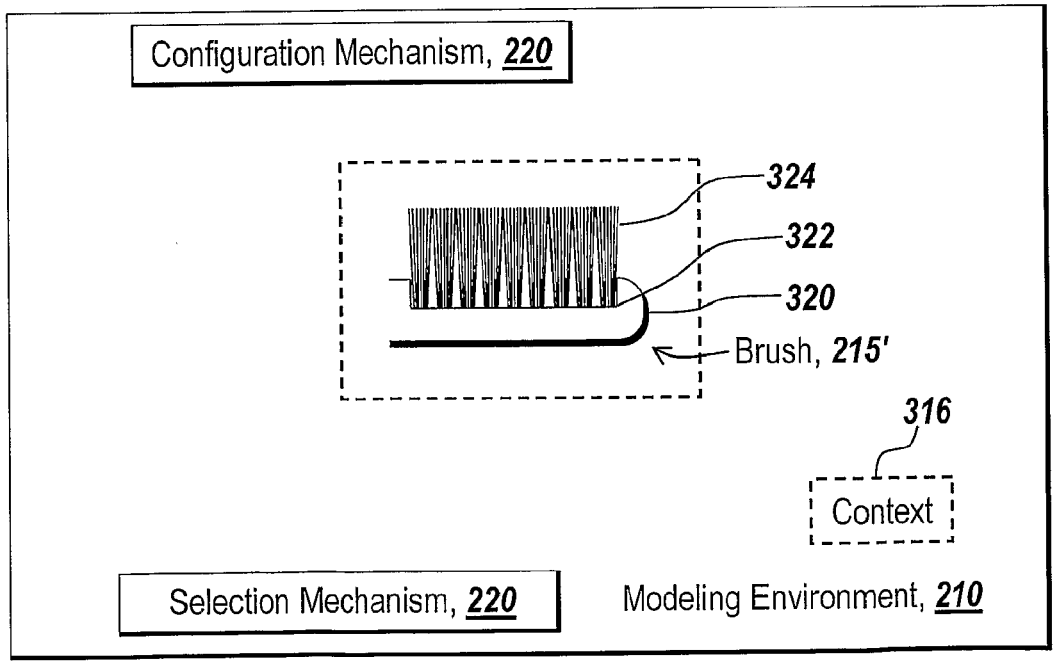
FIG. 3B is a block diagram of another illustrative example of a graphical model that may be used in practicing the present invention.

In one aspect, the present invention is directed towards identifying and defining a model 215 in a modeling environment 215 to represent any type of entity under consideration for computer aided inventing. The entity represented by the model 215 may be any man-made or natural thing or process. As such, the entity may be any composition, item or a process. FIG. 3A depicts an example model 215 for illustrative purposes. The model 215 represents a toothbrush as an example of an entity to be used for describing an illustrative embodiment of practicing the present invention. Although a toothbrush is used as the model 215, the model 215 is not meant to be limited to a toothbrush and a model 215 of any type of entity can be used as one ordinarily skilled in the art will appreciate. FIG. 3B depicts a second model 215' representing the brush portion of the toothbrush model 215 depicted in FIG. 3A. The brush model 215' may represent a drill-down or separate view of the toothbrush model 215. Furthermore, the brush model 215' may also represent a focused area of interest for applying the systematic computer aided inventing system of the present invention.

Figure 4:
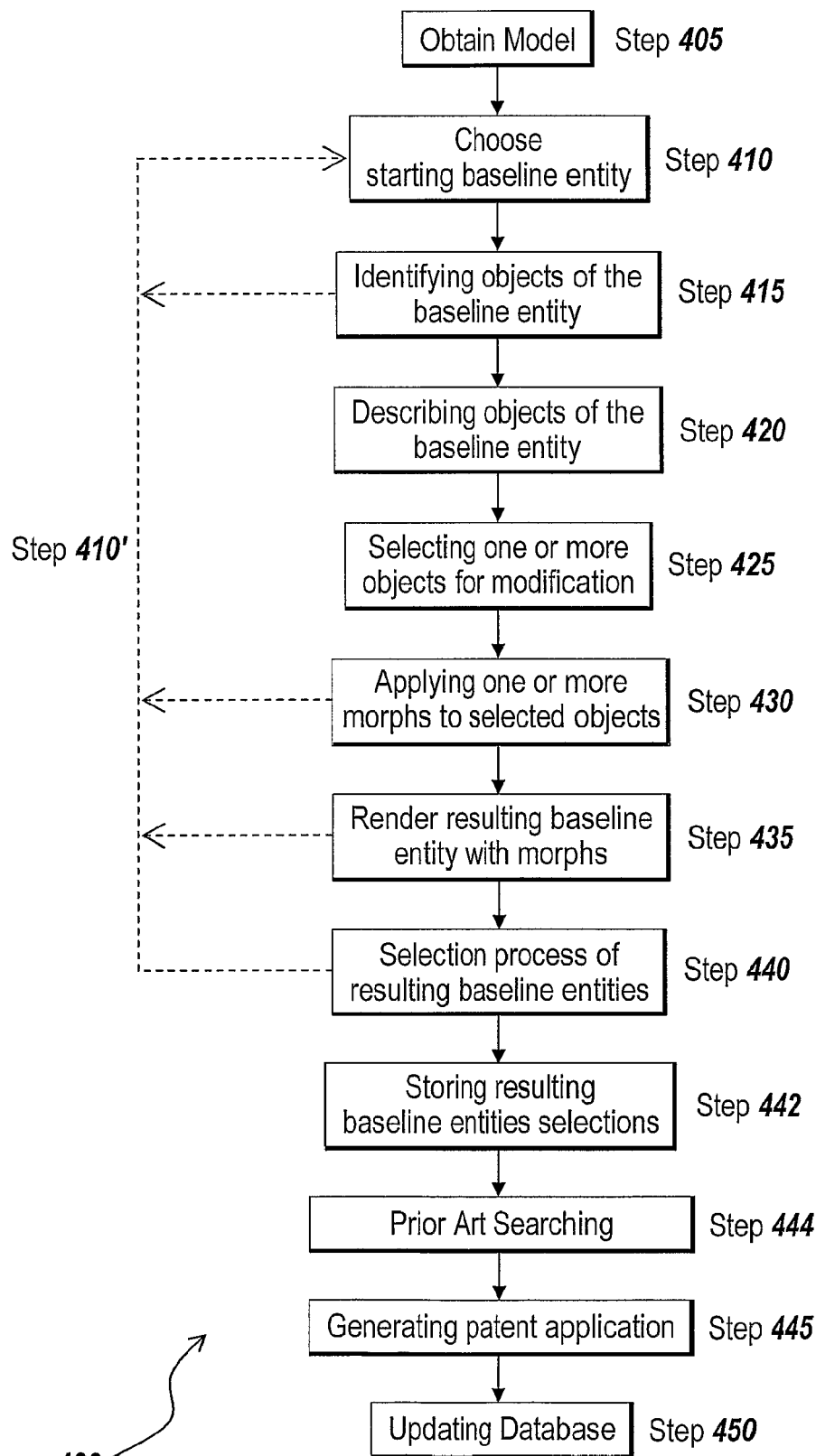

Referring now to FIG. 4, an illustrative method 400 of performing the systematic computer aided inventing system of the present invention is depicted. This illustrative method 400 will be described using the example of the toothbrush related models 215 and 215' of FIGS. 3A and 3B with the illustrative embodiment of the system depicted in FIGS. 2A-2D. In reading the following detailed description, one ordinarily skilled in the art will appreciate that this illustrative method 400 may be practiced in a similar manner with any other type of model 215 and other embodiments of the system of the present invention.

In operation, a model 215 is obtained or provided in the modeling environment 210 at step 405 of illustrative method 400. In one embodiment, the model 215 may be created, edited or otherwise generated using the modeling environment 210. In one embodiment, the model 215 may be created using any suitable drawing tools or model generation components of the modeling environment 210. For example, any type of 2-D, 3-D, simple images, or 3D CAD rendered drawings may be used to provide the model 215. In one embodiment, the modeling environment 210 may be a block diagram modeling environment which provides blocks to be placed and arranged in a manner to form a model 215. In another embodiment, the model 215 may be provided by using object classes 260a, material classes 260n and configuration classes 260b present in the innovation lexicon database 250. In one another embodiment, the model 215, or any portion thereof, may be obtained by reading in a file 215, reading from a database, such as an existing model saved in the innovation database 250, or from any other suitable storage location. For example, the model 215 may be imported in from a file generated by another modeling tool. In the illustrative example of the toothbrush model 215 shown in FIG. 3A, the model 215 of the toothbrush is obtained or provided by the modeling environment 210, such as a user drawing a graphical representation of a toothbrush. Additionally, a graphical representation of the brush portion of the toothbrush is obtained or provided in a second model 215' in the modeling environment 210. One ordinarily skilled in the art will recognize and appreciate the various methods of obtaining or providing a model 215 that may be used in practicing the present invention.

At step 410 of the illustrative method 400, a starting baseline entity to perform the other steps of the illustrative method 400 is identified. The starting baseline entity is the entity represented by a model 215 from which it is desired to systematically generate inventions. As such, the starting baseline entity becomes a scope from to which to apply the systematic computer aided inventing steps of the illustrative method 400. In one embodiment, a user will use the selection mechanism 225 to select a model 215 from one or more models that may exist in the modeling environment 210. In another embodiment, a user may select via the selection mechanism 225 a portion of a model 215. In the illustrative example, the user may choose via the selection mechanism 225 the toothbrush model 215 of FIG. 3A as the starting baseline entity from which to invent. Alternatively, the user may choose via the selection mechanism 225 the brush model 215' of FIG. 3B as the starting baseline entity. The model 215, or portion thereof, may be selected as the starting baseline entity by any suitable selection mechanism 225 from any provided means of the configuration mechanism 220. In one embodiment, a menu item may be selected in association with a model 215 to indicate that the model 215 is to be used for the inventing process. For example, the model 215 may be selected and the right mouse button clicked via the selection mechanism 225 to pop up a menu window of the configuration mechanism 220 from which the model 215 can be identified as the starting baseline entity. In another embodiment, if there is only one model 215 in the modeling environment 210, the model 215 may automatically be selected, by default or otherwise, to be the starting baseline entity. One ordinarily skilled in the art will appreciate the plenary of ways to select and identify a model or portion of a model as a starting baseline entity.

At step 415 of the illustrative method 400, the objects of the starting baseline entity are identified in the model 215. From another perspective, objects, materials and configuration are defined to form in combination the starting baseline entity. In one embodiment, a user via the selection mechanism 225 selects a portion of the model 215 to indicate that portion as an object of the model 215. For example, in the toothbrush example of FIG. 3A, the user may select a first portion 312 of the model 215 to identify as a first object of the model 215. This first object in later steps of the illustrative method 400 may be defined to represent the handle of the toothbrush. The user may select a second portion 314 of the toothbrush model 215 to identify a second object of the model 215. This second object may later be defined to represent the brush portion of the toothbrush. Additionally, the entire portion 310 of the toothbrush 215 may be selected to identify a third object to represent the toothbrush.

In a similar manner, the user may identify objects of the second model 215' of the brush portion of the toothbrush model 215. The user may select a first portion 320 of the brush to identify a first object of the brush to represent the base of the brush. The user may then select a second portion 322 of the brush to identify a second object of the brush to represent the interface or securing mechanism between the bristles of the brush and the base of the brush. Additionally, the user may select a third portion 324 of the brush model 215' to identify a third object of the brush to represent the individual bristles of the brush. After identifying portions of the models 215 and 215' as objects, these portions may be referred to and described as objects further herein. In this manner, objects of the model 215 are portions of the model to be defined at step 420 in the illustrative method 400. The objects or portions of the model 215 can be identified as the portions of the graphical representation of the model 215.

At illustrative step 415, the user may identify the objects of the model 215 by any suitable means. In one embodiment, the user via the selection mechanism 225 draws a selection box around a portion of the model 215 to identify that portion. In another embodiment, the model 215 is provided by a graphical representation with segmented portions such as in a block diagram model that are more readily identifiable. In this case, the segmented portion of the model 215 may be highlighted or otherwise selected to indicate that portion is to be associated with an object. In a further embodiment, the modeling environment 210 and/or the innovation engine 240 may have functionality or logic to automatically identify portions of the model 215 in an intelligent way. For example, the modeling environment 210 may be configured via the configuration mechanism 220 to recognize the model 215 is for a toothbrush. The modeling environment 210 may communicate with the innovation engine 240 and/or innovation database 250 to determine components or parts of a toothbrush. The modeling environment 210 may have logic or functionality to then interpret the graphical representation of the model 215, such as by the rendering mechanism 230, to identify the parts or components of the model 215. One ordinarily skilled in the art will appreciate and recognize the various ways to identify one or more portions of a model as one or more objects.

At step 420 of the illustrative method 400, the one or more objects identified at step 415 are defined, or otherwise described to provide a representation of the object in a desired manner. The user may define an identified object using the configuration mechanism 220 and selection mechanism 225 of the modeling environment 210. In one embodiment, a first portion of the model 215, or first object, may be selected and a mouse button clicked to provide a graphical user interface to configure the object. In another embodiment, the configuration mechanism 220 may provide a fixed menu form in the modeling environment 210. Configuration and selection choices may be provided via the modeling environment 210 and/or the innovation database 250. As described above, the innovation database 250 comprises model classes 260 including object classes 260a, configuration classes 260b and material classes 260n. The model classes 260 provide a lexicon and specification for defining the objects of the model 215. In an exemplary embodiment, the model classes 260 provide a multi-level hierarchical representation of objects, configurations and materials, such as via primary and secondary classes. As such, the innovation database 250 acts as a specification framework for describing the identified objects of the model 215.

Additionally, with the multi-level hierarchical database structure of the innovation database 250, a user is able to filter object classes 260a, configuration classes 260b and material classes 260n by the level in hierarchy to areas and scope of initial interest. Once a higher level of any of these classes is determined to be desired or of interest, then the user can expand, review or otherwise use lower levels of any of these classes in performing the operations of the present invention described herein. This allows the user to initially scan at higher class levels in order to limit the number of choices to work with and to reduce the time it takes to review all the possible choices and possibilities provided by the innovation database 250. In one embodiment, the selection of various hierarchal levels of the different classes may be presented to the user as a series of submenus, wherein the choice of an object, configuration or material at a given level triggers a submenu of objects, configurations or materials at the next lower level and so on (see FIG. 9, for example). In other embodiments, if desired choices are not available from the innovation database 250, the user can manually enter, add, edit or otherwise provide user defined choices for defining objects of the model 215. In another embodiment, the user may be able to define via the modeling environment 210 any new object, material, or configuration class, record or field in performing the operations of the present invention described herein, and store such information in the innovation database 250.

By way of example of the illustrative example of the toothbrush model 215, a user may define the third object 310 so that the object is defined to be a toothbrush. In this case, object 310 represents the entire portion of the model 215 which, in turn, represents the toothbrush. Via the configuration mechanism 220 and selection mechanism 225 of the modeling environment 210, the user may be able to view and select one or more listing of products from the products classes 261n of the object classes 260a portion of the innovation database 250. A product class of "toothbrush" may be presented as a primary class choice. In another embodiment, "toothbrush" may be a secondary or lower subclass choice from a class group provided by the products classes 261n database. For example, the "toothbrush" selection may have been found and selected under a product class primary group of "Health and Beauty" or "Dentistry." In yet another embodiment, the "toothbrush" product selection may have been found under multiple product group classes. For example, the user may have selected "toothbrush" from either a "Health and Beauty" primary class, or a "Dentist" primary class, or any sub-classes defined under these primary classes. With the flexibility of the innovation database 250, the "toothbrush" listing may also be found under another class of the model classes 260. In one embodiment, the "toothbrush" listing may be considered a component in the component classes 261b. For example, "toothbrush" may be considered a component or part of a dental kit or sleepover kit product, and therefore may be found in the component classes 261b database.

Additionally, the user may define the first object 312, or first portion, of the model 215 to be a handle of the toothbrush. Via the configuration mechanism 220 and selection mechanism 225 of the modeling environment 210, the user may be able to view and select from a listing of components from the components classes 261n of the object classes 260a portion of the innovation database 250. The "handle" listing may be provided as a primary class or a sub-class in the components classes 261n. The components classes 261n may provide additional suitable selections such as "toothbrush handle", "brush handle", or "rod" which allow the user to define the object in a desired manner. The user may also view and select from a listing of elements classes 261a of the object classes 260a portion of the innovation database 250 to select "handle" or any other desired object definition.

In a similar manner, the user may define the second object 314 of the model 215 to represent the brush portion of the toothbrush. Via the configuration mechanism 220 and selection mechanism 225 of the modeling environment 210, the user may be able to view and select from a listing of components from the components classes 261n or elements from the elements classes 261a, either as a primary or secondary class, or some other class level in the hierarchy of the innovation database 250. As such, the user may select a component or element such as a "brush", "brush head", "bristles", etc. to define object 314.

Although the illustrative example of the toothbrush model 215 is described as associating either a product, component or element from the respective classes in the model classes 260 portion of the innovation database 250, more than one association can be applied to an object. For example, the first object 312 may be defined as a "handle" from a component class 261b and may also be defined as "plastic" from the materials classes 260n. Additionally, the first object 312 may also be defined as "bent" from an element class 260b. In this manner, the first object 312 results in a definition and configuration of a "bent plastic handle." One ordinarily skilled in the art will appreciate the permutation of combinations that may be used to define objects in accordance with the present invention.

Furthermore, a context 316 can be associated with the starting baseline entity to provide an indication of an environment, a background or any other type of context. In one embodiment, the context 316 may represent a technology area, practice area, art area or other environment associated with the starting baseline entity. The context 316 can provide another form of scope to apply the systematic inventing system of the present invention. By way of the illustrative example of the toothbrush model 215, the context may be defined to represent a "healthcare", "dentistry", "home goods", or any other desired category to which the starting baseline entity is associated with. Alternatively, it can represent a context 316 under which to generate inventions from. For example, although a toothbrush may be more logically associated with the context 316 of "healthcare" maybe the context 316 is defined to be "automobile" or "hardware" to define a different scope for the systematic inventing process and to achieve different results.

With steps 415 and 420, the user can identify and define objects of the model 215 to represent products, components, and elements of the baseline entity in a desired manner and to associate the baseline entity with any type of context 316. With the flexibility of the modeling environment 210 and the comprehensive lexicon framework of the invention database 250, a user has great flexibility in perspective, granularity and creativity to identify and define objects of a starting baseline entity for the systematic inventing process of the present invention. The same model 215 can be broken down into different objects. In one case, for example, the toothbrush model 215 may identify three objects as in the above illustrated example, or in another case, five objects may be identified. For example, the brush portion of the toothbrush may be further identified to have objects representing the bristles and the interface of the brush to the handle. In yet another example, maybe only one object is identified, such as the handle, as that is the only area of interest for generating inventions. Furthermore, the same object may be defined differently. For example, the object 312 representing the handle portion of the toothbrush may be defined to be a wooden handle in one case, and in another case, a bent rod, or in another case, a cylindrical stick. The different ways to identify and define objects of a starting baseline entity impacts the computer aided inventing process of the present invention and will lead to different results. As such, the present invention gives the user flexibility in the granularity and scope of the invention process.

For example, although the user provided a toothbrush model 215 as in FIG. 3A, the user may decide, either before or after completing one or more of the remaining steps of illustrative method 400 to model the brush portion of the toothbrush in more detail. The user may want to focus the inventive process on the brush portion. In another case, the user may learn from the results of the illustrative method 400 as described below that it may be desirable to further detail the model 215' of the brush. By way of a further illustrative example, the second model 215' may have been used as the starting baseline entity. In one embodiment, the modeling environment 210 allows the user to drill down on the second object 314 representing the brush in the toothbrush model 215 to create, obtain or otherwise provide the second model 215'. In another embodiment, the second model 215' may be obtained or provided as a new model separate from the first model 215 of the toothbrush.

In the illustrative example of the brush model 215', the user may define a first object 320 from any of the data provided by the model classes 260 of the innovation database 250 to represent a "bristle holder", "brush base", "flat plastic stand", or any other desired product, component or element available from the model classes 260. Additionally, the first object 320 of the brush model 215' may further be defined to comprise any desired material, such as "wood", "metal", etc. Furthermore, the first object 320 may also be defined comprise any element, or feature, such as "curved", "concave", etc. available from the model classes 260. The second object 322 of the brush model 215' may be defined to be an element, such as a "surface", "matrix of openings", "interface", "flat exterior", or any other description that may be provided by the element classes 261a. Additionally, the second object 322 of the brush model 215' may be defined to comprise a certain material from the materials classes 260n, such as plastic. A third object 324 may be defined to represent the bristles of the brush model 215'. The bristles of the third object 324 may be described to be a component of "rods", "rope", etc., made up of a material such as plastic, nylon, etc, and having a configuration of a "matrix array", "linear array" and additionally with an element or feature of "curved" or "bent".

As one ordinarily skilled in the art can appreciate by the above description of the models 215 and 215', the present invention enables great latitude in defining the models to form starting baseline entities in any desired manner. Furthermore, the flexibility of the present invention allows for creative or non-intuitive configuration of objects. In one embodiment, although the model 215 may represent a toothbrush as in FIG. 3A, the objects of the model 215 may be defined to represent any component, element, product, material that may not be graphically represented by the model 215. For example, the first object 310 of the model 215 may be defined to be a "pen" or a "straw" instead of a "handle" or "rod." In a similar manner, the context 316 applied to the model 215' may be logically associated with the entity represented by the model 215 or otherwise may be more creatively defined. In this manner, the user of the present invention can inject his or her own creativity into the systematic inventing process of the present invention.

Although the above steps are generally described as the modeling environment 210 interfacing with the innovation database 250 to provide configuration data for a model 215, the innovation engine 240 may also be used and applied to any of the steps of the illustrative method 400. In one embodiment, the modeling environment 210 obtains configuration data from the innovation engine 240 which, in turn, may interface with the innovation database 250. In a further embodiment, the innovation engine 240 may perform any suitable logic for selecting, filtering, suggesting, or otherwise providing configuration choices and information to the modeling environment 210. In one embodiment, the innovation engine 240 may comprise business rules, algorithms or any other logic to intelligently apply the lexicon and specification framework of the innovation database 250 to the identifying and defining steps 415, 420 and 425 of the illustrative method 400. For example, the innovation engine 240 may limit the configuration information to a scope defined by the context 316 or any model class 260 associated with the model 215. Additionally, the innovation engine 240 may be configured with business rules representing a standard or user configured means for applying the lexicon of the innovation database 250 to a model 215 under the invention process. In this way, the innovation engine 240 may provide configuration data based on user defined choices or a standard of terms used in a certain context 216. One ordinarily skilled in the art will appreciate how the innovation engine 240 may apply logic to the configuration process as depicted by steps 415 and 420 of illustrative method 400 of FIG. 4.

In one aspect, the present invention is directed towards automatically applying morphs to the starting baseline entity to form new inventive entities or versions of the baseline entity. At step 425 of the illustrative method 400, one or more objects are selected to be morphed. These objects are selected in order to generate different versions or forms of the starting baseline entity, or different entities as derivatives from the starting baseline entity. In one embodiment and in relation to the illustrative model 215 of FIG. 3A, all the identified objects 310, 312 and 314 may be automatically selected, by default or otherwise, to be morphed. In another embodiment, the user via the configuration mechanism 220 or the selection mechanism 225 may select one or more objects to be morphed. For example, the user via the selection mechanism 225 may select the first object 312 for morphing and then select a menu item or command from the configuration mechanism 220 to indicate to run the morphing process as described at step 430 below.

In another embodiment, the modeling environment 210 and/or the innovation engine 240 may provide information for the user to determine which objects to morph first. For example, the modeling environment 210 may display to the user the total number of applicable morphs for the definition of each object and may further suggest the object with the highest number of potential morphs to be selected. In another case, the modeling environment 210 and/or the innovation engine 240 may use any characteristic or attribute data associated with the definition of the object of the baseline entity to determine which object may have the highest quality of morphs to apply, thereby providing a higher opportunity for useful morphed versions of the starting baseline entity.

The illustrative method 400 of the present invention at step 430 applies one or more morphs to the selected objects. This step 430 may be performed manually or automatically. In manual mode, the user may select via a selection mechanism 225 a choice from one or more lists of morphs 270 provided via the configuration mechanism 220. The lists of morphs 270 may be hierarchical and represent classes and sub-classes of the morphs 270 database or any portion thereof. For example, a material morph 270a, a configuration morph 270b, and an object morph 270n, or any combination thereof, such as a combined material and configuration morph, may be provided via the configuration mechanism 220. The user can select a desired morph 270 and visually see the impact of the morph 270 on the selected baseline entity of the model 215 in the modeling environment 210.

When the morph 270 is selected manually to be applied to the starting baseline entity, the modeling environment 210 and the innovation engine 240 may work in collaboration with each other. The modeling environment 210 may communicate a command, instruction or other form of communication to the innovation engine 240 to indicate that the morph 270 has been selected. The innovation engine 240 may retrieve from the innovation database 250 any data or information associated with the morph 270. For example, the innovation engine 240 may retrieve an operational characteristic or attribute of the morph 270 to determine how to apply the morph 270 to the model 215. In another embodiment, the innovation engine 240 may comprise one or more business rules, libraries or any other configurable logic or functionality for applying a morph 270. In an exemplary embodiment, the innovation engine 240, such as via business rules, will use information associated with each object, material or configuration of a starting baseline entity to determine how to apply morphs 270 or how to filter morphs 270 to apply. The business rules may be configurable from a configuration mechanism 220 such as that provided by the modeling environment 210. In some embodiments, the business rules of the innovation engine 240 are user adjustable to provide any type of level of stringency, granularity, filtering or scope to which to apply morphs 270. In some embodiments, the depth of the hierarchical class level may be selected by the user for applying morphs 270. In other embodiments, any of the attributes, such as cost, novelty, etc stored in any of the records as depicted in illustrative tables of FIGS. 2I-1 through 2I-5 may be used for applying morphs 270 or for filtering morphs 270 to apply. Furthermore, the user may able to adjust the filtering of or selection of morphs 270 by any of these attributes shown in FIGS. 2I-1 through 2I-5. In other embodiments, the innovation engine 240 and/or the modeling environment 210 may retrieve from the innovation database 250, or any other suitable source, any data or information related to graphically representing the morph 270 or for graphically representing the morph 270 applied to the model 215.

Step 430 of the illustrative method 400 may also automatically apply one or more morphs 270 to the starting baseline entity. In one embodiment, the user may select via a selection mechanism 225 a menu item or command from the configuration mechanism 220 to automatically apply the morphs 270. In response to the selection, the modeling environment 210 may communicate a command, instruction, or any other form of communication to the innovation engine 240 to automatically apply the morphs 270 to the starting baseline entity. The modeling environment 210 may provide or the innovation engine 240 may obtain any information about the model 215 associated with the starting baseline entity. In one embodiment, the modeling environment 210 provides to the innovation engine 240 the model 215 and/or all the definition and configuration of the objects related to the starting baseline entity of the model 215. In another embodiment, the innovation engine 240 obtains information about the starting baseline entity of the model 215 from the innovation database 250. In another embodiment, the innovation engine 240 obtains information about the starting baseline entity from any other storage location that the modeling environment 210 may store the model 215 and/or the definition of the objects of the model 215.

For each of the objects of the starting baseline entity of the model 215, the innovation engine 240 will apply one or more morphs 270 selected from the innovation database 250. In one embodiment, the innovation engine may apply the morphs 270 to the one or more objects in any desired or determined order For example, the innovation engine 240 may apply all the morphs 270 selected from the innovation database 250 to a first object, and then apply all the selected morphs 270 to a second object. In another example, the innovation engine 240 may apply a first morph 270 to a first object and then the first morph 270 to a second object. In a further embodiment, the innovation engine 240 may apply morphs 270 in an order determined by an operational characteristic, performance characteristic or any other attribute of the morph 270. For example, the innovation engine 240 may apply morphs 270 in a ranking based on quality information associated with the morph 270. In this manner, the morphs 270 that may provide more desired results are ranked highest and applied first. In yet a further embodiment, morphs 270 may be ranked by which ones have been applied more frequently or which have had better results. For example, in step 440 of the illustrative method 400 described below, the user provides positive and/or negative selection feedback on the application of the morph 270 to the starting baseline entity. This information may be stored in the innovation database 250 and used by the innovation engine to intelligently apply morphs 270. One ordinarily skilled in the art will recognize the different orders from which the innovation engine 240 may apply the morphs 270.

In one embodiment, the innovation engine 240 applies all the available morphs 270 from the innovation database 250 to the objects of the starting baseline entity selected for morphing, or in another embodiment, all the objects of the starting baseline entity. In another embodiment, the user may have selected a class of morphs 270 to automatically apply. For example, the user may select to apply one or more of a material morph 270a, configuration morph 270b, feature morph 270c or a component morph 270n. The user may be able to select in any suitable manner and by any suitable selection criteria from the modeling environment 210 any subset of morphs 270 in the innovation database 250 to automatically apply. In another embodiment, the innovation engine 240 intelligently applies morphs 270 based on the definition and configuration of the objects selected for morphing. The innovation engine 240 may have business rules or any other suitable logic to determine which morphs 270 from the morphs database 250 are suitable to apply to an object of the starting baseline entity. For example, the innovation engine 240 may only apply a material morph 270a if a material is defined for the object. In another example, the innovation engine 240 may compare adjacent objects to determine if there is a morph 270 or set of morphs 270 applicable to an interface between the adjacent objects. Based on the vast array of objects, materials, and configurations that may be applied to a model 215, one ordinarily skilled in the art will appreciate that likewise there is a vast array of ways to apply morphs 270 to a model 215, and to intelligently filter, rank, select, use or otherwise apply a morph 270 to a model 215.

In one embodiment, the innovation engine 240 applies the morph 270 to the model 215 in the memory of the innovation engine 240 and provides the morphed version of the model 215 to the modeling environment 210. In another embodiment, the innovation engine 240 applies the morph 270 to the model 215 by providing commands, instructions, or any other form of communications to the modeling environment 210 to apply the morph 270 to the model 215. As such, the modeling environment 210 may be responsible for applying the morph 270 to the model 215. In yet another embodiment, the innovation engine 240 is a component of the modeling environment 210 and the modeling environment 210 automatically selects and applies the morph 270. One ordinarily skilled in the art will recognize that the application of the morphs 270 can occur by and in any component of the computer aided inventing environment 120.

As the morphs 270 are applied to the starting baseline entity of the model 215 either in manual mode or automatic mode, the resulting baseline entities may be rendered in the modeling environment 210 as indicated by step 440 of the illustrative method 400. The rendering mechanism 230 of the modeling environment 210 renders a graphical representation of the model 215 with a morph or a plurality of morphs 270 applied. The modeling environment 210 may render graphical representations of the morphed versions of the starting baseline entity in any suitable manner. In one embodiment, the modeling environment 210 generates and renders each morphed version of the starting baseline entity in a separate model, e.g., 215", and the rendered graphical representation is displayed in a window, form or other graphical user interface separate from other morphed versions and the starting baseline entity of the model 215. In another embodiment, the morphed versions are rendered and displayed in the same model 215. For example, the morphed portion of the model 215 may be highlighted or otherwise visually indicated in the model 215 to distinguish how the morph 270 was applied. In one embodiment, the model 215 is annotated with either graphics and/or text to indicate how the morph 270 was applied. In another example, the starting baseline entity of the model 215 may be repeated with each morph 270 applied in the same window, form, or graphical user interface displaying the model 215. In this manner, each morphed version of the starting baseline entity are displayed in proximity to each other, such as in set of thumbnail views arranged in any suitable manner for comparison.

Although illustrative step 440 is generally discussed as rendering a graphical representation of a morph 270 applied to the starting baseline entity of the model 215, any other suitable means for indicating, generating, showing, conveying or otherwise providing a representation of the resulting morphed entity or entities may be used in practicing the present invention. In one embodiment, the modeling environment 210 and/or innovation database 250 generates a listing, such as a table, of the resulting entities. For example, the listing may be a word description of the starting baseline entity, the morph 270, and the resulting baseline entity. This listing may be any in form suitable for reading by a human user, such as text file, a document, or a web page. In another embodiment, the modeling environment 210 may present the listing in a graphical user interface form for a user to select a morphed version to graphically render in the modeling environment 210. In this manner, only a subset of the automatically applied morphs 270 of illustrative step 430 may be graphically rendered in the modeling environment 210. One ordinarily skilled in the art will recognize the variety of ways each morphed version may be rendered in the modeling environment 210, or otherwise provided to the user in any other form.

From illustrative step 430, the user can visually inspect any resulting morphed baseline entity and determine if any of the morphed versions provide an innovation of or invention from the starting baseline entity. In other cases, the user may determine from inspection of the morphed versions how to redefine and reconfigure the model 215 at steps 415 and 420 of the illustrative method 400 to focus, optimize, or otherwise interactively progress to a desired result. In further cases, the user may at illustrative step 410' select one of the morphed versions to be the starting baseline entity and start the systematic inventing process of illustrative method 400 with this morphed version. In other cases, the morphed versions may provide ideas, suggestions, recommendations or otherwise act as some form of catalyst for a user to generate innovations or other inventions. For example, the user may learn or discover some technical areas to research based on any generated morphed version. Additionally, the user may provide or generate a new model 215 in the modeling environment 210 based on information learned from an execution of the steps of illustrative method 400.

In some embodiments, if an object has been morphed into two or more possibilities, then the modeling environment 210 may indicate in the model 215 that the object has multiple morphed versions. In one embodiment, the modeling environment 210 shimmers the object to graphically indicate the object has multiple possible morphs. Alternatively, the multiple possibilities of the object could be constrained by selecting and/or deselecting from the multiple possibilities of the object. For example, a user may select on the shimmering object to get a list of the multiple possibilities for that object, as well as for selecting individual possibilities for viewing, entry into the specific embodiments database 277, inclusion in a patent application drafted in part by the patent application generator 245, a prior art search by the prior art searching tool 249, further morphing, further selection of choices in lower hierarchal classes, or use as a new starting baseline entity. Unwanted or erroneous object choices may be deselected and no longer considered for any of the above actions.

Figure 5A:
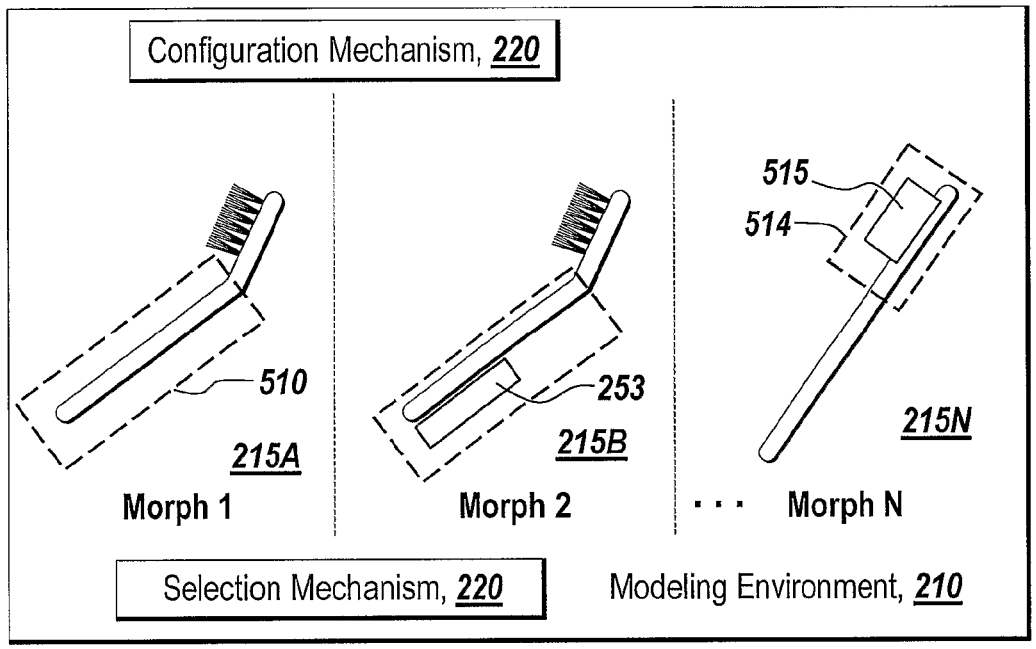
FIG. 5A is a block diagram of an illustrative embodiment of resulting morphed entities in practicing the present invention.
Figure 5B:
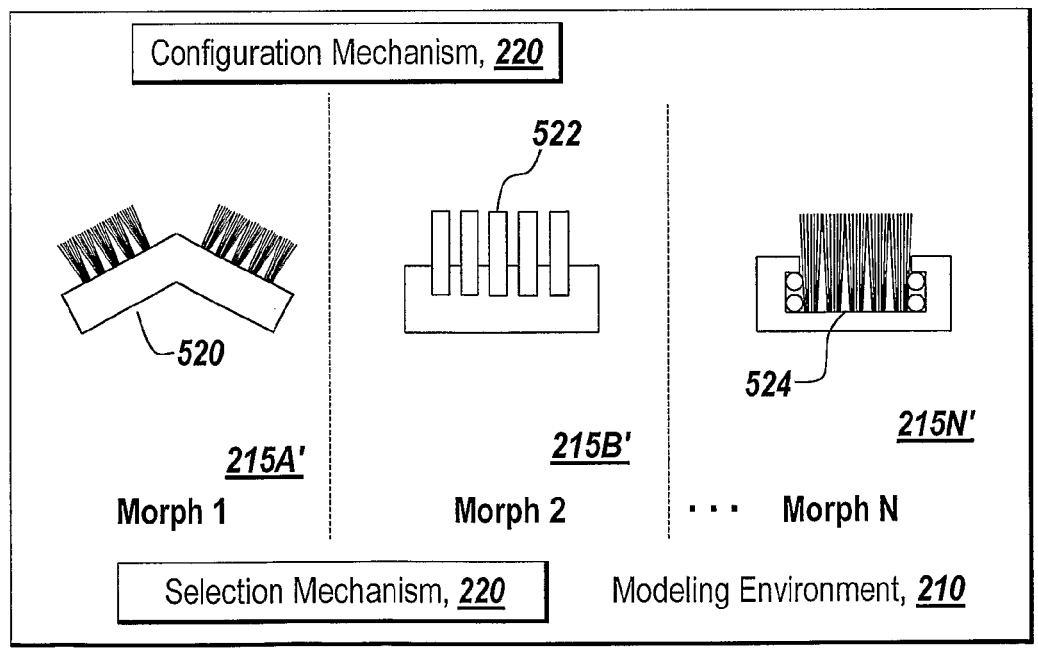
FIG. 5B is another block diagram of an illustrative embodiment of resulting morphed entities in practicing the present invention.

FIGS. 5A and 5B are provided for illustrative purposes to show examples of results of the systematic inventing process of illustrative method 400 to the models 215 and 215' of FIGS. 3A and 3B. Referring now to FIG. 5A, illustrative examples of morphs applied at step 430 to the starting baseline entity of the illustrative toothbrush model 215 and rendered at step 435 are depicted. In brief overview, the modeling environment 210 shows multiple graphical representations of morphs, i.e., morph 1 . . . morph n, which may have been generated in practicing the illustrative method 400. Model 215a shows morph 1, model 215b shows morph 2, and model 215n shows morph N. Models 215a-215n may be depicted in a single user interface and single model 215, or may each represent separate models and separate graphical user interface forms. Each or any of these morphs and corresponding models 215a-215n may have been generated in either manual mode or automatic mode as discussed above for illustrative step 430.

In model 215a of FIG. 5A, a morph 270 may have been applied to the object 312 of model 215 of FIG. 3A to form a morphed version of the object 510. In the illustrative example of the toothbrush model 215, object 312 may have been defined to represent a handle, or a rod, of the toothbrush. By way of example, object 510 of model 215a may represent a feature morph 270a applied to the handle object 312. The feature morph 270c may indicate to bend the handle to morph the object 312 into a bent handle object 510. The feature morph 270c may have further been applied to bend the handle at the top near the interface to, or otherwise adjacent to, a second object, such as object 314 of model 215 of FIG. 3A representing the brush portion of the toothbrush. In other cases, a feature morph 270a may have indicated another location along the handle to apply the bending. In a further example not shown in model 215a, other morphs 270 could have also been applied such as twisting the object 312 to form a morphed object 510 of a twisted handle. In another embodiment, the object 312 may have been further defined to be made of a certain material, such as plastic. In such a case, a material morph 270a may have also been applied to the object 312 to form the morphed object 510 made up of a different material, such as wood. The material morph 270a may be applied separately or in conjunction with the feature morph 270c that provides for bending the handle.

Additionally, in applying morphs 270 to one or more objects of a starting baseline entity, the user may be able to define any ranges and increment functions that may be applicable to the morph 270. In one embodiment, the user via the configuration mechanism 220 of the modeling environment 210 may be able to select a value range and step increments in the range as may be applicable to the morph 270. For example, a morph 270 may be applied to bend the handle of the toothbrush represented by an object of the starting baseline entity. When bending the handle, the bending can be applied at various angles and various angle increments. As such, the present invention allows the user to indicate the angle range and angle increments. For example, the present invention may apply multiple morphs 270 to bend the handle from 0 to 90 degrees in 1, 5, 10 or any other user desired increments. In this manner, the present invention will apply multiple morphs 270 to the starting baseline entity to render multiple morphed baseline entities for each instance of an angle in the range according to the step increment (see FIG. 6).

Although user selectable ranges and increments are generally discussed with respect to a bending morph and angles, one ordinarily skilled in the art will appreciate and recognize there will be many other morphs 270 where ranges and/or increments are applicable. For example, ranges and increments may be provided to define positional and/or orientation coordinates of where to add an object to a starting baseline entity. In another example, range and increments may be identified for quantities, weights, mixtures, or compositions.

FIG. 6 represents possible displays of embodiments produced by the bend morph applied to object 310 of FIG. 3A. FIG. 6 depicts five different overlayed morphed baseline entities of the 531-535, each having a handle bent in custom (user)-selected increments of 22.5° from 0 to 90°. A dialog box 600 shows a textual description of this incremental morph.

In model 215b of FIG. 5A, one or more morphs 270 may have been applied to the object 312 of model 215 in FIG. 3A to form a morphed version 510 of object 312 and the morphs 270 may have been applied to add an additional object 253. In this illustrative example, the morphed object 510 may represent a bent or twisted handle as described in the morphs of Model 215a. However, the present invention provides also for the morph of adding additional objects to the starting baseline entity. In one embodiment, the object 253 may represent any object from the object classes 260a of the innovation database 250. For example, object 253 may represent a mirror, a tooth picking device, a musical playing device, a speaker, a timing device, an LED, or any other object available from the innovation database 250. In this manner, model 215b may represent a morph 270 to the toothbrush of a bent handle with an object 253 of a musical device or speaker attached at one end. The morphs 270 applied in the example of model 215b may also indicate where and how the object 253 is attached. For example, the object 253 may be attached at either end, or anywhere in the middle, of the handle object 510. In a further example, the morph 270 may indicate the orientation of the attachment of the object 253. For example, one side of the object 253 may be attached to face away from the bending of the handle in either direction or from an adjacent object.

Figure 8:
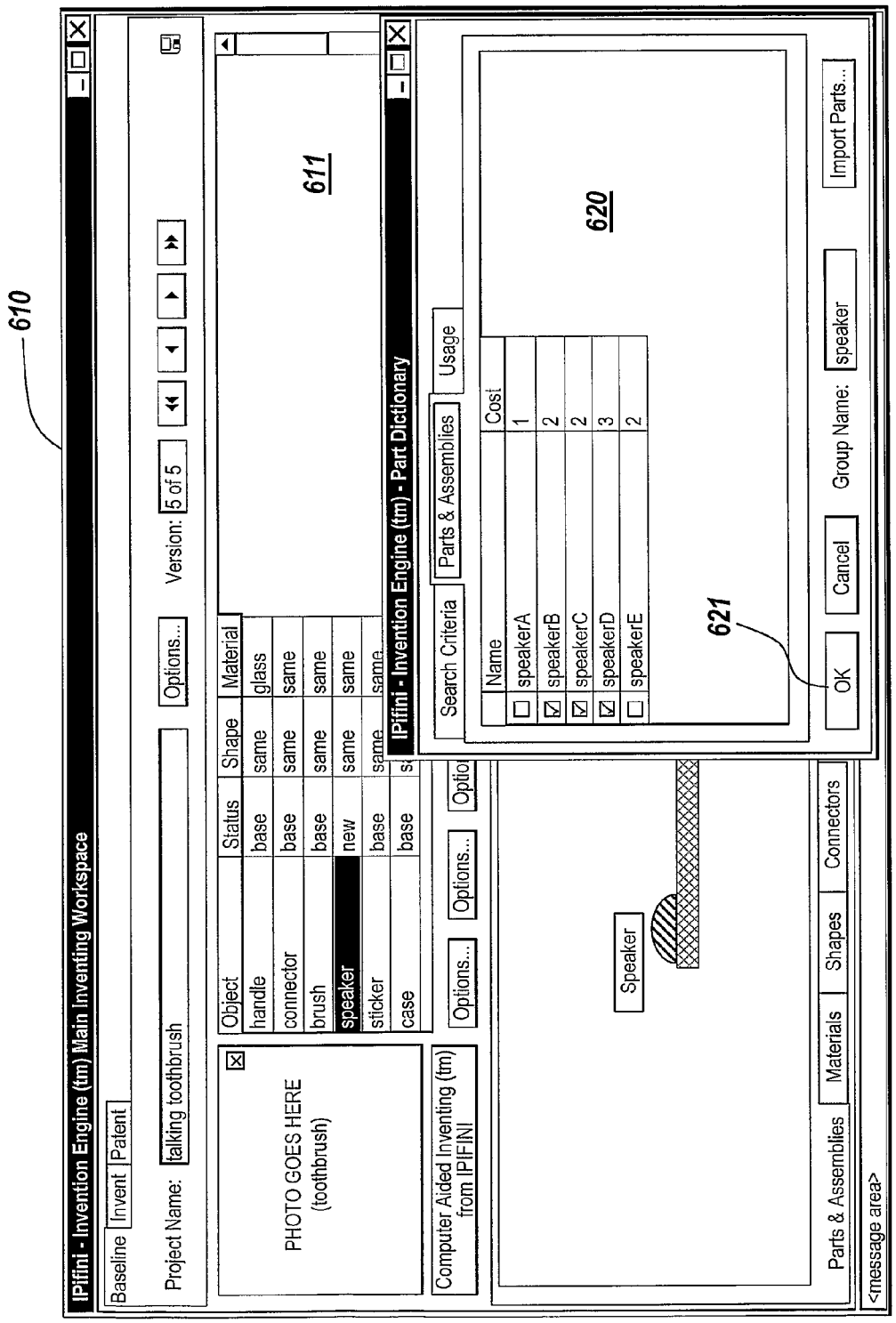
FIG. 8 depicts an illustrative embodiment of a user interface for selecting a morph in practicing the present invention.

FIGS. 7 and 8 depict one embodiment of how the configuration mechanism 220 may interact with the user to apply the above-described insert object morph to the toothbrush. Once the user has chosen the insert object morph, a window 610 showing the insertion of each of the primary object classes onto the toothbrush handle in presented to the user (FIG. 7). In frame 611 of window 610 is a list of each object in the toothbrush, including the various objects added by the morph. That frame 611 may also characterize each object as being present in or new to the baseline entity (the unmorphed toothbrush), and whether the shape or the material that makes up each object is changed from the baseline entity. In frame 612 of window 610, graphical representations of some or all of the possible morphed baseline entities are shown. The window 610 may also include tabs 613 and buttons 614 associated with other aspects of the innovation database. The user may select one of the objects for further elucidation or selection at a finer level. In FIG. 8, the user has selected the speaker object. The innovation database then presents the user with another window 620 listing various choices for the speaker (speaker A, speaker B, speaker C, speaker D, speaker E in FIG. 8) and, optionally, qualitative parameters about those choices (cost in FIG. 8). The user may select one or more of the choices presented through the use of check boxes. In FIG. 8, the user has selected speaker C and speaker D as desired morphed baseline entities. Upon selecting the "OK" button 621, these two morphed baseline entities would be added to the specific embodiment database.

In a further example of morphing the toothbrush model 215 of FIG. 3A, model 215n of FIG. 5A shows a morph 270 applied to object 314 of the toothbrush model 215. In model 215n, object 514 may represent the morphed version of object 314 representing the brush portion of the toothbrush model 215. Object 515 may represent a morph 270 applied to the brush head of the toothbrush. In one embodiment, object 515 may represent any component class 261b from the innovation database 250. In another embodiment, object 515 may represent the result of a reverse lookup of dictionary content in the innovation database 250. For example, the object 314 may have been defined to be a "brush." A reverse lookup may have been performed on the term "brush" in the innovation database 250 to determine all the different types of brushes. As such, the object 515 may represent a different type of brush that is being applied as a morph 270. For example, maybe object 515 represents a sponge type of brush and therefore the resulting brush head of the toothbrush is a sponge.

The user may have modeled the toothbrush in model 215 to define the brush portion of the toothbrush, e.g. object 314, at a relatively course level of granularity. In this case, the illustrative method 400 may have only applied morphs 270 according to this definition and configuration of object 314 as a brush. For example, only different brush types may have been applied as shown in morph N of model 215n of FIG. 5A. The user can define the brush portion of the toothbrush for finer course of granularity to obtain different computer aided inventing results in practicing illustrative method 400 for the toothbrush. FIG. 5B shows additional illustrative examples of morphs 270 applied to the brush model 215' of FIG. 3B as if it was chosen as the starting baseline entity at step 410. In brief overview of FIG. 5B, the modeling environment 210 shows multiple graphical representations of morphs, i.e., morph 1 . . . morph n, which may have been generated in practicing the illustrative method 400 on model 215' of FIG. 3B. Model 215a' shows morph 1, model 215b' shows morph 2, and model 215n' shows morph N.

In the case of morphed model 215a' of FIG. 5B, a morph 270 may have been applied to object 320 of model 215' of FIG. 3B to generate a morphed object 520. Object 320 may have been defined to be a flat base. The present invention may have applied a feature morph 270c to provide a bending morph to the flat base of object 320 as shown in model 215a'. The feature morph 270c may have further indicated to bend the flat base in the middle. Although this example shows a particular morph, any morph 270 available from the innovation database 250 may have been applied.

In the case of morphed model 215b' of FIG. 5B, a morph 270 may have been applied to the object 324 of model 215' of FIG. 3B representing the bristles of the brush. Object 324 may have been defined to be thin rods to model the bristles. The morph 270 may have generated a morphed object 522 representing thick rods, twisted rods, or any other combination of a morph 270 from the morph database 270 to the rods of object 324. Additionally, although object 324 may have not been defined to be a certain material, the present invention may also provide the morphed object 522 with a material morph 270a. For example, morphed object 522 may represent a twisted rod made of rope material.

In the case of morphed model 215n' of FIG. 5B, a morph 270 may have been applied to the object 322 of model 215' of FIG. 3B representing the interface between the bristles of object 324 and the flat base of object 320. In this example, morphs 270 may be applied to provide different versions or methods to interface the rods of object 324 to the base of object 320 as represented by the morphed interface object 524. For example, the morphed interface object 524 may represent an interface that attaches the rods, i.e., the bristles, of object 324 first to a thin flat plate that is attached to the flat base of object 320 by a fastener mechanism at the four corners. In another example not shown by model 215n', the morphed object 524 may represent a matrix of threaded openings on the base of object 320 for the rods of object 324 to be screwed into. In accordance with the present invention, any morph 270 from the innovation database 250 may be applied.

Figure 9:
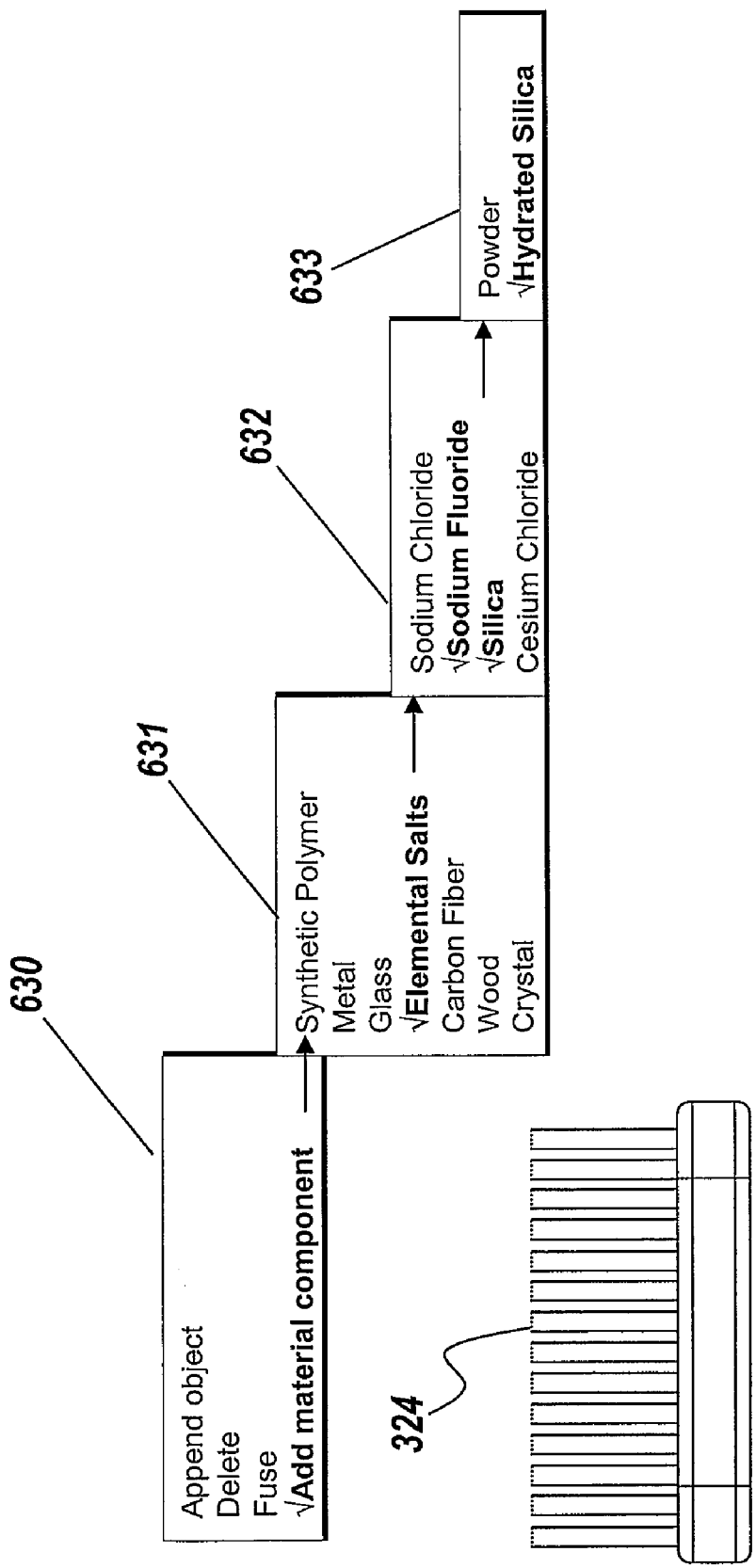
FIG. 9 depicts another user illustrative embodiment of a user interface for selecting a morph in practicing the present invention.

FIG. 9 depicts a user interface by which to apply a morph to the bristles of the toothbrush. In this Figure the user activates a pop-up morph menu 630 by right-clicking with a mouse on the bristles 324 in the modeling environment. Four morph choices (append object, delete, fuse and add material component) are presented. The user selects the "add material" component (e.g, by left-clicking) and a sub-menu 631 of possible material components to add is displayed. The user chooses "elemental salts" and is then presented with submenu 632 of possible salt choices. The user selects two of the choices—sodium fluoride and silica. The silica selection triggers submenu 633 of choices of which the user selects hydrated silica. Embodiments representing the users choices are stored in the specific embodiments database.

The hierarchal grouping of materials and objects into classes, sub-classes, sub-sub-classes, etc. can aid the user to more quickly scan through multiple possibilities and to "zoom in" on a class that is of interest.

The morphs 270 applied do not have to be logically associated with the starting baseline entity of the model 215 or model 15', and in some cases, it may be preferred to generate morphed versions from morphs 270 that are not logically associated with the starting baseline entity. For example, the morphs 270 may add products, components, elements from the object classes 260a, or apply material classes 270 and configuration classes 270B that are not technologically or otherwise related to any portion of a model 215. In other examples, morphs 270 may alter, modify, change or manipulate any object of the starting baseline entity in a manner that the starting baseline entity is not originally designed for. As such, the present invention may produce morphed versions of baseline entities and new baseline entities that are creative and in such a manner that is not intuitive, straightforward, or logical. Furthermore, the present invention may produce resulting entities that may at first seem bizarre, strange or not all that practical or innovative. However, these results may act as a catalyst for further innovation. For example, further inspection and/or reflection upon the results may lead to other creative alternatives from the user to redefine and reconfigure a starting baseline entity in the modeling environment 210 for further processing by illustrative method 400. In another example, the user may use the results from the present invention to invent an invention in any other suitable means.

At illustrative step 440, a selection process is performed on the one or more resulting morphed entities generated at step 430 and provided at step 435. For any generated resulting morphed entity, the user may be able to select via the selection mechanism 225 and configuration mechanism 220 an indicator of a positive or negative selection of a resulting morphed baseline entity. In one embodiment, the user may be able to select a model such as any of the models 215a-215n and invoke a graphical user interface that provides for the selection choices. One ordinarily skilled in the art will recognize that there are a variety of means and mechanisms to provide for and obtain a selection from a user. In one embodiment, the modeling environment 210 may provide a selection of usefulness for a morphed entity. In another embodiment, the modeling environment 210 may provide a selection of novelty or inventiveness over any prior art. In a further embodiment, the modeling environment 210 may provide a matrix of selection criteria including and related to one or more of usefulness, novelty, creativity, commercialization, marketability, costs, performance, user friendliness, or any other criteria that may be suitable for providing and associating a positive or negative indicator with the morphed entity or a morph 270 itself. The selection may be determined to be positive or negative based on any suitable indicator, such as a scaled ranking, a binary choice, a weighted sum of criteria, or any other suitable means to indicate a selection in a positive or negative manner.

At step 442 of illustrative method 400, one or more of the morphed baseline entities selected at step 440 may be stored in the specific embodiments database 277. As will be discussed further below, the specific embodiments database 277 is used by the prior art searching tool 249 to perform prior art searches and by the patent application generator 245 to generate patent applications 247. In one embodiment, the modeling environment 210 may automatically store the selected baseline entities to the specific embodiments database 277. In another embodiment, the user may choose which selected morphed baseline entities to store to the specific embodiments database 277. For example, the user may via the configuration mechanism 220 of the modeling environment 210 choose from a menu item of a popup form which selected morphed baseline entities to store to the specific embodiments database 277.

The modeling environment 210 stores information from the modeling environment 210 and/or the innovation database 250 related to and representing the selected morphed baseline entity into the specific embodiments database 277. In one embodiment, one or more of the fields of the records from the object classes 260a for each of the objects of a selected morphed baseline entity is stored in the specific embodiments database 277 as illustrated by the example table 295a of FIG. 2I-5. For example, the name of each object along with any object attributes as identified in the fields illustrated by the example of table 293 of FIG. 2I-3 may be stored in the specific embodiments database 277. In one embodiment, one or more synonyms for the names of the object may also be stored in the specific embodiments database 277. Likewise, any of the fields of the records from the configuration classes 260b and material classes 260n associated with the selected morphed baseline entity may also be stored in the specific embodiments database 277. For example, any of the fields for records of configuration classes 260b illustrated by the example of table 292a and 292b of FIG. 2I-2 may be stored with the records for the selected morphed baseline entity in the specific embodiments database 277. In a further example, any of the fields for records of material classes 260n illustrated by tables 291 and 291' may also be stored in the specific embodiments database 277 and associated with the selected morphed baseline entity. Additionally, any information available from the modeling environment 210 related to the selected morphed baseline entity may be stored in the specific embodiments database 210. For example, positional and orientation coordinates of objects of the selected morphed baseline entity as rendered in the modeling environment 210 may be stored in the specific embodiments database 277. In this manner, the specific embodiments database 277 will comprise information representing the specific embodiment of the possible invention of the selected morphed baseline entity. A selected morphed baseline entity stored in the specific embodiments database 277 may also be referred to as a specific embodiment.

FIG. 10 depicts a portion of the specific embodiments database 277 after the morphing and selection processes depicted in FIGS. 7, 8 and 9. Each of the embodiments based upon two morphs: 1) attaching speaker C or speaker D to the handle; and 2) adding fluoride or hydrated silica to the bristles, is represented by an individual record. The specific embodiments database 277 has already been in communication with the prior art searching tool 249, which has filled the "Prior Art Refs" field with the identified references.

The user may then select those embodiments to claim in a patent to be produced in part by the patent application generator 245. In FIG. 10, the user has selected embodiments 1 and 4 causing the "Claim?" field to indicate "Yes".

The present invention also provides a very dynamic and interactive computer aided inventing approach wherein a starting baseline entity at step 410 can be selected during any of the steps 410-450 to re-start the computer aided inventing process of the illustrative method 400. For example, when the user is identifying objects of the baseline entity at step 415, the user may determine to focus the practice of the computer aided invention process of method 400 on an identified object. As such, the user may identify an object at step 415 and then select at step 410' the object as the starting baseline entity. The user may then at step 415 identify additional objects of the object as the starting baseline entity and continue to practice one or more of the other steps of illustrative method 400. Also, after generating morphed versions of the starting baseline entity at steps 430 and 435, the user may select a morphed entity, or any object or portion thereof, as the starting baseline entity at step 410 and repeat illustrative method 400. Furthermore, the user may also after performing the selection process of step 440 select one or more of the resulting morphed versions based on any selection criteria of step 440 to be the starting baseline entity at step 410'. In this manner, an extremely wide range of branches of permutations and combinations can be generated in different granularities and perspectives to produce nearly an endless supply of different resulting morphed entities.

FIG. 8 provides an illustrative example of an embodiments of a graphical user interface of the modeling environment 210. The graphical user interface depicted in FIG. 8 illustrates one embodiment wherein the selection of the type of speaker to add to the baseline entity is filtered by a cost factor. Although FIG. 8 describes an embodiment of the present invention using a certain user interface design, layout and arrangement, one ordinarily skilled in the art will recognize that any suitable graphical user interfaces may be used to implement the operations of the present invention as described herein.

At step 444 of illustrative method 400, the present invention also performs automated prior art searching. The prior art searching tool 249 may by any suitable interface mechanism and/or means be triggered to perform a prior art search as one or more selected morphed baseline entities are stored to the specific embodiments database 277. In one embodiment, the prior art searching tool 249 may use database triggers to be notified of new selected embodiment records being stored to the specific embodiments database 277. In another embodiment, the prior art searching tool 249 may be instructed by the modeling environment 210 to perform prior art searches any time the modeling environment 210 stores a selected morphed baseline entity to the specific embodiments database 277. Alternatively, the prior art searching tool 249 may be requested by the user to perform a prior art search via the modeling environment 210 for one or more selected morphed baseline entities in the specific embodiments database 277.

The prior art searching tool 249 may use any of the fields of the record of the specific embodiment in the specific embodiments database 277 to perform searching. In one embodiment, the prior art searching tool 249 forms a search expression from a combination of one or more of the names and/or synonyms, of the objects, materials, configuration and morphs stored or associated with the selected embodiment. In some embodiments, the names and/or synonyms of an object can be obtained from a database other than the innovation database 250 of the present invention, such as a database accessible via the Internet. In further embodiments, the names and/or synonyms of an object can be obtained from a dictionary type web site on the Internet. For example, various alternative names for an object may be obtained from the web site of www.dictionary.com, or from the dictionary like capabilities provided by the searching utility of www.google.com. One ordinarily skilled in the art will recognize and appreciate that the prior art searching tool 249 may form one or more search expressions for the select embodiment from any combination of terms, phrases and words available in the innovation database 250 and/or from any other source such as the Internet.

In some embodiments, the prior art searching tool 249 performs a prior art search of patents, published patent applications and any other prior art using the search expression and interfacing with the web-site of the USPTO, i.e., www.uspto.gov, any other patent office web-site, or any other Internet accessible source. In another embodiment, the prior art searching tool 249 performs a search via an Internet search tool such as Google using the search expression formed from data stored with the selected embodiment. In a further embodiment, the prior art search tool 249 performs the search with the search expression on any accessible storage location or device readable medium. The prior art searching tool 249 may automatically perform multiple searches via multiple sources, such as multiple patent office web-sites, an Internet search tool, and a DVD-ROM.

Furthermore, the prior art searching tool 249 may perform multiple searches using different search expressions formed from the fields associated with the record of the selected embodiment in the specific embodiments database 277. For example, in one search, the prior art searching tool 249 may use a broad search expression representing a name for the selected embodiment. In other cases, the prior art searching tool 249 may perform a specific search for each of the objects of the specific embodiments. In additional embodiments, the prior art search tool 249 can be configured by any suitable mechanisms and/or means to determine the number and type of searches to perform automatically or for a specific embodiment.

The prior art searching tool 249 obtains one or more results from the one or more prior art searched it may perform either automatically or manually. In one embodiment, the results of the prior art searches may be displayed in the modeling environment 210 by any suitable mechanisms and/or means, such as via a graphical user interface form. The user may view the results and select the desired results and have the modeling environment 210 store the results in the specific embodiments database 277. In other embodiments, the prior art searching tool 249 may read, parse or otherwise interpret the results of the prior art searches to determine information about the results. Furthermore, the prior art searching tool 249 may store information about the prior art search results in the specific embodiments database 277 in fields and/or records associated with one or more specific embodiments in the specific embodiments database 277. For example, the prior art searching tool 249 may store results in the illustrative example of table 295*a* of FIG. 2I-5. In other embodiments, the prior art searching tool 249 stores results off-line in any suitable storage. For example, the prior art searching tool 249 may download patents and published patent applications as .pdf files for viewing by a user of the present invention. Additionally, the prior art searching tool 249 may include a reference or link to such downloaded content in the results portion of the specific embodiments database 277.

Additionally, at step 445 of the illustrative method 400, the present invention can generate via the patent application generator 245 a patent application 247, or any portion thereof, representative of a baseline entity selected at step 440, or at any time, any model 215, 215' or any morphed model 215*a*-215*n* and 215*a*'-215*n*' in the modeling environment 210. The user via the configuration mechanism 220 and selection mechanism 225 may choose in the modeling environment 210 to generate a patent application 247 for one or more models 215 that may be loaded or otherwise referenced in the modeling environment 210. In another embodiment, a patent application 247 may automatically be generated for any resulting morphed entity or entities indicated with a positive selection at step 440 of the illustrative method 400. In a further embodiment, one or more patent applications 247 may automatically be generated to represent one or more of the resulting morphed entities generated by automatically applying the morphs 260 at step 430 of illustrative method 400. In an exemplary embodiment, the patent application generator 245 generates a patent application 247 for one or more specific embodiments stored in the specific embodiments database 277. The patent application generator 245 utilizes the data stored in the fields and records of a selected embodiment in the specific embodiments database 277 as content to process to generate a patent application 247.

The patent application generator 245 may use any of the graphical representations provided by the rendering mechanism 230 of the modeling environment 210 to provide informal or formal drawings for the patent application 247. The modeling environment 210 and/or rendering mechanism 220 may be able to provide different views or graphical representations of a model 215 to be used for figures for the patent application. For example, the modeling environment 210 and/or rendering mechanism 220 may be able to provide a top level view of a model 215 and then provide detailed views of each object or any section or portion of the model 215. In other embodiments, the patent application generator 245 may obtain graphical representations of objects of models 215 or for products, components, elements of a model 215 that may be available from the innovation database 250 or any other database the patent application generator 245 may be configured to access. In another embodiment, one or more graphical representations of the objects of the selected embodiments stored in or referenced in the specific embodiments database 277. In other embodiments, the patent application generator 245 uses the positional and orientation coordinates to determine how to provide graphical representations of the selected embodiments in the figures of the patent application 247.

The patent application generator 245 can name and label the figures in any suitable manner and in such a manner to be used consistently in the detailed description of the patent application. For example, the patent application generator 245 may place a label in the figure for each identified object in a model 215. Furthermore, the description of the drawings portion of the patent application 247 can be generated to provide a description of the figures generated by the patent application generator 245.

From the innovation database 250 or any other database, or from any built-in or loadable logic, functionality, or information, the patent application generator 245 may obtain textual content to form any of the sections of the patent application 247. In one embodiment, the patent application generator 245 uses data from or references to data in the specific embodiments database 277 to obtain content for the patent application 247. In another embodiment, for each object defined in a model 215, the patent application generator 245 obtains a name, description and any associated characteristics and attributes stored in the innovation database 250 and generates a narrative arranging the obtained information in a suitable manner in the patent application document 247. For example, the narrative may be placed in the detailed description section of the patent application 247 and may also include references to the labels placed on any corresponding objects in the figures generated by the patent application generator 245. In a similar manner, the claims, background, abstract, field of invention, and summary may be generated by the patent application generator 245. Furthermore, a user via any suitable input means, such a user interface, may able to add to, update, revise, edit or change the patent application 247 generated by the patent application generator 245 in a manner to produce a patent application 247 suitable for filing. In one embodiment, a user may load into a word processor the patent application document 247 generated by the patent application generator 245 and complete and/or finalize a version of the patent application 247 for filing with a patent office.

The patent application generator 245 may use any fields of records associated with one or more selected embodiments of the specific embodiments database 277, or any object, material, configuration or morph of the innovation database 250 to determine what should or should not be included in the patent application 247. For example, the illustrative example of table 294 of FIG. 2I-4 has fields for morphs to determine whether the morph should be included in the specification and/or the claims. Likewise, any records of the specific embodiments 277 or innovation database 250 may have fields to indicate whether the items should be included or otherwise considered by the patent application generator 249. Additionally, the patent application generator 245 may include information from the results of the prior art search performed by the prior art searching tool 249. The patent application generator 245 may obtain results information from the prior art search results stored in association with one or more selected embodiments in the specific embodiments database 277. The prior art search results in the specific embodiments database 277 may have fields to indicate whether the results should be included in the patent application 247 or otherwise considered by the patent application generator 245.

FIG. 11 depicts one manner in which the patent application generator 245 may interact with the specific embodiments database 277 to produce claims. A template for a claim calls from the selected records in the specific embodiments database 277 various fields (indicated by italics) to draft the claim. FIG. 12 depicts the result of such an interaction using the embodiments selected by the user in FIG. 10. In a similar, manner, the patent application generator may select one field from multiple records to create Markush-type claims.

In another aspect, the present invention is directed towards the innovation database 250 being updated, growing, evolving or otherwise reflecting results from practicing the present invention. At step 450 of the illustrative method 400, the innovation database 250 may be updated with any information or data produced, derived from, or otherwise provided by using the present invention. In one embodiment, the user via the modeling environment 210 or any other suitable means can configure and update the innovation database 250 with user provided entries for any of the model classes 260 and morphs 270, or any attributes associated with the model classes 260 and morphs 270. In another embodiment, the user may be able to edit, modify, annotate, add to, change, or otherwise manage any of the information or data in the innovation database 250 to provide desired results or have the present invention perform in a desired manner. In a further embodiment, the modeling environment 210 may automatically update the innovation database 250 with morphed objects and resulting morphed entities to form new model classes 260 and new morphs 270 to use in practicing the present invention. In one embodiment, the innovation database 250 is updated with external sources of information, such as new technical dictionary. In another embodiment, the innovation database 250 may be linked to or otherwise updated from other available knowledge bases or knowledge sources. One ordinarily skilled in the art will recognize that the content of the innovation database 250 may be continuously updated to provide new and different computer aided inventing results, which can in turn be reflected in the innovation database 250 to further provide additional new and different computer aided inventing results, and this cycle can be repeated continuously.

Although the illustrative embodiment of the present invention is generally described for entities comprising a structure such as an apparatus, one ordinarily skilled in the art will recognize and appreciate the present invention can be applied in a similar manner to any system, function, process, method or from any perspective. For example, a model 215, such as block diagram model, can be provided in the modeling environment 210 to model any design, system, process, method, function or functionality, such as a model-based design of a process, operation, computation, algorithm that may be performed in any computational hardware device. The innovation database 250 can include model classes 260 and morphs 270 directed to modeling processes and functionality and applying morphs to processes and functionality. Accordingly, the starting baseline entity of a model can have objects identified and defined from a process oriented perspective, a functional perspective, or from any perspective that may be provided or supported by the lexicon and specification framework of the innovation database 250. Additionally, the different modeling perspectives may be mixed in that a starting baseline entity model may represent portions of an apparatus, a method, or functionality that may be implemented either as an apparatus or a method. The steps of the illustrative method 400 would in a likewise manner apply to any such starting baseline entity models. In one implementation a device, method or computer program for aiding the process of authoring text includes lexicon databases of words, lexicon databases of phrases and a database of sentence structures. The device, method or computer program is capable of generating a database of variations of the text, by applying morphs to a word, phrase or sentence structure. The device, method or computer program additionally allows for the application of morphs to all or portions of the generated morphed text, and generates a database of morphed texts. In another implementation a device, method or computer program for aiding the process of music composition and orchestration comprising databases of sounds (such as a flute, siren, voice), notes, melody elements (series of notes) and chords. The device, method or computer program is capable of generating a database of variations of the music by applying morphs to the orchestration, melody elements, duration, volume or tone of the notes (change note, change duration, change instrument or sound). The device, method or computer program permits the user to select or the device, method, or program to randomly generate one or multiple variations of orchestration, duration, tone and volume. The device, method or computer program additionally allows for the application of morphs to all or portions of the generated morphed music. The device, method or computer program then plays back the variations, allowing the user to select the most desirable output.

In view of the structure, functions, and operations of the illustrative embodiment of the present invention described herein, the present invention provides a systematic approach to computer aided inventing in a modeling environment using an innovation engine and innovation database. The innovation database provides a lexicon, specification framework, and knowledge base for generating via the innovation engine a vast array of inventions, innovative improvements, intermediate inventive prototypes, brainstorming models, creativity assisting models, alternative, or otherwise morphed embodiments of a starting model or portion of a model in the modeling environment. Any resulting morphed inventive embodiment may comprise an invention that is useful and novel, or may comprise an intermediate form of a series of embodiments that leads to an invention or the discovery of an invention. In other cases, the computer aided inventing system of the present invention may provide creative or brainstorming suggestions to facilitate or expedite the innovation process. For example, the present invention may be used in a collaborative session where participants from different backgrounds and disciplines come together to creatively brainstorm towards a directed innovation. The present invention provides a framework and systematic approach to facilitate the session, and provides alternative embodiments to further trigger the creativity of the participants and the collaborative brainstorming activity. In summary, the present invention provides an innovation environment for a purposeful and structured approach to the innovation process.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations. In cases where an example table of morphs, objects, materials or configurations is presented here, it is recognized that the invention can be useful with subsets of these fists, for example, there can be at least 25, 33, 40, 50, 70, 80 or 90% of the members of each list used, depending on the particular application of the invention.

What is claimed is:

1. A device-readable non-transitory medium holding device-readable instructions for a method of aiding in the process of inventing, the method comprising the steps of:
    inputting a baseline entity by defining one or more objects, materials and, optionally, configurations that make up said baseline entity, wherein said defining is achieved by selecting each of said one or more objects, materials and configurations from one or more databases, said databases including a plurality of objects, materials and configurations,
    independently applying one or more morphs to one or more of said objects, materials and configurations to produce one or more morphed baseline entities, the morphs selected from a database comprising a plurality of morphs;
    optionally applying morphs to one or more of the objects, materials and configurations of one or more of the produced morphed baseline entities to produce additional morphed baseline entities; and
    generating a specific embodiments database comprising all of the morphed baseline entities and additional morphed baseline entities produced,
wherein said databases including a plurality of objects, materials, configurations and morphs are hierarchical and wherein at least one of the objects, material, morphs, or configurations available for defining or application to at least a portion of a baseline entity is temporarily reduced in number by filter criterion inputted by a user.

2. The medium of claim 1 wherein the filter criterion is based on at least two of criteria for cost, consumer appeal, and novelty.

3. A device-readable non-transitory medium holding device-readable instructions for a method of aiding in the process of inventing, the method comprising the steps of:
    inputting a baseline entity by defining one or more objects, materials and, optionally, configurations that make up said baseline entity, wherein said defining is achieved by selecting each of said one or more objects, materials and configurations from one or more databases, said databases including a plurality of objects, materials and configurations,
    independently applying one or more morphs to one or more of said objects, materials and configurations to produce one or more morphed baseline entities, the morphs selected from a database comprising a plurality of morphs;
    optionally applying morphs to one or more of the objects, materials and configurations of one or more of the produced morphed baseline entities to produce additional morphed baseline entities; and
    generating a specific embodiments database comprising all of the morphed baseline entities and additional morphed baseline entities produced,
wherein said databases including a plurality of objects, materials, configurations and morphs are hierarchical and wherein the selected morph to apply is a quantitative morph, wherein the range and increments of said quantitative morph can be specified by a user, and wherein each increment of the range generates a corresponding morphed baseline entity that becomes a record in the specific embodiments database.

4. A device-readable non-transitory medium holding device-readable instructions for a method of aiding in the process of inventing, the method comprising the steps of:
    inputting a baseline entity by defining one or more objects, materials and, optionally, configurations that make up said baseline entity, wherein said defining is achieved by selecting each of said one or more objects, materials and configurations from one or more databases, said databases including a plurality of objects, materials and configurations,
    independently applying one or more morphs to one or more of said objects, materials and configurations to produce one or more morphed baseline entities, the morphs selected from a database comprising a plurality of morphs;
    optionally applying morphs to one or more of the objects, materials and configurations of one or more of the produced morphed baseline entities to produce additional morphed baseline entities; and
    generating a specific embodiments database comprising all of the morphed baseline entities and additional morphed baseline entities produced,
wherein said databases including a plurality of objects, materials, configurations and morphs are hierarchical and wherein multiple objects, materials, morphs, or configurations can be simultaneously selected by the user for application to the baseline entity.

5. A device-readable non-transitory medium holding device-readable instructions for a method of aiding in the process of inventing, the method comprising the steps of:
    inputting a baseline entity by defining one or more objects, materials and, optionally, configurations that make up said baseline entity, wherein said defining is achieved by selecting each of said one or more objects, materials and configurations from one or more databases, said databases including a plurality of objects, materials and configurations,
    independently applying one or more morphs to one or more of said objects, materials and configurations to produce one or more morphed baseline entities, the morphs selected from a database comprising a plurality of morphs;
    optionally applying morphs to one or more of the objects, materials and configurations of one or more of the produced morphed baseline entities to produce additional morphed baseline entities; and generating a specific embodiments database comprising all of the morphed baseline entities and additional morphed baseline entities produced, wherein said databases including a plurality of objects, materials, configurations and morphs are hierarchical and wherein each of said databases can be expanded by at least one of user input and importation from other databases.

6. A device-readable non-transitory medium holding device-readable instructions for a method of aiding in the process of inventing, the method comprising the steps of:

inputting a baseline entity by defining one or more objects, materials and, optionally, configurations that make up said baseline entity, wherein said defining is achieved by selecting each of said one or more objects, materials and configurations from one or more databases, said databases including a plurality of objects, materials and configurations, independently applying one or more morphs to one or more of said objects, materials and configurations to produce one or more morphed baseline entities, the morphs selected from a database comprising a plurality of morphs;

optionally applying morphs to one or more of the objects, materials and configurations of one or more of the produced morphed baseline entities to produce additional morphed baseline entities; and generating a specific embodiments database comprising all of the morphed baseline entities and additional morphed baseline entities produced, wherein said databases including a plurality of objects, materials, configurations and morphs are hierarchical and wherein said specific embodiments database is displayable in a form selected from tabular text, two dimensional graphic, three dimensional graphic, or any combination thereof.

* * * * *